(12) United States Patent
Steeb et al.

(10) Patent No.: US 7,290,258 B2
(45) Date of Patent: Oct. 30, 2007

(54) MANAGING MULTIPLE DEVICES ON WHICH OPERATING SYSTEMS CAN BE AUTOMATICALLY DEPLOYED

(75) Inventors: Curt A. Steeb, Redmond, WA (US); Munisamy Prabu, Redmond, WA (US); Zeyong Xu, Issaquah, WA (US); Martin L. Holladay, Bremerton, WA (US); Paul C. Sutton, Seattle, WA (US); Raymond D. Pedrizetti, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 120 days.

(21) Appl. No.: 10/607,115

(22) Filed: Jun. 25, 2003

(65) Prior Publication Data

US 2004/0268340 A1 Dec. 30, 2004

(51) Int. Cl.
*G06F 9/445* (2006.01)
*G06F 9/44* (2006.01)

(52) U.S. Cl. .................. 717/178; 717/168; 717/172; 717/173; 717/174; 717/177

(58) Field of Classification Search ......... 717/168–178
See application file for complete search history.

(56) References Cited

U.S. PATENT DOCUMENTS

| | | | |
|---|---|---|---|
| 5,367,635 A | 11/1994 | Bauer et al. | |
| 5,404,527 A | 4/1995 | Irwin et al. | |
| 5,717,930 A | 2/1998 | Imal et al. | |
| 5,758,165 A | 5/1998 | Shuff | |
| 6,009,274 A * | 12/1999 | Fletcher et al. | 717/173 |
| 6,012,088 A | 1/2000 | Li et al. | |
| 6,138,234 A | 10/2000 | Lee et al. | |
| 6,202,206 B1 | 3/2001 | Dean et al. | |
| 6,236,983 B1 * | 5/2001 | Hofmann et al. | 706/47 |
| 6,292,941 B1 * | 9/2001 | Jollands | 717/176 |
| 6,324,578 B1 | 11/2001 | Cox et al. | |
| 6,389,589 B1 | 5/2002 | Mishra et al. | |
| 6,401,238 B1 | 6/2002 | Brown et al. | |
| 6,449,642 B2 | 9/2002 | Bourke-Dunphy et al. | |
| 6,557,100 B1 | 4/2003 | Knutson | |
| 6,560,776 B1 | 5/2003 | Breggin et al. | |
| 6,687,902 B1 * | 2/2004 | Curtis et al. | 717/175 |
| 6,763,456 B1 * | 7/2004 | Agnihotri et al. | 713/2 |
| 6,813,708 B2 | 11/2004 | Smith et al. | |
| 6,854,112 B2 | 2/2005 | Crespo et al. | |

(Continued)

FOREIGN PATENT DOCUMENTS

WO    WO 01/16701 A2 *   3/2001

OTHER PUBLICATIONS

Abstract of reference entitled "Dynamic composition of services", Lammermann, S., Proceedings of International Conference on Complex Systems: Control and Modeling Problems, Sep. 4-9, 2001, 1 page.

(Continued)

*Primary Examiner*—William H. Wood
(74) *Attorney, Agent, or Firm*—Lee & Hayes, PLLC

(57) ABSTRACT

Multiple devices on which operating systems can be automatically deployed are managed. According to one aspect, an apparatus manages installation of operating systems on a plurality of computing devices. The installation is performed across the plurality of computing devices both concurrently and asynchronously.

34 Claims, 16 Drawing Sheets

U.S. PATENT DOCUMENTS

| | | | |
|---|---|---|---|
| 6,910,103 | B2 | 6/2005 | Dana |
| 6,948,099 | B1 | 9/2005 | Tallam |
| 6,963,981 | B1 | 11/2005 | Bailey et al. |
| 6,986,033 | B2* | 1/2006 | Miyamoto et al. ............. 713/1 |
| 6,996,706 | B1 | 2/2006 | Madden et al. |
| 7,069,428 | B2* | 6/2006 | Miyamoto et al. .......... 717/174 |
| 2002/0002704 | A1 | 1/2002 | Davis et al. |
| 2002/0124245 | A1 | 9/2002 | Maddux et al. |
| 2002/0161868 | A1* | 10/2002 | Paul et al. ................ 709/221 |
| 2002/0198972 | A1* | 12/2002 | Babbitt et al. ............. 709/222 |
| 2003/0018870 | A1 | 1/2003 | Abboud et al. |
| 2003/0037033 | A1 | 2/2003 | Nyman et al. |
| 2003/0046682 | A1 | 3/2003 | Crespo et al. |
| 2003/0065828 | A1 | 4/2003 | Danan |
| 2003/0084342 | A1* | 5/2003 | Girard ....................... 713/201 |
| 2003/0097422 | A1* | 5/2003 | Richards et al. ........... 709/217 |
| 2004/0015581 | A1 | 1/2004 | Forbes |

OTHER PUBLICATIONS

"An Architectural Infrastructure and Topological Optimization for End System Multicast", Wong et al., Proceedings of the Tenth IEEE Int'l Symp. on Modeling, Analysis, & Simulation of Computer & Telecommunications Systems, 2002, 8 pages.

"IP Multicast Operational Network Management: Design, Challenges, and Experiences", Sharma et al., IEEE Network, Mar./Apr. 2003, pp. 49-55.

"Web Portal for Multicast Delivery Management", Mannaert et al., Internet Research: Electronic Networking Applications and Policy, vol. 13, No. 2, 2003, pp. 94-99.

"Multicast Injection for Application Network Deployment", Ardaiz et al., IEEE 2001, pp. 386-394.

"Bootstrap Protocol (BOOTP)", Croft et al., Network Working Group, RFC 951, Sep. 1985, pp. 1-12.

"Preboot Execution Environment (PXE) Specification", Version 2.1, Intel Corporation, Sep. 20, 1999, 103 pages.

Appendix D (Server Clusters: Remote Setup, Unattended Installations and Image Insallations), retrieved on Oct. 2, 2006 at <<http://technet2.microsoft.com/WindowsServer/en/library/6e8b36d4-f6e9-4b9b-b471-1e6acc74d7721033, Microsoft TEchnet, Microsoft Corp 2006, pp. 3.

Complete Pre-Upgrade Tasks, retrieved on Oct. 24, 2006 from <<http://technet2.microsoft.com/WindowsServer/en/library/0cd4a9b4-c30f-4d6f-8201-90dbgc16155a11033.mxpx?pf=true>>, Microsoft Technet, Microsoft Corp, Mar. 23, 2003, 1 page.

"Image-based Installation of the Operating System and the Cluster Service using Automated Deployment Services (ADS)", retrieved on Oct. 1, 2006, at <<http://technet2.microsoft.com/WindowsServer/en/library/ba672f36-2a9d-43d2-9737ab50db8b71b1033.mspx?mfr=true>>, Microsoft Technet, Microsoft Corporation, 2006, Jan. 1, 2006, pp. 1-12.

"Lab: Automated Deployment Services", retrieved at <<http://supportech. insalyon.fr/Download/HOL/TechEd03/Windows/Deployment.pdf>>, Jun. 16, 2003, pp. 17.

* cited by examiner

MANAGING MULTIPLE DEVICES ON WHICH OPERATING SYSTEMS CAN BE AUTOMATICALLY DEPLOYED

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the object models and sample code as described below: Copyright© 2003, Microsoft Corporation.

TECHNICAL FIELD

This invention relates to networks and device management, and more particularly to managing multiple devices on which operating systems can be automatically deployed.

BACKGROUND

Computers typically operate under the control of software referred to as an operating system. The operating system may be installed on a computer by the computer manufacturer or distributor, or may be installed by the purchaser. Additionally, as new operating systems become available over time, it is often desirable to upgrade from one operating system to a newer operating system.

Given the size and complexity of many modern operating systems, the installation of an operating system on a computer can be a very time-consuming process for the user. Installing additional software on the computer after the operating system is installed makes the installation even more time-consuming. Furthermore, as the number of computers on which operating systems are being installed increases, the amount of time necessary to install the operating systems on all of the computers similarly increases. This is particularly true in a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computers in climate-controlled, physically secure buildings. Data centers provide reliable Internet access, reliable power supplies, and a secure operating environment.

In addition to the time taken to install the operating system and applications on multiple servers, the process often involves many manual steps. These steps, being manual, are both expensive in terms of time and human resources needed, and subject to human error.

Thus, it would be beneficial to have a way to install operating systems and/or other software on computers that reduces the amount of user-time involved in installing the operating systems and reduces the possibility of mistakes being made.

SUMMARY

Managing multiple devices on which operating systems can be automatically deployed is described herein.

According to one aspect, an apparatus manages installation of operating systems on a plurality of computing devices. The installation is performed across the plurality of computing devices both concurrently and asynchronously.

BRIEF DESCRIPTION OF THE DRAWINGS

The same numbers are used throughout the document to reference like components and/or features.

DETAILED DESCRIPTION

Figure 1:
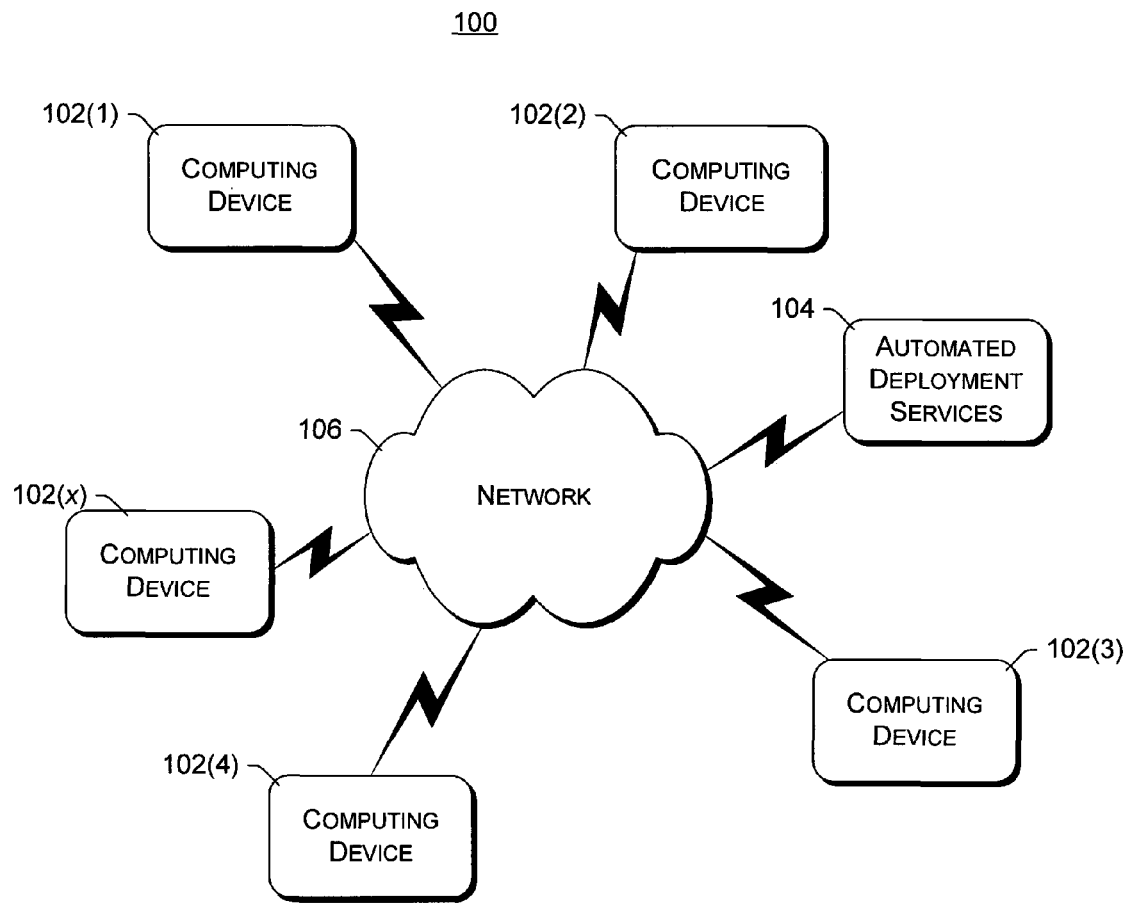
FIG. 1 illustrates an example network environment.

FIG. 1 illustrates an example network environment 100. In environment 100, multiple (x) computing devices 102(1), 102(2), . . . , 102(x) and automated deployment services 104 are coupled to a network 106. Network 106 is intended to represent any of a variety of conventional network topologies and types (including wire and/or wireless networks), employing any of a variety of conventional network protocols (including public and/or proprietary protocols). Network 106 may include, for example, a local area network (LAN), a wide area network (WAN), portions of the Internet, and so forth. Environment 100 represents any of a wide variety of environments, including, for example, data centers (e.g., Internet data centers (IDCs)), office or business environments, home environments, educational or research facilities, retail or sales environments, and so forth.

Computing devices 102 can be any of a variety of conventional computing devices, including desktop PCs, workstations, mainframe computers, server computers, Internet appliances, gaming consoles, handheld computers, cellular telephones, personal digital assistants (PDAs), etc. One or more of devices 102 can be the same types of devices, or alternatively different types of devices. Additionally, even if multiple devices are the same types of devices, the multiple devices may still be configured differently (e.g., two devices 102 may be server computers, but may have different hardware configurations, such as different processors, different amounts of RAM, different sizes of hard disk drives, and so forth).

Automated deployment services 104 represent one or more computing devices that manage the configuration of and installation of software on computing devices 102. All computing devices 102 in environment 100 may be managed by the same automated deployment services 104, or alternatively multiple services 104 may be present with different services 104 managing different devices 102.

During operation, when a new computing device 102 is added to environment 100, the newly added computing device 102 is automatically configured and software (e.g., an operating system) is automatically installed on the device 102 by automated deployment services 104. If multiple devices 102 are added, then the configuration and software installation on the multiple devices 102 can be managed simultaneously by automated deployment services 104.

Additionally, one or more computing devices 102 may be re-configured after being added to environment 100. For example, a particular computing device 102 may operate for a period of time (e.g., on the order of minutes, hours, days, months, etc.) performing one function, and then an administrator may decide that a different function is desirable (e.g., change from being a server computer to a workstation computer, from a web server to a local file server, etc.).

Auto Deployment Architecture and Operation

Figure 2:
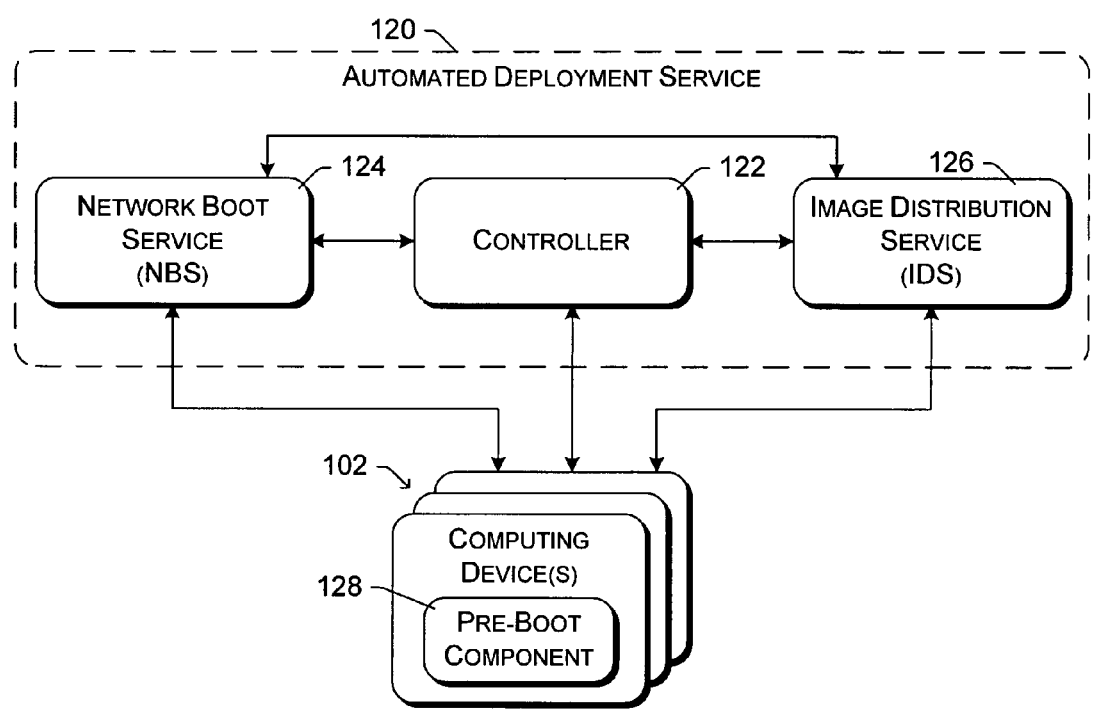
FIG. 2 illustrates an example automated deployment service.

FIG. 2 illustrates an example automated deployment service 120. Automated deployment service 120 may be, for example, automated deployment services 104 of FIG. 1. Automated deployment service 120 includes a controller 122, a network boot service (NBS) 124, and an image distribution service (IDS) 126. Automated deployment service 120 manages the configuration of computing devices 102, as well as the installation of software on computing devices 102. The software installed on computing devices 102 typically includes an operating system, and/or one or more other application programs. One or more of controller 122, network boot service 124, and image distribution service 126 can be deployed on the same device, or alternatively across multiple devices.

The specific manner in which computing devices 102 are to be configured and the specific manner in which software is to be installed on devices 102 can vary by device. In certain embodiments, a sequence of tasks can be defined that describes what actions are to be taken by automated deployment service 120 in configuring and/or installing software on a particular device 102. Tasks and task sequences are discussed in more detail below (e.g., under the heading Task Sequences and elsewhere).

Controller 122 keeps a record of devices 102 that are being managed by automated deployment service 120, what action(s) automated deployment service 120 should take the next time each of the devices 102 is booted, and what operations can be performed on each device 102. Controller 122 operates as the control point for automated deployment service 120 and the devices 102.

Network boot service 124 enables a device 102 to boot up in a particular manner desired by network boot service 124, such as booting to the operating system on a disk of the device 102, a virtual floppy on the device 102, or to a deployment agent at the device 102. Network boot service 124 detects when one of the devices 102 is being booted, and optionally indicates to the device how the device should boot (based on information that service 124 receives from controller 122). Network boot service 124 may also generate and/or download to a device 102 one or more programs to be executed that assist in the automated deployment of the operating system.

Image distribution service 126 stores images that can be deployed onto the hard disks of the devices 102. These images are used to install an operating system on a device 102, as discussed in more detail below.

Each computing device 102 includes a pre-boot component 128 that allows the device 102 to communicate with controller 122, prior to any operating system being executed on the device 102 (and even prior to any operating system being installed on the device 102). Pre-boot component 128 can be implemented in hardware, software, firmware, or combinations thereof. In one implementation, the pre-boot component 128 is implemented in accordance with the Preboot Execution Environment (PXE) Specification Version 2.1 (or alternatively other It versions), available from Intel Corporation of Santa Clara, Calif. Additional information regarding PXE is available from Intel Corporation of Santa Clara, Calif. Alternatively, pre-boot component 128 can be implemented in different manners, such as using BOOTP (Bootstrap Protocol). Additional information describing BOOTP can be found in the Network Working Group Request for Comments (RFC) 951.

Figure 3:
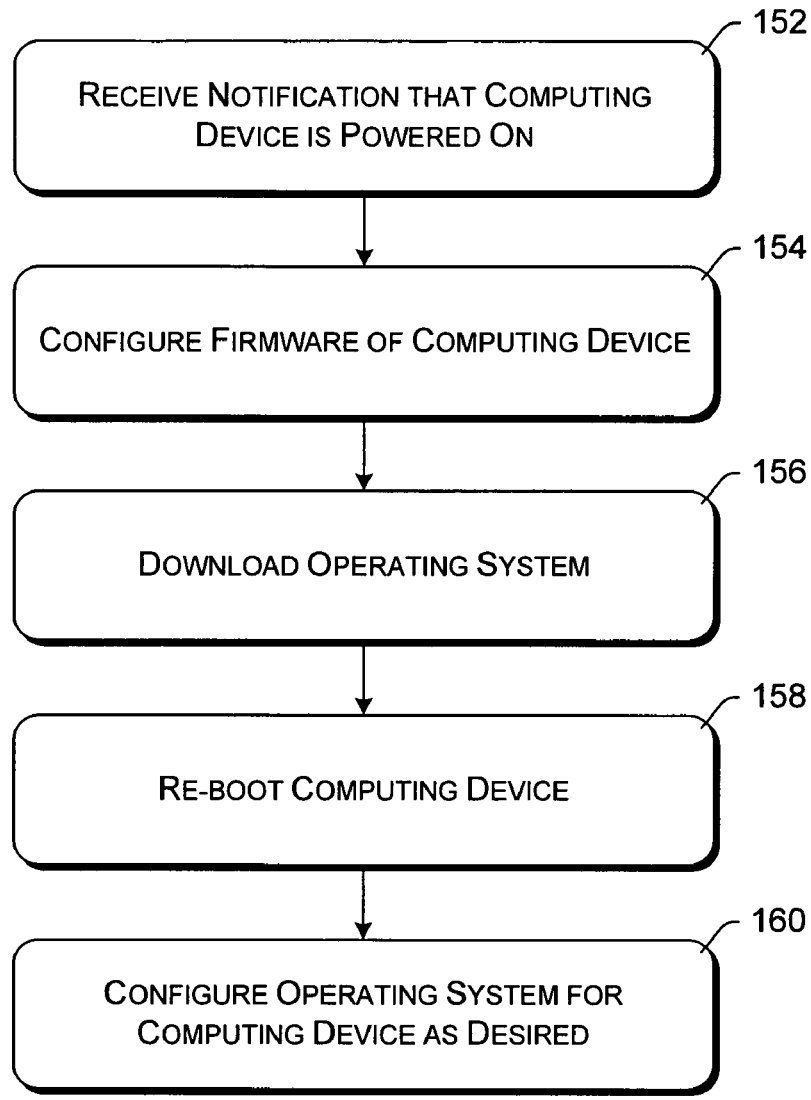
FIG. 3 is a flowchart illustrating an example process that automatically deploys an operating system on a computing device.

FIG. 3 is a flowchart illustrating an example process 150 that automatically deploys an operating system on a computing device. The process of FIG. 3 is performed by automated deployment service 120 of FIG. 2, and may be implemented in software, firmware, hardware, or combinations thereof.

Initially, a notification that the computing device has been powered on is received by the automated deployment service (act 152). This notification can take any of a variety of forms and can be implemented in any of a variety of manners. In implementations where the pre-boot component 128 is implemented in accordance with the PXE Specification, this notification can be a PXE request that is issued as part of a DHCP (Dynamic Host Configuration Protocol) message request, such as a DHCPDISCOVER message request. This PXE request can be implemented by setting an option in the DHCP message request that identifies the requesting device 102 as a PXE client.

In response to receiving the notification in act 152, network boot service 124 in conjunction with controller 122 configures the firmware of the computing device 102 (act 154). Network boot service 124 obtains, from controller 122, information describing how this particular computing device 102 is to be configured. Different aspects of the firmware of the computing device 102 can be configured, such as the setting of BIOS (Basic Input/Output System) parameters and the setting of RAID (Redundant Array of Independent Disks) parameters. The specific firmware settings that a device 102 should be configured with can be determined in a variety of different manners, and in one implementation the settings are input by a system administrator of the automated deployment service or the environment where the automated deployment service is employed.

The configuration of act 154 can be implemented in different manners. In one implementation, a set of instructions (e.g., a software program(s)) is downloaded from network boot service 124 to device 102. This set of instructions includes instructions that, when executed by device 102, cause the firmware of device 102 to be configured as desired. Alternatively, a set of instructions that receives commands over the network from network boot service 124 may be executed by device 102 and the commands to configure the firmware of device 102 as desired may be sent to device 102 by network boot service 124.

After the firmware is configured on the device 102, the device 102 may optionally be re-booted. Whether the device 102 is re-booted is dependent, at least in part, on the manner in which the firmware is configured.

After the firmware is configured in act 154 (and after the device 102 is re-booted, if it is re-booted), the operating system is downloaded to the device 102 (act 156). In certain embodiments, the operating system is an operating system image that is copied from the image distribution service 126 to the device 102. Prior to downloading the operating system, additional programs may be copied to the device 102, such as a temporary operating system (also referred to as a deployment agent), to facilitate downloading of the operating system image.

Once the operating system is downloaded to the device 102, the device 102 is re-booted (act 158). When re-booting in act 158, the device 102 is booted into the newly downloaded operating system. Additional configuration of the operating system for the computing device 102, as well as other parameters for the computing device 102, can then be initiated as desired by the automated deployment service (act 160). A variety of different parameters can be set in act 160, such as configuring the name of the computing device, passwords and/or IDs for users of the computing device, a static IP (Internet Protocol) address of the computing device, and so forth.

Furthermore, in act 160 additional software may be installed on the computing device 102. Any of a variety of software packages can be installed, such as reference programs, utility programs, productivity programs (e.g., word processing software, spreadsheet software, database software, computer aided design software, and so forth), recreational programs (e.g., video games designed to be played locally on the device 102 or via an on-line service), entertainment programs (e.g., audio and/or visual media presentation programs), and so forth.

Figure 4:
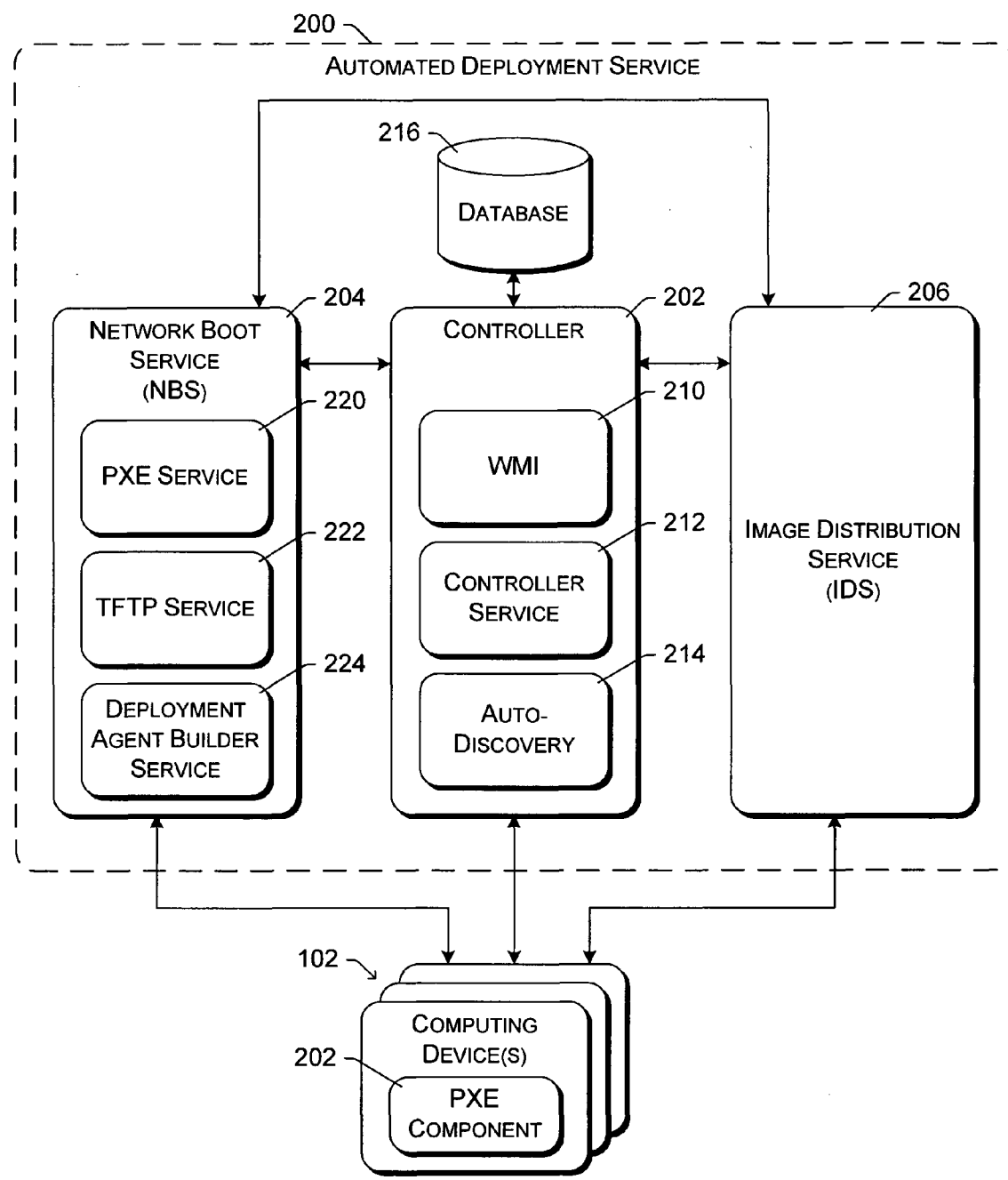
FIG. 4 illustrates example components of an automated deployment service in additional detail.

FIG. 4 illustrates example components of an automated deployment service in additional detail. The automated deployment service 200 of FIG. 4 is an example implementation of the service 120 of FIG. 2. Automated deployment service 200 includes a controller 202, network boot service (NBS) 204, and image distribution service (IDS) 206, which are analogous to and operate analogous to controller 122, network boot service 124, and image distribution service 127 of FIG. 2.

Controller 202 includes a Windows Management Instrumentation (WMI) interface 210, a controller service 212, and an auto-discovery component 214. Controller 202 is also coupled to a database 216, which is a relational database that maintains information related to devices 102 being managed by controller 122 and task sequences that can be performed on those devices. WMI interface 210 is an object model interface which provides an object model of database 216—information can be obtained from database 216 by way of WMI interface 210.

Controller service 212 is a control module for controller 202. Controller service 212 manages communications with the image distribution service 206 and network boot service 204. Controller service 212 also manages task sequences, maintaining a record of what step(s) are currently being performed on devices 102 and what step(s) are next to be performed on devices 102 in deploying software to the devices 102.

Auto-discovery component 214 receives notifications from devices 102 as the devices are booting (e.g., from operating systems booting on the devices 102). These notifications allow the devices 102 to be identified by controller 202. Controller service 212 maintains a record (e.g., in database 216) of devices that controller 202 manages, and auto-discovery component 214 allows controller service 212 to identify which devices are currently running on the network and/or have just been booted on the network. Auto-discovery component 214 (and/or PXE service 220 discussed below) also allows controller service 212 to determine when a device 102 has just been booted on the network and thus allows controller service 212 to know that it should check for any steps that are to be performed on the device.

Network boot services 204 includes a Preboot Execution Environment (PXE) service 220, a Trivial File Transfer Protocol (TFTP) service 222, and a deployment agent builder service 224. PXE service 220 detects PXE requests from devices 102, and communicates with controller 202 to determine what action to take in response to each PXE request. Some information regarding what actions to take in response to PXE requests can also be received from controller 202 and cached in network boot service 204. The action taken in response to a particular PXE request may involve a response being sent from network boot service 204 to the requesting device 102 informing the device 102 of particular actions it should take, or alternatively the action may be to simply ignore the PXE request.

TFTP service 222 is a file server that can download requested files to devices 102. These files can be generated at network boot service 204 (e.g., by deployment agent builder service 224), or obtained by TFTP service 222 from some other source for download (e.g., obtained from database 216). Network boot service 204 may also maintain a cache of files previously downloaded to a device 102, and TFTP service 222 may access this cache to obtain the files for download to a requesting device 102.

Deployment agent builder service 224 dynamically builds a deployment agent for a particular device 102 based on information describing the particular device 102. A deployment agent loader runs on the device 102 and returns to builder service 224 information describing the device 102. This information includes, for example, the hardware installed on the particular device 102 so that the deployment agent can be generated with all the necessary device drivers to run on that device 102. In one implementation the deployment agent is a native mode Windows NT® operating system kernel. This deployment agent can also be referred to as a temporary operating system. The deployment agent, when running on a device 102, creates an environment from which the final operating system can be installed on the device 102, as discussed in more detail below.

FIGS. 5*a*-5*f* are a flowchart illustrating an example process 300 that automatically deploys an operating system on a target computing device. The process of FIGS. 5*a*-5*f* is performed by automated deployment service 200 of FIG. 4 and a computing device 102 of FIG. 4, and may be implemented in software, firmware, hardware, or combinations thereof. For ease of explanation, acts performed by the automated deployment service are shown on the left-hand side of FIGS. 5*a*-5*f*, while acts performed by the target device (the computing device on which the operating system is being deployed) are shown on the right-hand side of FIGS. 5*a*-5*f*. FIGS. 5*a*-5*f* are discussed with additional reference to FIG. 4.

Figure 5A:
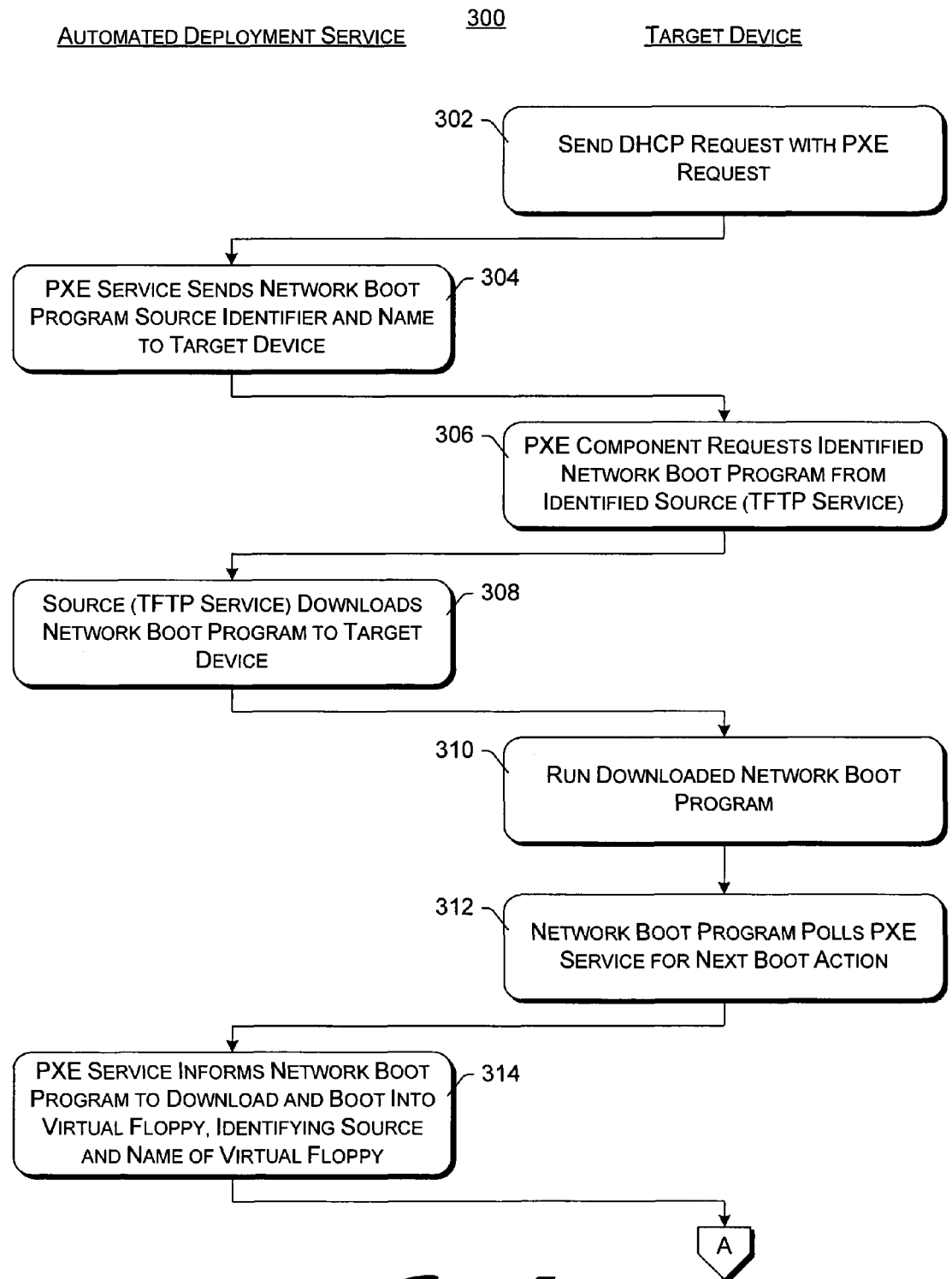
FIGS. 5a, 5b, 5c, 5d, 5e, and 5f are a flowchart illustrating an example process that automatically deploys an operating system on a target computing device.
Figure 5B:
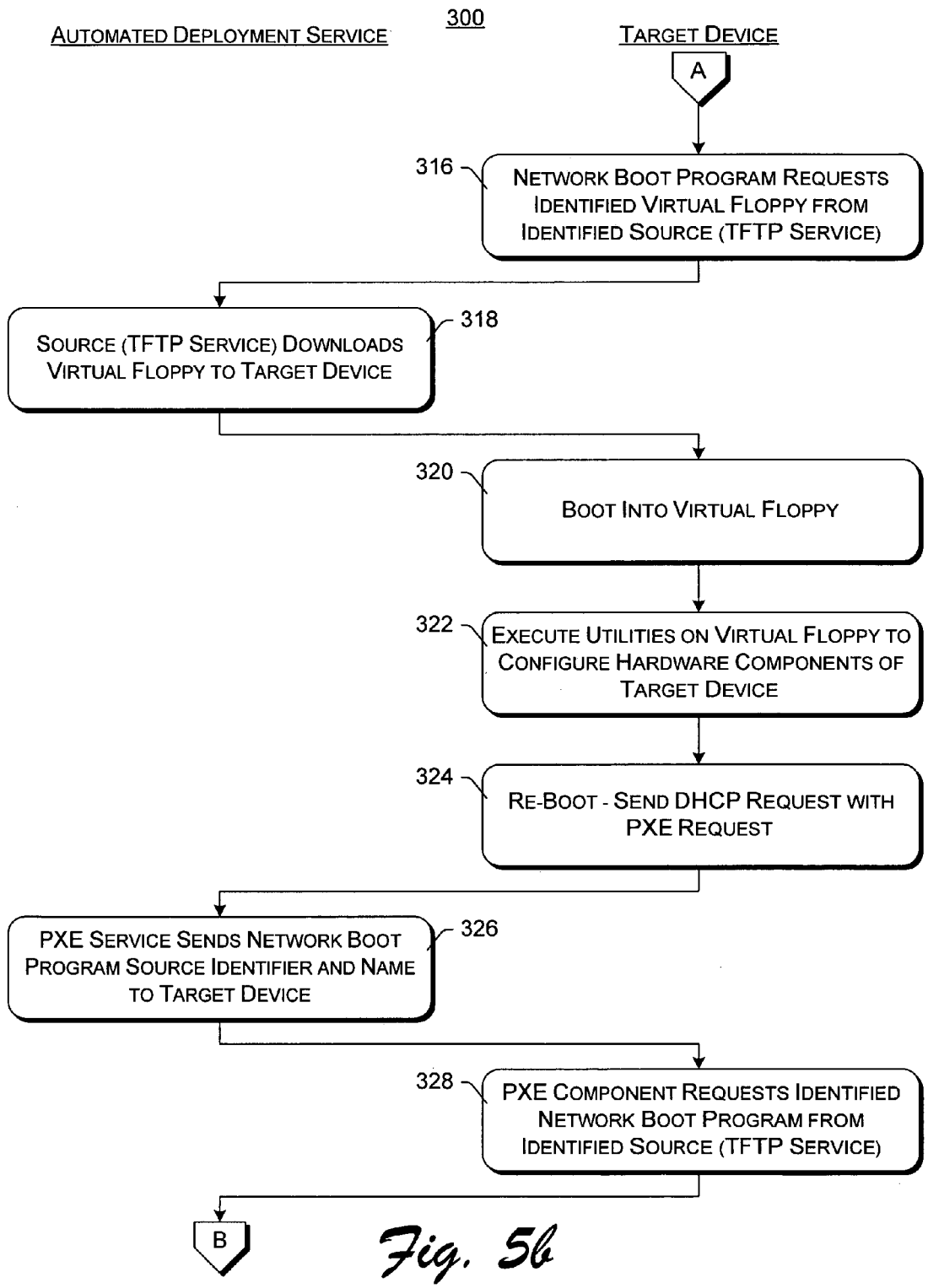
Figure 5C:
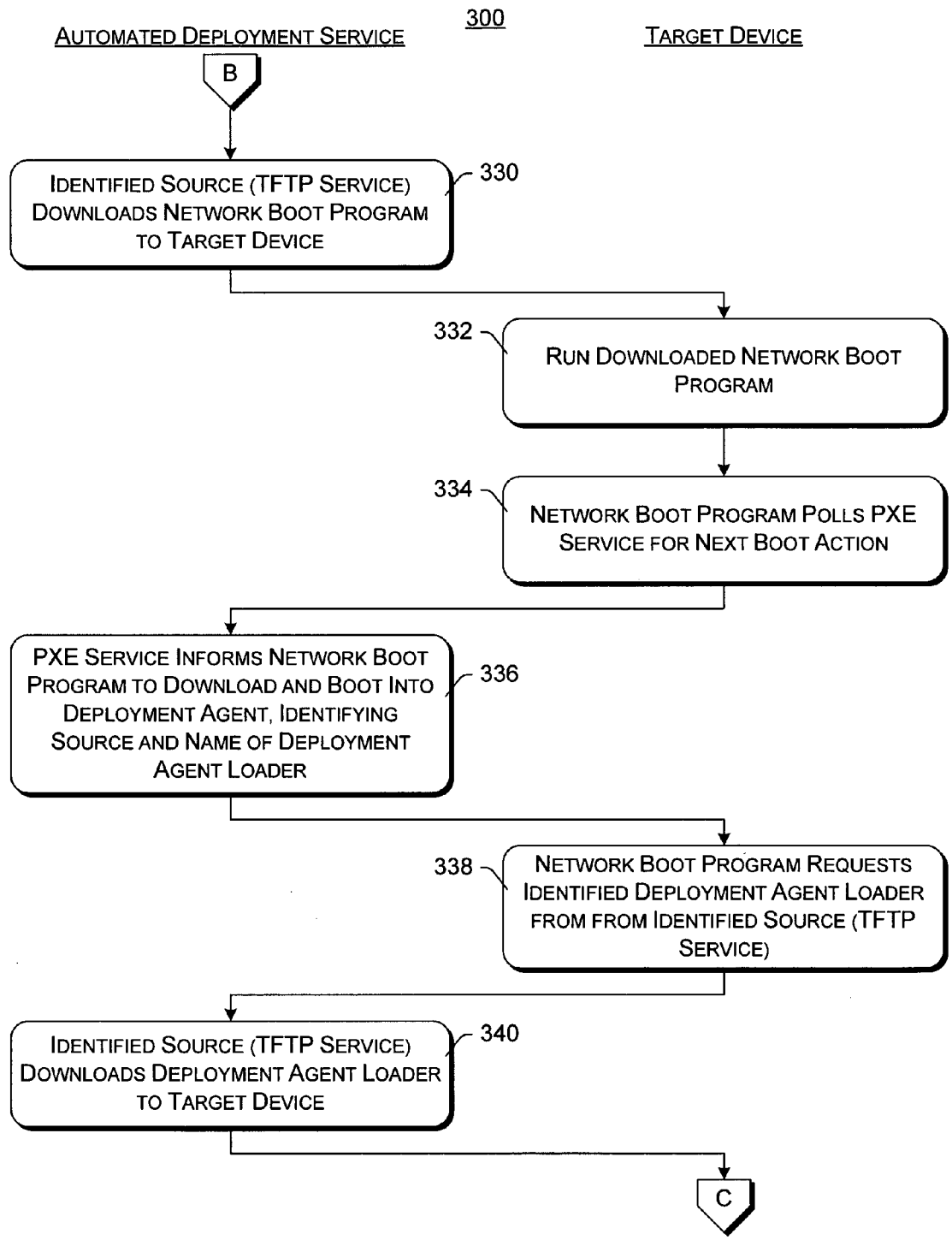

Initially, the target device transmits a DHCP request that includes a PXE request (act 302 of FIG. 5*a*). The DHCP request including the PXE request is sent by the target device each time the target device is powered on or re-booted. The PXE service 220 detects the PXE request and responds to the target device with an identifier of a source of a network boot program and a name of the network boot program (act 304). The network boot program is a program that can be downloaded to the target device and executed on the target device. The network boot program allows the target device to configure and use RAM disks on device 102. The network boot program is typically a small program (relative to the operating system being deployed on the target device), and usually does not provide the same robust operation as the operating system being deployed on the target device. The same network boot program can be used for multiple computing devices 102, or alternatively different network boot programs can be used for different devices 102.

Automated deployment service 200 maintains one or more identifiers for each of the computing devices 102 it is managing (and optionally one or more identifiers for each computing device it may manage in the future and/or managed in the past). Different identifiers can be used, but the identifiers should provide a high level of probability that the identifiers are unique (e.g., so that it is very unlikely that two or more devices 102 would have the same identifier). Examples of identifiers that can be used for a particular device 102 include the Media Access Control (MAC) address of the network card being used by the device 102 to access the network, or the System Management BIOS (SM-BIOS) Universal Unique Identifier (UUID).

In some situations, multiple automated deployment services 200 may be on the same network, resulting in multiple PXE services 220 receiving the PXE request from the target device. Such situations can be handled in a variety of different manners. In some embodiments, each automated deployment service 200 is programmed or otherwise configured with identifiers (e.g., MAC addresses and/or SMBIOS UUIDs) of the various computing devices 102 that it is responsible for managing. In these embodiments, only the PXE service 220 of the automated deployment service 200 that is responsible for managing the target device will respond to the PXE request. In other embodiments, the different automated deployment services 200 may communicate with each other (or with some other device) to determine which of the services 200 is responsible for managing the target device. In other embodiments, a first-come-first-served policy is employed, so that the first response received by the target device is the response followed by the device.

The target device receives the network boot program source identifier and name, and the PXE component 230 of the target device requests the identified network boot program from the identified source (e.g., TFTP service 222) (act 306). The network boot program and source can be identified in a variety of different manners. In one implementation, the source is identified by a network address (e.g., an IP address) or Uniform Resource Locator (URL), and the network boot program is identified by a file name (e.g., made up of one or more of letters, number, symbols, punctuation marks, and so forth).

In response to the request for the identified network boot program, the identified source (e.g., TFTP service 222) downloads the requested network boot program to the target device (act 308). The target device receives the network boot program and runs the program (act 310). Once running, the network boot program sends a request to PXE service 220 for an indication of the next action the network boot program should take (act 312).

PXE service 220 receives the request from the network boot program and responds to the request by informing the network boot program to download and boot into a virtual floppy disk (act 314). As part of the response, PXE service 220 identifies the source of the virtual floppy disk and the name of the virtual floppy disk. The network boot program receives this response and requests the identified virtual floppy disk from the identified source (e.g., TFTP service 222) (act 316 of FIG. 5b). In response to the request, the identified source (e.g., TFTP service 222) downloads the requested virtual floppy disk to the target device (act 318). As part of this download, the target device copies the virtual floppy disk to a RAM disk of the target device (created by the network boot program).

The virtual floppy disk is data representing a floppy disk that can be copied to and executed from a RAM disk on the target device. Once the virtual floppy disk is downloaded to the RAM disk on the target device, the target device continues the boot process using the virtual floppy disk (act 320). One or more utility programs present on the virtual floppy disk are executed to configure the hardware components of the target device (act 322). The execution of a program(s) on the virtual floppy disk can be carried out as identified in a batch file on the virtual floppy disk (e.g., an "autoexec.bat" file on the virtual floppy disk that identifies a list of programs to be executed). The parameters for configuring the hardware components are included in the virtual floppy disk. Any of a variety of configurations can be made using the utility program(s) on the virtual floppy disk. In certain embodiments, various BIOS parameters are set and/or various RAID parameters (e.g., parameters maintained by a RAID controller at the target device) are set. The specific hardware settings for the device 102 can be determined in a variety of different manners, and in one implementation are input by a system administrator.

After the hardware components of the target device are configured, the target device is re-booted (act 324). This can be accomplished, for example, by including a re-boot command as the last command in the autoexec.bat file on the virtual floppy disk.

When the target device is re-booted, it sends out a DHCP request with a PXE request (act 324), analogous to act 302 discussed above. The PXE service 220 detects the PXE request and responds to the target device with an identifier of a source of a network boot program and a name of the network boot program (act 326), analogous to act 304 discussed above. The target device receives the network boot program source identifier and name, and the PXE component 230 of the target device requests the identified network boot program from the identified source (e.g., TFTP service 222) (act 328), analogous to act 306 discussed above. In response to the request for the identified network boot program, the identified source (e.g., TFTP service 222) downloads the requested network boot program to the target device (act 330 of FIG. 5c), analogous to act 308 discussed above. The target device receives the network boot program and runs the program (act 332), analogous to act 310 discussed above. Once running, the network boot program sends a request to PXE service 220 for an indication of the next action the network boot program should take (act 334), analogous to act 312 discussed above.

PXE service 220 receives the request from the network boot program and knows that the virtual floppy disk has already been executed on the target device (because it was downloaded in act 318 above). So, PXE service 220 responds to the request from the network boot program by informing the network boot program to download and boot into a deployment agent (act 336). As part of this response, PXE service 220 also includes an identifier of a source of a deployment agent loader and a name of the deployment agent loader. The network boot program receives this response and requests the identified deployment agent loader from the identified source (e.g., TFTP service 222) (act 338).

In response to the request, the identified source (e.g., TFTP service 222) downloads the requested deployment agent loader to the target device (act 340).

Figure 5D:
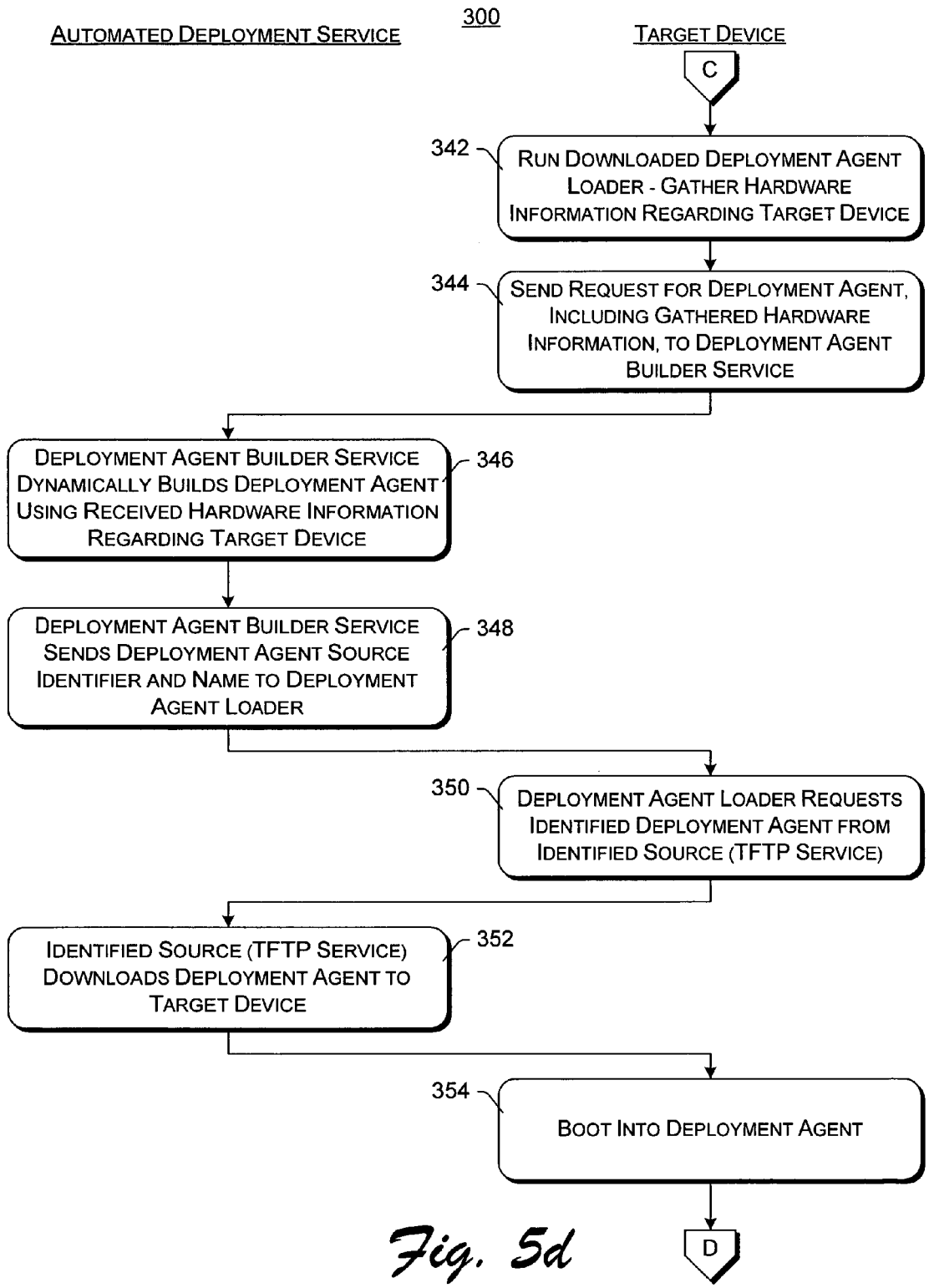
Figure 5E:
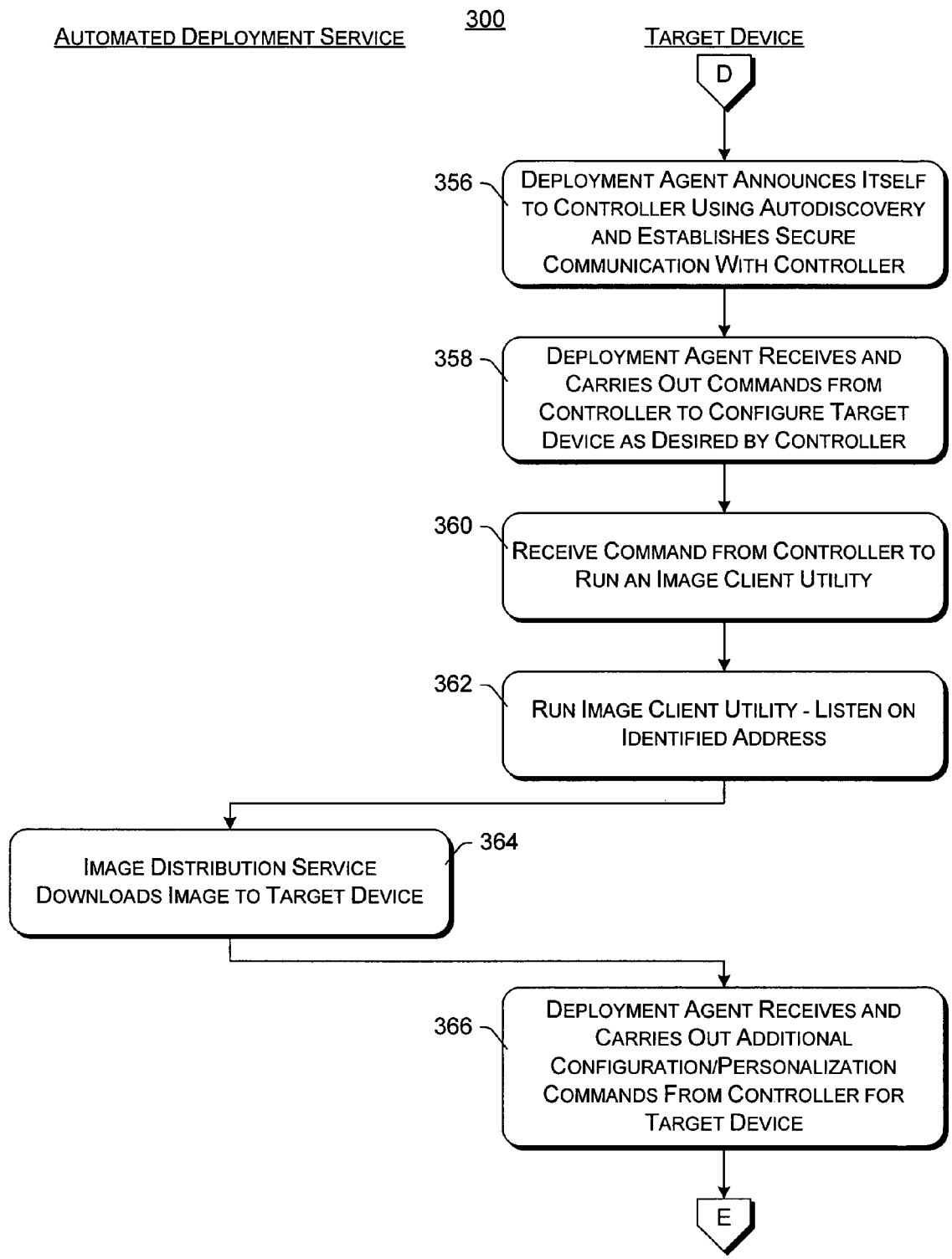

Once downloaded to the target device, the deployment agent loader is run (act 342 of FIG. 5*d*). The deployment agent loader gathers hardware information regarding the target device, such as an enumeration or listing of the various hardware components that are present in the target device. The deployment agent loader then sends a request for the deployment agent from the deployment agent builder service 224 (act 344). As part of this request, the deployment agent loader includes the information it has gathered regarding the hardware of the target device.

Deployment agent builder service 224 then dynamically generates the deployment agent based on the hardware information it receives regarding the target device (act 346). The deployment agent is dynamically generated because it is designed for the particular hardware configuration of the target device. It should be noted that deployment agents may also optionally be cached (e.g., at network boot service 204 or in database 216), so that if multiple devices 102 happen to have the same hardware configuration, then the same deployment agent need not be generated multiple times.

Deployment agent builder service 224 then sends an identifier of the deployment agent name and identifier of the source of the deployment agent to the deployment agent loader on the target device (act 348). Upon receiving the identifiers, the deployment agent loader requests the identified deployment agent from the identified source (e.g., TFTP service 222) (act 350). In response to the request, the identified source (e.g., TFTP service 222) downloads the requested deployment agent to the target device (act 352). As part of this download, the target device copies the deployment agent to a RAM disk of the target device (created by the network boot program). Once the deployment agent is downloaded to the RAM disk on the target device, the target device continues the boot process by running the deployment agent (act 354).

The deployment agent is an operating system that includes sufficient functionality to allow a full operating system to be installed on the target device. The full operating system refers to the operating system that is being deployed on the target device by automated deployment service 200. The full operating system is typically stored in nonvolatile memory of the target device (e.g., a hard disk drive) and subsequently controls operation of the target device. In contrast, the deployment agent is a temporary operating system that is typically smaller than the full operating system, and that typically is not maintained in nonvolatile memory (e.g., is run from a RAM disk). The deployment agent includes device drivers to control the various hardware components of the target device, or at least those hardware components that are used during the installation process.

When the deployment agent runs, it announces itself to auto-discovery component 214, and optionally establishes secure communication with controller service 212 (act 356). Secure communication between controller service 212 and the target device can be achieved in any of a variety of manners (e.g., using cryptography and symmetric keys and/or public/private key pairs). Establishing secure communication allows, for example, the target device to ensure that commands it receives are from the controller 202 (which the target device inherently trusts), and not from some rogue or mischievous device on the network.

The deployment agent receives and carries out commands it receives from controller 202 (act 358). These commands are to configure the target device as desired by controller 202. Any of a variety of commands can be issued by controller 202, and these commands typically are used to prepare the target device for deployment of the operating system. Examples of such commands include partitioning a hard disk(s) of the target device, formatting a volume(s) of a mass storage device of the target device, and so forth.

The deployment agent also receives a command from controller 202 to run an image client utility (act 360). The image client utility is a program that facilitates copying of an image from image distribution service 206 to the hard drive (or other storage device on which the operating system is to be deployed) of the target device. In one implementation, the image client utility is part of the deployment agent on the target device. The image client utility runs and listens on a network address (e.g., an IP address) identified by controller 202 for an operating system image from image distribution service 206 (act 362).

Controller 202 also informs image distribution service 206 to send the desired operating system image to the identified network address, and image distribution service 206 downloads the desired image to the target device by sending the desired image to the identified network address (act 364). As part of this download, the image is copied to the hard drive (or other storage device) of the target device. The image for the operating system that is stored by image distribution service 206 is a file(s) that contains a functionally identical replica of a disk. The image thus contains all of the files, with many settings and data properly configured, that constitute the operating system that can be loaded and executed on a device (some settings may have been previously made and/or may be subsequently made).

The image can be generated in any of a variety of different manners, and is typically generated using a computing device that already has an operating system installed on it. A tool is run on the computing device that generates a disk image of that computing device, which is then used as the image for that operating system. The tool can be run manually by a user at the computing device, or alternatively the tool may be activated remotely. This remote activation can be accomplished, for example, by including in the deployment agent the disk imaging tool. The computing device can then be booted into the deployment agent as discussed above, and the disk imaging tool can be run. The generated disk image can then be communicated by the deployment agent to, for example, image distribution service 206.

Any of a variety of tools can be used to generate the disk image. One such tool is the Windows® 2000 operating system System Preparation Tool (Sysprep) Version 1.1, available from Microsoft Corporation of Redmond, Wash. Alternatively, other proprietary or publicly available tools could be used.

The deployment agent also receives and carries out additional configuration or personalization commands from controller 202 (act 366). Such configuration or personalization commands in act 366 may include, for example, setting a unique hostname on the downloaded image (e.g., a name for the target device), setting the time zone, setting an administrator's password, setting a static IP address, and so forth.

Figure 5F:
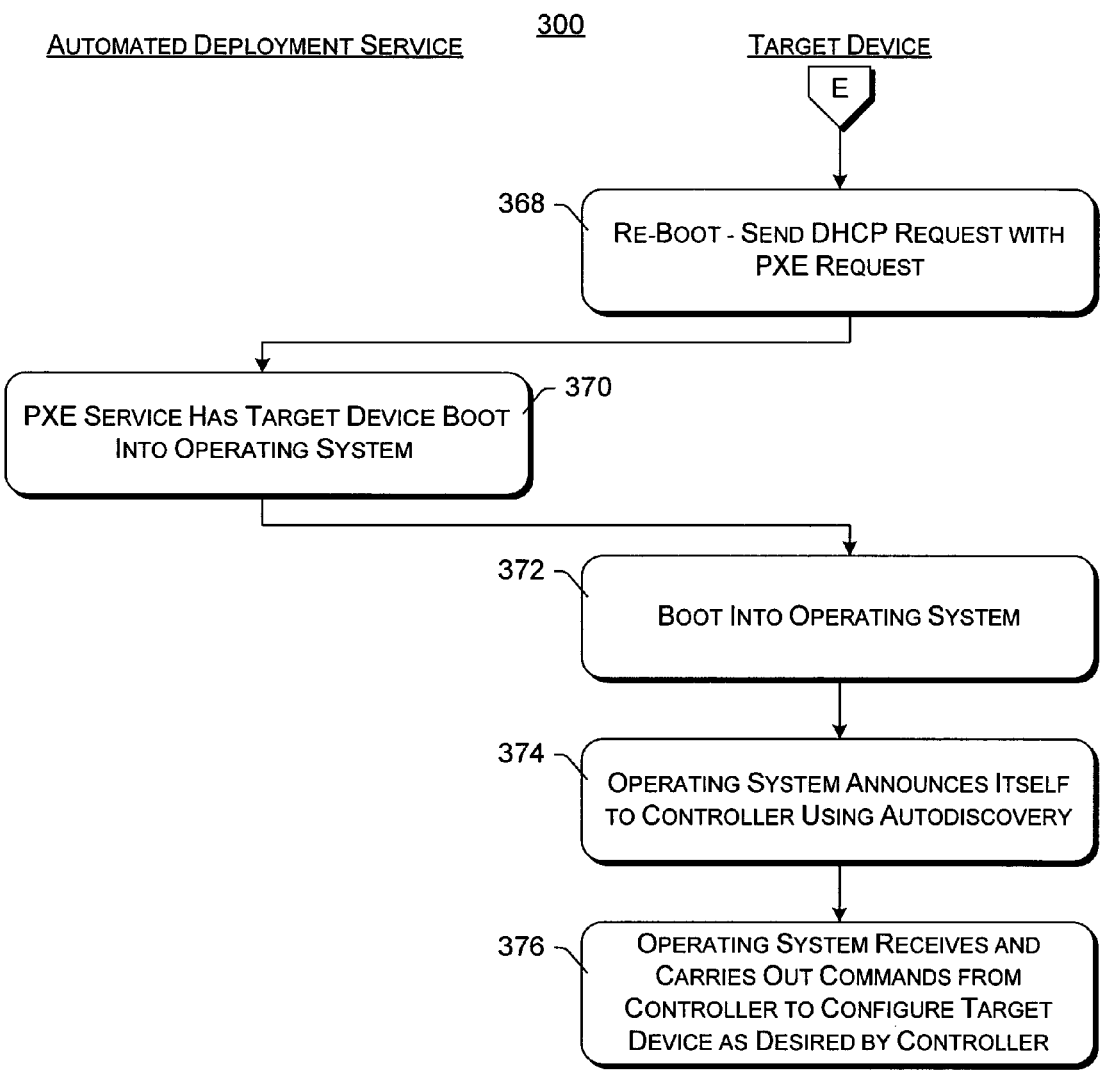

Once the operating system image is downloaded and any additional configuration or personalization commands are received from controller 202, the target device is re-booted again (act 368 of FIG. 5*f*). In one implementation, controller 202 sends a command to the target device to re-boot in act 368.

When the target device is re-booted, it sends out a DHCP request with a PXE request (act 368), analogous to act 302 discussed above. PXE service 220 receives the PXE request and knows that the operating system image has already been deployed on the target device. So, PXE service 220 has the target device boot into the deployed operating system (act 370). In one implementation, PXE service 220 sends, in response to the PXE request, an indication that the target device should boot into the operating system. Alternatively, the target device may be configured to boot into the operating system on its hard disk by default if it does not receive a response to its PXE request within a default period of time. In this alternative, PXE service 220 need not send an indication to the target device to boot into its operating system, but rather let the target device do so by default.

The target device then boots into its operating system (act 372), which is the operating system that has been deployed to the hard disk. The operating system announces itself to auto-discovery component 214 (act 374).

The operating system then receives, and carries out, commands from the controller to configure the target device as desired by the controller (act 376). Such commands may include, for example, commands to install additional programs on the target device, commands to install utilities on the target device (e.g., install a backup utility), commands to configure the operating system (e.g., create user accounts), commands to configure load balancing or applications (e.g., commands to have the target device join an existing application group), commands to have the target device run an executable (e.g., an EXE file), commands to run a script received by the operating system, and so forth.

Thus, it can be seen from FIGS. 5a-5f that a robust automated deployment service allows operating systems to be automatically deployed to computing devices. This automatic deployment can occur on computing devices that are new bare systems (e.g., systems with no operating system installed at all), as well as computing devices that already have operating systems installed. This allows computing devices to be re-purposed (e.g., the functionality of the device to be changed, such as from a web server to a workstation), allows operating systems to be re-installed in the event a computing device is corrupted or suffers a hardware failure, and so forth.

In certain embodiments, when operating systems are being deployed to multiple target devices at approximately the same time, the acts of FIGS. 5a-5f up to downloading of the image file (e.g., acts 302-362) are performed asynchronously, while the image file is downloaded to multiple target devices in parallel or concurrently. After the image file is downloaded, the acts of FIGS. 5a-5f can be continued asynchronously for the multiple target devices. Downloading the image file to multiple target devices in parallel refers to sending the data so that the same data is received by the multiple target devices. This parallel downloading may be accomplished by multicasting the data to the multiple target devices.

By performing a portion of the deployment process asynchronously and another portion of the deployment process in parallel, the efficiency of the use of the network can be improved. Deploying the operating systems to multiple target devices involves transferring data from the automated deployment service to the target devices. Some portions of this data can be transferred asynchronously, while other portions of this data can be transferred in parallel or concurrently. For example, the amount of data transferred over the network when the image file is downloaded is typically much larger than the amount of data transferred over the network at other times (e.g., downloading of the network boot program or the deployment agent). Thus, the operating systems can be deployed out of lock-step up until the point where the large data transfer is to occur, at which point the multiple target devices are in lock-step.

Alternatively, the entire process 300 of FIGS. 5a-5f may be performed across multiple computing devices asynchronously and/or in parallel.

Numerous specific examples are given in the discussion of FIGS. 5a-5f, and it is to be appreciated that these are merely examples and that modifications to the process 300 of FIGS. 5a-5f can be made. For example, a pre-boot component other than PXE could be used. By way of another example, a file server protocol other than TFTP could be used.

Additionally, the description of process 300 discusses identifying a source and a name of an item to be downloaded (e.g., a network boot program, a virtual floppy, a deployment agent loader, a deployment agent). It is to be appreciated that this may be multiple distinct identifiers (one identifier for the source and one identifier for the name), or a single identifier (e.g., a single URL), or the identified source location may have only one file so that the file name is implicit. Furthermore, in certain embodiments components of the target device may already be aware of the source and/or name, so downloading them to the target device is not necessary. For example, the deployment agent loader may already know the source for the deployment agent, or the name for the deployment agent may have been passed to the deployment agent builder service by the deployment agent loader.

Task Sequences

A task sequence is a sequence of steps to be performed in order. Each step can be an operation or another sequence. An operation refers to a single process (e.g., initiated by controller 122 of FIG. 2) to be run on one or more devices (e.g., a script or a program). A sequence can be run on one or more devices 102. Controller 122 of FIG. 2 manages the status of each sequence, allowing each step to be completed successfully before moving onto the next step, for a given device 102. Sequences can include any operation that can be performed on a destination server, including specifying whether the destination server is to boot into a virtual floppy, boot into a deployment agent, or boot into the on-disk operating system.

A task sequence definition is stored in a file on controller 122 of FIG. 2. Alternatively, the task sequence definition could be stored in different manners, such as in a database or across multiple files. The definition can be in accordance with any of a variety of protocols, and in certain embodiments is in accordance with a markup language (e.g., Extensible Markup Language (XML)). The task sequence can thus be readily user-defined.

Task sequences can be used to carry out any of a variety of actions on a computing device. In certain embodiments, task sequences are used to carry out the automatic deployment of operating systems on target devices (e.g., process 150 of FIG. 3 or process 300 of FIGS. 5a-5f discussed above). Task sequences can also be used to carry out actions other than automatic operating system deployment as well. For example, task sequences can be used to install applications other than operating systems on computing devices (e.g., educational or recreational applications, utility applications, word processing applications, database applications, spreadsheet applications, hot fixes or updates to applications or operating systems, and so forth), perform maintenance on computing devices, retrieve and log information from computing devices, and so forth.

Figure 6:
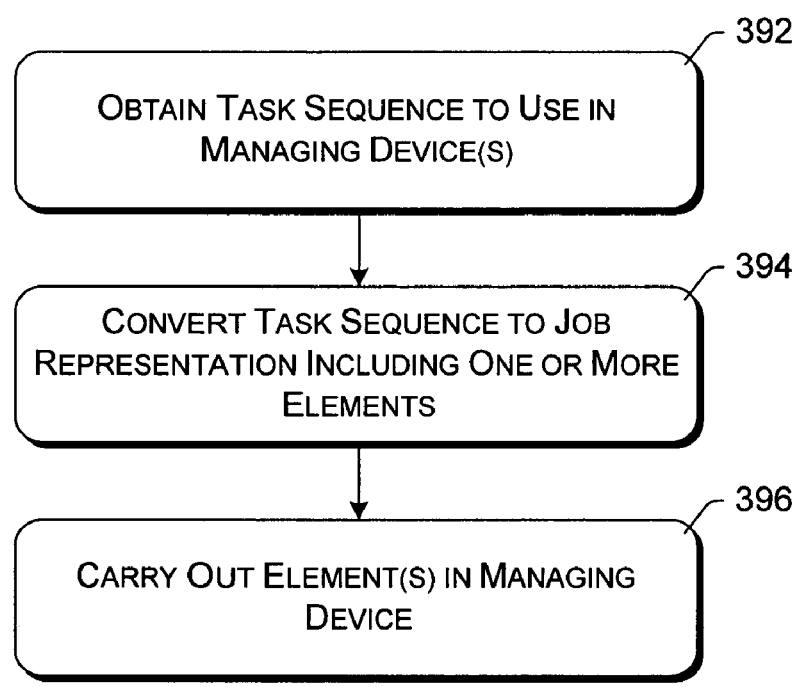
FIG. 6 is a flowchart illustrating an example process of carrying out a task sequence.

FIG. 6 is a flowchart illustrating an example process 390 of carrying out a task sequence. The process of FIG. 6 is performed by controller 122 of FIG. 2, and may be implemented in software, firmware, hardware, or combinations thereof.

Initially, a task sequence to use in managing a device or set of devices is obtained (act 392). The task sequence itself may be passed to controller 122 as a parameter, or alternatively an identifier of (e.g., pointer to) the task sequence may be passed to controller 122 and controller 122 may retrieve it. The particular task sequence obtained in act 392 can be identified by, for example, a user such as a system administrator of the automated deployment service 120 of FIG. 2 (e.g., selected by the user from a multiple possible task sequences), or alternatively can be identified by some other component or device or user. The task sequence can be an XML file, or alternatively any other representation of a series of one or more steps. The task sequence can be user-defined. Any user (e.g., a system administrator of the automated deployment service) can optionally be permitted to define task sequences to be carried out by controller 122.

The task sequence is then converted into a job representation that is to be carried out in managing the device(s) (act 394). The job representation may be, for example, a job tree, as discussed in more detail below. Alternatively, the job representation can be any of a variety of other forms. Regardless of its form, the job representation includes one or more element(s) that correspond to the step(s) of the task sequence. The elements of the job representation may have a one to one correspondence to the steps of the task sequence, or alternatively multiple elements may correspond to a single step of the task sequence, or alternatively multiple steps of the task sequence may correspond to a single element of the job representation. The element(s) of the job representation are then carried out or performed in managing the device(s) (act 396).

Reference is made herein to performing a job and/or steps on a device(s). It should be noted that the job is maintained at the automated deployment service, even when the job is performed on a device(s). However, as part of performing the job, various commands, instructions, data, and so forth may be passed to the device(s) on which the job is being performed, and that device(s) may perform any of a variety of actions based on the received commands, instructions, data, and so forth.

Figure 7:
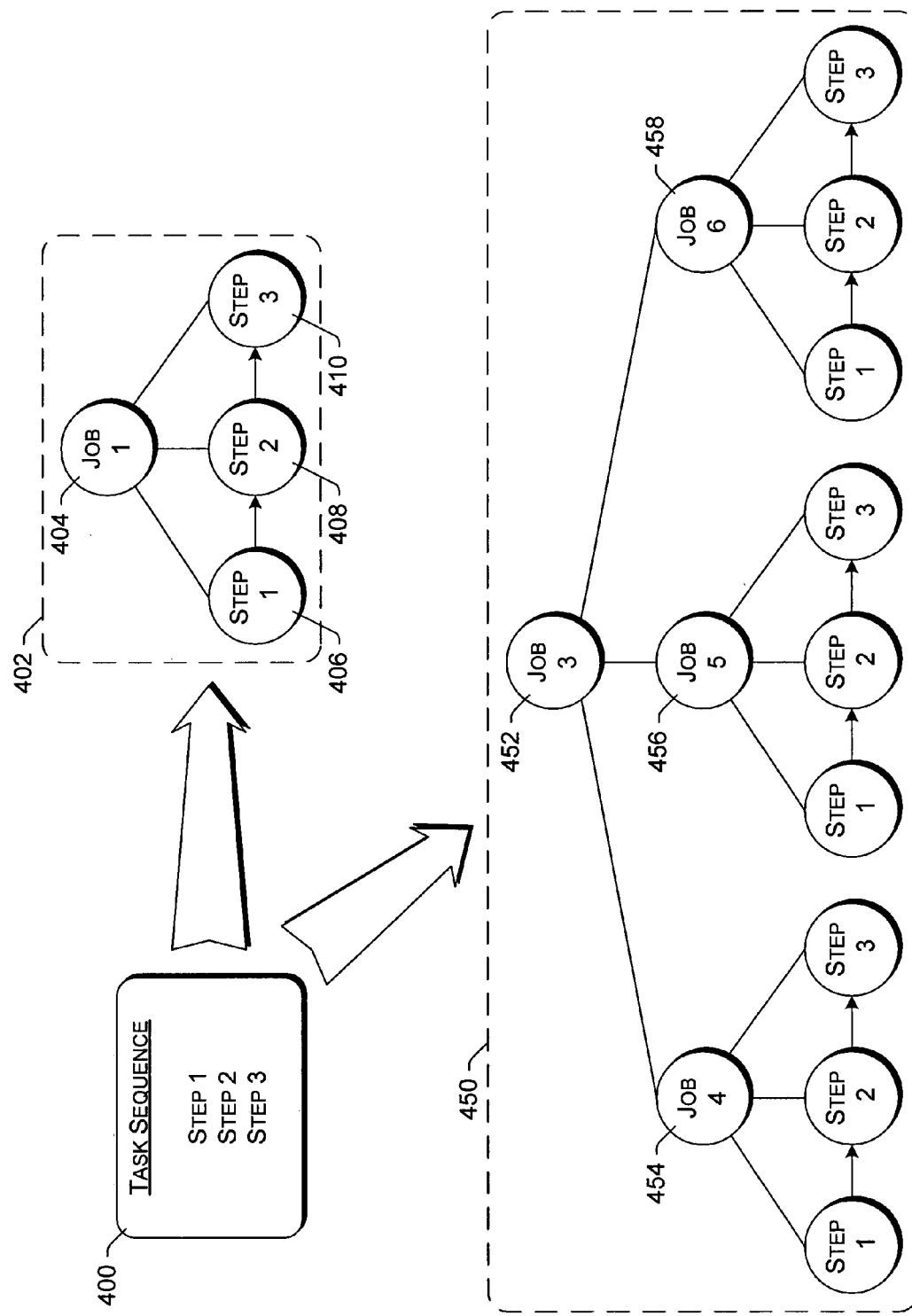
FIG. 7 illustrates an example of task sequences.

FIG. 7 illustrates an example of task sequences. A task sequence 400 is shown that includes three steps (step 1, step 2, and step 3). Task sequence 400 is a file that is maintained by controller 122 of FIG. 2. Task sequence 400 can be generated in any of a variety of manners (e.g., using any of a variety of commonly available editors to generate an XML file). Controller 122 is notified of a particular task sequence to be carried out for a particular device (or set of devices). This notification can be received from a user (e.g., a system administrator of automated deployment service 120) or alternatively another device or component.

Assuming that controller 122 is given a notification that task sequence 400 is to be carried out on a particular device, controller 122 generates a job tree 402 (also referred to as a job graph) for that particular device and task sequence. The job tree 402 includes a job node 404 as a parent node of the tree, and a child node for each step in the task sequence (nodes 406, 408, and 410). The children nodes are processed in tree-order, so that step 1 is performed before step 2, and step 2 is performed before step 3. The job tree can be implemented in any of a variety of manners, and in certain embodiments is implemented using an object model as discussed in more detail below.

The task sequence represented by job tree 402 is performed when the particular device on which the task sequence to be carried out is running on the network. If the particular device is already coupled to the network and running when the notification is received, then the steps of the task sequence can be carried out immediately. This can be determined, for example, by auto-discovery component 214 of FIG. 4 discussed above. However, if the particular device is not already coupled to the network and/or currently running when the notification is received, then the steps of the task sequence are performed when the particular device is booted on the network.

By way of example, job tree 402 may represent an operating system automatic deployment sequence. In this example, referring to FIG. 3 above, node 406 (step 1) refers to act 154 (configure the hardware of the computing device), node 408 (step 2) refers to acts 156 and 158 (download the operating system and re-boot), and node 410 (step 3) refers to act 160 (configure the operating system for the computing device as desired).

Figure 8:
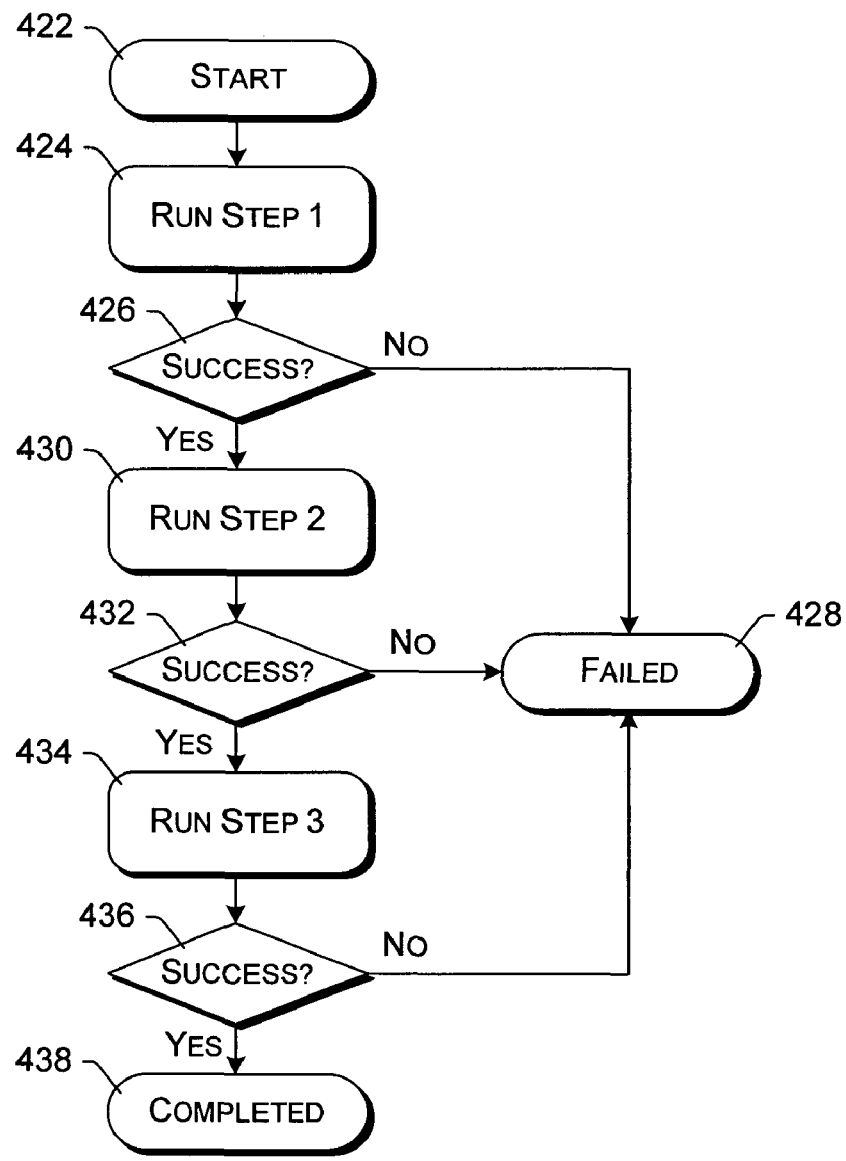
FIG. 8 is a flowchart illustrating an example process of carrying out a task sequence.

FIG. 8 is a flowchart illustrating an example process 420 of carrying out a task sequence. The process of FIG. 8 is performed by controller 122 of FIG. 2, and may be implemented in software, firmware, hardware, or combinations thereof. FIG. 8 is discussed with reference to FIGS. 2 and 3.

Initially, the process is started (act 422). As discussed above, the process may be started when notification that the task sequence is to be performed for a device is received, or when the device is booted on the network. Alternatively, the notification may also include one or more additional conditions or constraints that are to be satisfied before the steps of the task sequence are to be performed (e.g., controller 122 may be notified to wait for some other event to occur, such as some other task sequence to finish, or wait for a particular time or day to perform the steps of the task sequence).

When the process starts, step 1 of the task sequence is run (act 424). A check is then made as to whether step 1 was run successfully (act 426). Controller 122 may be informed explicitly that the step was successfully run, or alternatively implicitly. By way of example, if step 1 is configuring of the hardware of a computing device, then the component on the computing device that is responsible for configuring the hardware of the computing device (e.g., a utility program on a RAM disk of the computing device) can return a result value that serves as an explicit indication to controller 122 whether the configuration was successful. Alternatively, if no such result value is returned, the next time the computing device boots on the network it may notify automated deployment service 120 that it has booted and inquire as to the next step in the automated deployment process (e.g., by sending a PXE request discussed above). If controller 122 receives such a request, it can assume that the hardware configuration has been completed (and thus have been implicitly informed that the step was successfully completed). If controller 122 does not receive such a request within a certain period of time (e.g., a timeout period), then the step is determined to have not run successfully. The timeout period may vary for different steps as well as for different target devices.

If step 1 is not successfully completed, then the task sequence fails (act 428). If the task sequence fails, a notification of the failure may be recorded or announced in some manner. For example, the failure may be logged so that a system administrator can see the failure at a later time when reviewing the log, or an alert may be sent to the system administrator (e.g., an electronic mail (email) message, a text message to a cellular phone or pager, an automated voice telephone call, and so forth).

If, however, step 1 is successfully completed, then step 2 is run (act 430), and a check is then made as to whether step 2 was run successfully (act 432). This check can be performed analogously to act 426 discussed above. If step 2 was not run successfully, then the task sequence fails (act 428).

However, if step 2 is successfuilly completed, then step 3 is run (act 434), and a check is made as to whether step 3 was run successfully (act 436). This check can be performed analogously to act 426 discussed above. If step 3 was not run successfully, then the task sequence fails (act 428). However, if step 3 was run successfuilly, then process 420 completes successfully (act 438).

Returning to FIG. 7, task sequence 400 may also be carried out on a set of devices. Assuming that controller 122 is given a notification that task sequence 400 is to be carried out on a particular set of three devices, controller 122 generates a job tree 450 (also referred to as a job graph) for that particular set of devices and task sequence. The job tree 450 includes a job node 452 as a parent node of the tree, and a child node of job node 452 for each device in the set of devices (nodes 454, 456, and 458). Each of the children nodes 454, 456, and 458 also has a set of children nodes for each step in the task sequence (analogous to job tree 402). The children nodes for each device are processed in tree-order, so that step 1 is performed before step 2, and step 2 is performed before step 3.

Figure 9:
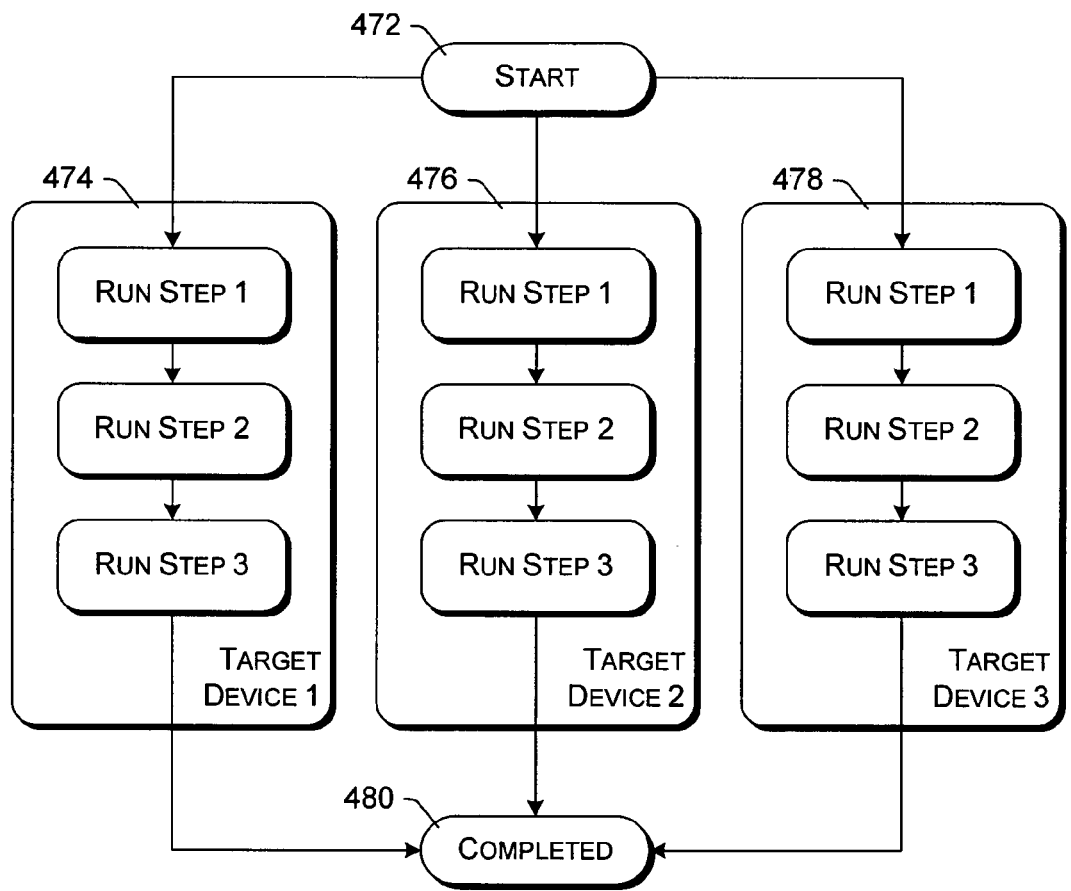
FIG. 9 is a flowchart illustrating an example process of carrying out a task sequence on a set of devices.

FIG. 9 is a flowchart illustrating an example process 470 of carrying out a task sequence on a set of devices. The process of FIG. 9 is performed by controller 122 of FIG. 2, and may be implemented in software, firmware, hardware, or combinations thereof. FIG. 9 is discussed with reference to FIGS. 2 and 3.

Initially, process 470 starts (act 472), analogous to act 422 of FIG. 8. Process 470 may start when all three target devices are booted on the network (and/or already running on the network), or alternatively the task sequence for each device may start when that particular device is booted on the network (and/or already running on the network).

Once started, the three steps are performed for the first target device (act 474), the second target device (act 476), and the third target device (act 478). On each target device, the steps are performed analogous to the steps discussed in acts 424-436 of FIG. 8 above. The three steps for the target devices can be carried out concurrently (e.g., the acts 474, 476, and 478 can all be performed at the same time). However, each act 474, 476, and 478 need not be performing the same step at the same time (e.g., step 1 may be run for the first target device while step 3 is being run for the second target device and step 2 is being run for the third target device). After all three steps are performed (or one of the steps fails) on each of the three target devices, this task sequence is completed (act 480).

Returning to FIG. 7, the job trees can be implemented using a variety of different data structures. In certain embodiments, a jobs table is used to maintain the various elements of each job. A field in the jobs table can then be used to identify a device for which each job in the table is to be performed. The devices themselves are represented in a devices table, and the appropriate entry in the device table for the target device is identified in the jobs table. Additionally, a sets table may be used to identify multiple target devices, and the jobs table can identify a set in the sets table rather than a device in the devices table.

It should be noted that the use of task sequences as described with respect to FIGS. 6-9 above also allow the automated deployment service to maintain a log or record of what operations have been performed on particular devices. For example, controller 122 can keep a log of each task sequence performed on each device (and optionally whether the device was part of a set of devices on which the task sequence was performed). Controller 122 can further keep a record of which steps in which sequences failed (if any).

Table I illustrates an example general format of a task sequence. The example of Table I is illustrated using XML, although other protocols or languages may alternatively be used.

TABLE I

```
<?xml version="1.0" encoding="utf-8" ?>
<sequence command="sample.xml" version="1"
description="Sample sequence"
xmlns="http://schemas.microsoft.com/ads/2003/sequence">
    ... zero or more <task> elements ...
    ... zero or more <sequence> elements ...
</sequence>
```

Various fields of an example of a sequence element are described below in Table II. Various fields of an example of a task element are described below in Table III. It is to be appreciated that the files in Tables II and III are only examples, and that additional fields may be included or some of the fields listed in Tables II and III may not be included.

TABLE II

| Field | Description |
| --- | --- |
| Command Attribute | Includes a reference to the file to be run. In certain implementations, contains the filename of the XML file. |
| Parameters Attribute | Includes optional arguments used by the file specified in the Command Attribute. |
| Description Attribute | Includes comment/remarks text. |
| Version Attribute | Version of the task sequence file. |
| xmlns Attribute | The default namespace for child elements. |

TABLE III

| Field | Description |
| --- | --- |
| Timeout Attribute | Specifies the timeout period for this step. |
| DoesReboot Attribute | Boolean value indicating whether this step will cause a reboot of the device. |
| Description Attribute | Includes comment/remarks text. |
| Command - Delivery Attribute | Specifies the mode in which the command is transferred to the target device. In one implementation is either "none" or "bmcp" (none indicates that the command file path is sent to the target to run, and bmcp indicates that the command file content is sent to the target to run). |
| Command - Target Attribute | Specifies the target on which the command will be executed. In one implementation is either "device" or "controller". |
| Parameter | Parameter to be used for this step. Multiple parameters may optionally be included for a single step. Variables (e.g., text between $ symbols) can optionally be used. |

Object Model

In certain embodiments, various information regarding devices being managed by a controller (e.g., controller 202 of FIG. 4) and task sequences is maintained using an object model. In the example of FIG. 4, these objects are an object model of database 216 that allow retrieval (e.g., by a system administrator or other user, or alternatively another component or device) of information from database 216 by way of WMI interface 210. Accessing these objects allows, for example, task sequences to be performed for particular devices or sets of devices.

It is to be appreciated, however, that the various information regarding devices being managed by a controller and task sequences can be retrieved in other manners using any of a variety of components other than these objects, and the information may be stored in a manner other than a relational database. For example, a database or table of information may be maintained, and one or more software modules, procedures, and/or functions made available that operate on the database or table and information contained therein.

Figure 10:
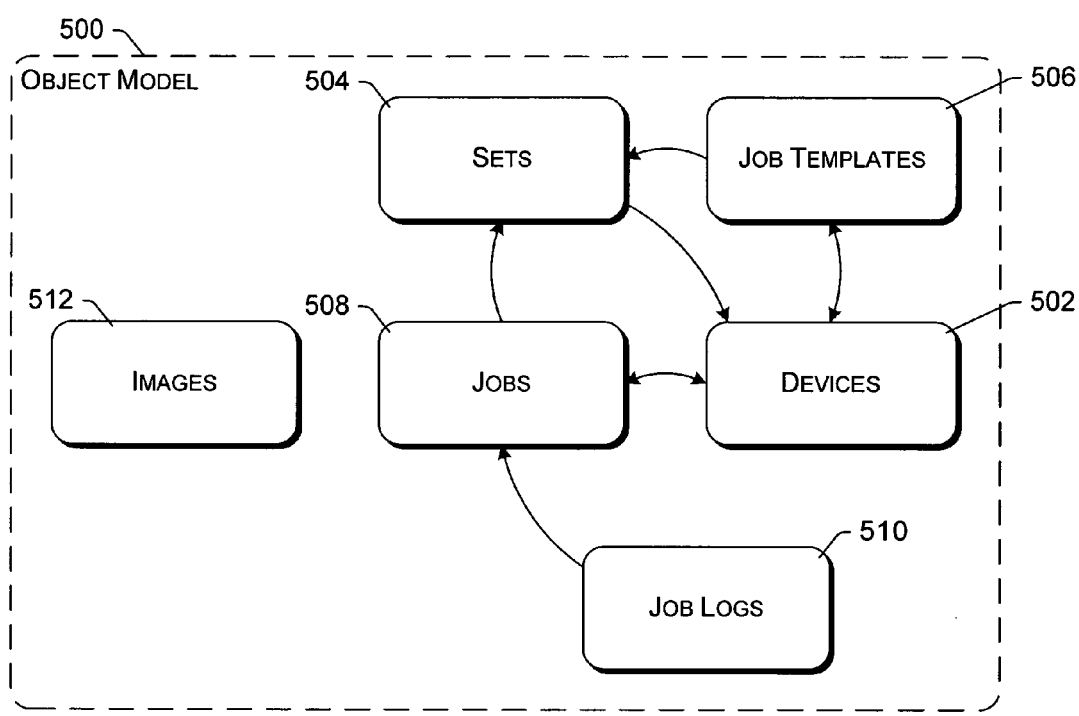
FIG. 10 illustrates an example object model that can be used in maintaining information regarding task sequences for devices.

FIG. 10 illustrates an example object model 500 that can be used in maintaining information regarding task sequences for devices. The object model 500 includes six types of objects: Devices objects 502, Sets objects 504, Job Templates objects 506, Jobs objects 508, Job Logs objects 510, and Images objects 512. Example properties and methods of these objects 502-512 are shown in Tables IV-XVII below.

Devices objects 502 represent physical devices in the network environment, such as computing devices, controllers (or other components of the automated deployment service), routers, and so forth. In certain embodiments, devices objects may also support describing the physical and/or logical arrangement of the devices. Each Devices object 502 may also identify a Jobs object 508 corresponding to a job currently being performed for the device, and/or a Job Templates object 506 corresponding to a job to be performed for the device.

A Sets object 504 represents a collection of devices. Each Sets object 504 identifies one or more other Sets objects 504 and/or one or more Devices objects 502. Each set has a unique name, and may contain n one, or multiple devices and/or other sets. A given device may be in multiple sets. Sets are represented on the controller; the devices (including those within a set) typically have no knowledge of what sets they are in, and are not informed when they are added or removed from sets.

Job Templates objects 506 are job definitions (task sequences) available to be performed, but that are not currently being performed. Each Job Templates object 506 may also identify one or more Devices objects 502 and/or one or more Sets objects 504 on which a task sequence is to be performed in the event the device(s) and/or sets(s) become available (e.g., are booted on the network). A job template may be a 'simple' job (such as a script or program to run), or a list of simple jobs (called a task sequence). Each template has a unique name used to identify it.

Jobs objects 508 are representations of jobs in progress or jobs that have already completed. The Jobs object 508 stores the basic information, such as the description, job type, target, command and parameters. Each job is linked to one or more instances of the Jobs object. Each Jobs object 508 may also identify one or more Devices objects 502 and/or one or more Sets objects 504 on which a task sequence is to be performed in the event the device(s) and/or sets(s) become available (e.g., are booted on the network).

Job Logs objects 510 capture the output of jobs. The Job Logs objects 510 provide a record of jobs that have been run. Each Job Log is associated with a Jobs object 508, and each Jobs object 508 may be associated with multiple Job Logs objects 510. Each Job Logs object 510 identifies the Jobs object 508 that it is associated with.

An Images object 512 represents a captured volume that is available to be deployed. It might be, for example, an operating system volume captured after sysprep which can be deployed to multiple servers, an operating system volume captured without sysprep which can be deployed to a single server, or a data volume. An images object 512 can be referenced as part of the parameters field of a Jobs object 508 or a Job Templates object 506.

Example properties of the Devices object are shown in Table IV. These properties illustrated in Table IV are exposed in the WMI interface (e.g., WMI interface 210 of FIG. 4). In certain embodiments, some properties may not be exposed in the WMI interface (e.g., the ID property may not be exposed). Example methods of the Devices object are shown in Table V. These methods illustrated in Table V are exposed in the WMI interface (e.g., WMI interface 210 of FIG. 4). In certain embodiments, some methods may not be exposed in the WMI interface.

TABLE IV (Devices Object Properties)

| Property | Format | Description |
|---|---|---|
| ID | Integer | Identifier for this device. |
| Name | String | Name of the target device and/or the IP address of the administrative interface. |
| Control | Integer | Whether this device is controlled by this controller. If set to TRUE, the controller will respond to PXE requests from this device and can run jobs on this device. True = device is controlled by this controller False = device is not controlled by this controller |
| State | Integer | State of the connection to the target device. (e.g., 0 = Disconnected (or device is not running agent software); 1 = Connected to pre-OS (e.g., deployment agent or network boot program); 2 = Connected to full OS (e.g., operating system image has been download and is running)) |

TABLE IV-continued

(Devices Object Properties)

| Property | Format | Description |
| --- | --- | --- |
| AdminIPAddr | String | Network address (e.g., IP address) of administrative interface of the device (e.g., as supplied by auto-discovery). Used for communication with the device. |
| CurrentJobID | Big Integer | Job ID of the currently running PXE job. |
| JobTemplate | String | Job to run when a PXE request comes in from this device, if no PXE job is running. |
| LastDiscoveryTime | Datetime | Time last discovery packet was received from the device. |
| ADSService | Integer | Whether this device hosts an ADS service (e.g., 0 = No; 1 = Hosts the controller service; 2 = Hosts the PXE Service; 4 = Hosts the Image Service). If multiple services are hosted on the same device, this value is set to the sum of the numbers above. |
| Description | String | A description of the device. |

TABLE V

(Devices Object Methods)

| Method | Description |
| --- | --- |
| Manage | Places the device into either a controlled or an uncontrolled state. Includes a ControlFlag input parameter that is the value that specifies how to manage the device. |
| SetAdminIPAddr | Sets the administration network address (e.g., IP address) for the device. Includes an IPAddr input parameter that is the administration network address for the device. |
| SetJobTemplate | Sets the default job template for the device. Includes an input parameter that is to be the default job template for the device. |
| Execute | Executes a command on the device, and then returns the job identifier relating to the parent job. Optionally includes one or more of: a Command input parameter that is the path of the command to be executed, a Parameters input parameter that is the parameter(s) to be passed to the executing command, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the device. |

Example properties of the Sets object are shown in Table VI. Associated with the Sets object is a SetDevice object and a SetChildSet object, examples of which are shown in Tables VII and VIII, respectively. These properties illustrated in Tables VI, VII, and VIII are exposed in the WMI interface (e.g., WMI interface 210 of FIG. 4). In certain embodiments, some properties may not be exposed in the WMI interface (e.g., the ID property may not be exposed).

Each instance of a Sets object represents a single set, and is exposed as the Sets WMI class. Each instance of a SetDevice object represents a device member of a set, and is exposed as the SetToDevice association class. Each instance of a SetChildSet object represents a set member of a set, and is exposed as the SetToSet association class.

Example methods of the Sets object are shown in Table IX. These methods illustrated in Table IX are exposed in the WMI interface (e.g., WMI interface 210 of FIG. 4). In certain embodiments, some methods may not be exposed in the WMI interface.

TABLE VI

(Sets Object Properties)

| Property | Format | Description |
| --- | --- | --- |
| ID | Integer | Identifier for this set. |
| Name | String | Name of the set. |
| Description | String | Description of the set. |

TABLE VII

(SetDevice Object Properties)

| Property | Format | Description |
| --- | --- | --- |
| SetID | Integer | Identifier of a Sets object. |
| DeviceID | Integer | Identifier of a Devices object. |

TABLE VIII

(SetChildSet Object Properties)

| Property | Format | Description |
| --- | --- | --- |
| SetID | Integer | Identifier of a Sets object. |
| ChildSetID | Integer | Identifier of a Sets object. |

TABLE IX

(Sets Object Methods)

| Method | Description |
| --- | --- |
| AddDevice | Adds a device as a member of the set. Includes an input parameter that is the path reference to the device to add as a member of the set. |
| RemoveDevice | Removes a device from the set. Includes an input parameter that is the path reference to the device to remove from the set. |
| AddSet | Adds a set as a member of the set. Includes an input parameter that is the path reference to the set to add as a member of the set. |
| RemoveSet | Removes a set from the set. Includes an input parameter that is the path reference to the set to remove from the set. |
| Rename | Renames the set name to the name specified. Includes an input parameter that is the new name for the set. |

TABLE IX-continued (Sets Object Methods)

| Method | Description |
|---|---|
| Execute | Runs a job on the devices in the set. If the job started successfully, the method returns the job identifier of the parent job. Optionally includes one or more of: a Command input parameter that is the path of the command to be executed, a Parameters input parameter that specifies the arguments given when the job is started, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the devices in the set. |
| List-Member Devices | Retrieves the list of descendent member devices. Since a set can contain nesting of sets, this method will walk through the child member sets and retrieve their member devices and enumerate the list of devices. Includes a Devices output parameter that is the array of the Devices instances that are members of the descendent set members. |

Example properties of the Job Templates object are shown in Table X. These properties illustrated in Table X are exposed in the WMI interface (e.g., WMI interface 210 of FIG. 4). In certain embodiments, some properties may not be exposed in the WMI interface. Example methods of the Job Templates object are shown in Table XI. These methods illustrated in Table XI are exposed in the WMI interface (e.g., WMI interface 210 of FIG. 4). In certain embodiments, some methods may not be exposed in the WMI interface.

TABLE X (Job Templates object Properties)

| Property | Format | Description |
|---|---|---|
| Name | String | Identifier for the JobTemplates object. |
| TargetType | Integer | Type of the target, such as sets or devices (e.g., 0 = Undefined; 1 = Sets; 2 = Devices; 3 = Controller). |
| TargetName | String | Name of the target, such as sets or devices, on which the job is to be invoked. |
| JobWillReboot | Integer (bitfield) | Specifies whether the job will reboot the device(s) on which it runs. |
| TimeOut | Integer | Specifies the timeout value for the job. |
| Delivery | Integer | Specifies the mode in which the command is delivered to the target devices (e.g., "none" or "bmcp"). |
| Command | ntext | Command that is to be executed on the target object. |
| Parameters | ntext | Parameters passed to the job command that is to be executed. |
| Description | String | Description of the job that was invoked. |

TABLE XI (Job Templates object Methods)

| Method | Description |
|---|---|
| Execute | Runs a job using either template values or the optional in parameters if supplied. If the job started successfully, the method returns the job identifier of the job. Optionally includes one or more of: a TargetType input parameter that is the type of the target on which the command is to be run, a TargetName input parameter that is the name of the target on which the command is to be run, a Command input parameter that is the path of the command to be executed, a Parameters input parameter that is the parameter(s) to be passed to the executing command, a Description input parameter that is the description for the executing command which is to be logged, a Delivery input parameter that specifies the mode of delivering the command to the target device (e.g., "none" or "BMCP"), a Timeout input parameter that specifies the period of time that the controller will allow for this command to complete, and a JobWillReboot input parameter that specifies whether the job to be executed will reboot the device(s) on which it runs. |

The Jobs object is described as being separated into two objects, the JobInvocations object and the Jobs object, although alternatively these two objects can be combined into a single object. These two objects may optionally be exposed as the single WMI class Jobs. In certain embodiments, the JobInvocations object is the object that stores the tasks and/or sequences (e.g., of Table I above) to be performed. Example properties of the JobInvocations object are shown in Table XII, and example properties of the Jobs object are shown in Table XIII. These properties illustrated in Table XIII are exposed in the WMI interface (e.g., WMI interface 210 of FIG. 4). In certain embodiments, some properties may not be exposed in the WMI interface. Example methods of the Jobs object are shown in Table XIV. These methods illustrated in Table XIV are exposed in the WMI interface (e.g., WMI interface 210 of FIG. 4). In certain embodiments, some methods may not be exposed in the WMI interface.

TABLE XII (JobInvocations Object Properties)

| Property | Format | Description |
|---|---|---|
| ID | Integer | Used internally by the controller to identify the particular JobInvocations object. |
| Delivery | Integer | Specifies the mode in which the command is delivered to the target devices. |
| Command | ntext | The job command that is to be executed on the target object. |
| Parameters | ntext | Parameters passed to the job command that is to be executed. |
| Description | String | Description of the job that was invoked. |

TABLE XIII (Jobs Object Properties)

| Property | Format | Description |
| --- | --- | --- |
| JobID | Big integer | Identifier for the job that has been executed. If the same job executes again, it yields a different identifier. |
| ParentJobID | Integer | Identifier for the job which originates the job on the targets. For the root job, the identifier will be 0 and for other jobs, the identifier uses the identifier of the root job. |
| JobInvocationID | Integer | Identifier of a JobInvocation object. |
| Type | integer | Identifies the type of the job that has been executed. An example bit map is:<br>Bit 1: 0 = leaf node (no children); 1 = non-leaf node<br>Bit 2: 0 = parallel execute children; 1 = serial execute children<br>Bit 3: 0 = command does not do a reboot; 1 = command does a reboot so no completion status should be expected |
| State | Integer | Indicates the status of the task (e.g., 1 = Created; 2 = Ready to Run; 3 = Running; 4 = Completed-Success; 5 = Completed-Error; 6 = Canceled; 7 = Stopped; 8 = Unable to start; 9 = Failed; 10 = Timed Out) |
| ExitCode | Integer | The exit code returned from the job. This only has meaning if State is Completed-Success |
| StartTime | Datetime | Time stamp when task was started. |
| EndTime | Datetime | Time at which this task was completed. |
| TimeOut | Integer | Indicates the timeout value for the job. |
| TargetType | Integer | Type of the target such as set(s) or device(s). |
| TargetName | Integer | Name of the target such as set(s) or device(s), on which the job is to be invoked. |
| Username | String | Specifies the user that started the job. |

TABLE XIV (Jobs Object Methods)

| Method | Description |
| --- | --- |
| Stop | Stops a job that is in progress. |
| GetOutput | Retrieves the output from the job log and yields the collective result. Includes an OutputType input parameter that is the type of output to be retrieved from the job log (e.g., get the standard output, get the standard error, get all output), a Start input parameter that is the offset of the first character to return, a Length input parameter that is the number of characters to return, and an Output parameter that is the output retrieved from the job log. |
| GetOutputSize | Returns the number of characters in the output of the given type. Includes an OutputType input parameter that is the type of output to be retrieved from the job log (e.g., get the standard output, get the standard error, get all output), and an Output parameter that is the total number of characters in the output of the type specified by the OutputType parameter. |
| StartSequence | Starts the sequence at the step with the given Job ID. This is only valid on a jobs object that represents a sequence that failed executing on a single target or is yet to be run. Includes a StepJobID input parameter that is the job node from which the sequence is to be executed. |
| ClearJobHistory | Deletes a job that is started before StartedBefore and started after StartedAfter timestamp and returns the number of jobs deleted. If any one of the input parameter is omitted, the job history is cleared based on the input parameters provided. Includes a StartedAfter input parameter which is the time after which the job started, and a StartedBefore input parameter which is the time before which the job started. |
| ArchiveJob | Archives a job as a data stream (e.g., an XML data stream). This method works only on the root job instances. It retrieves the root job and its child jobs and their data is transformed into a data stream as output. |
| ValidateSequence | Validates the input sequence xml file with the optional xslt file against the sequence xml schema. This helper method will be useful in checking the input xml before executing sequence. Includes a SequencePath input parameter that is the path of the task sequence to be run, a StylesheetPath input parameter that specifies the path of the style sheet that transforms the multiple sequence modules into single sequence, and a Description output parameter that specifies the error description if the sequence validation fails. |

Example properties of the Job Logs object are shown in Table XV. These properties illustrated in Table XV are exposed in the WMI interface (e.g., WMI interface 210 of FIG. 4). In certain embodiments, some properties may not be exposed in the WMI interface.

TABLE XV (Job Logs Properties)

| Property | Format | Description |
| --- | --- | --- |
| JobID | Integer | Identifier for the job that has been executed. |
| Sequence | Integer | Sequence of the output from the job that was executed on the device under consideration. |
| LogTime | Datetime | Time at which the controller device received output. |
| OutputType | Integer | Specifies the type of output in this instance of JobLogs (e.g., standard output or standard error). |

TABLE XV-continued (Job Logs Properties)

| Property | Format | Description |
| --- | --- | --- |
| OutputData | ntext | Output from the job on the device. The sequence property can be used to recreate the output from this job on this device in correct order. |

Example properties of the Images object are shown in Table XVI. These properties illustrated in Table XVI are exposed in the WMI interface (e.g., WMI interface 210 of FIG. 4). In certain embodiments, some properties may not be exposed in the WMI interface. Example methods of the Images object are shown in Table XVII. These methods illustrated in Table XVII are exposed in the WMI interface (e.g., WMI interface 210 of FIG. 4). In certain embodiments, some methods may not be exposed in the WMI interface.

TABLE XVI (Images Properties)

| Property | Format | Description |
| --- | --- | --- |
| GUID | String | Identifier of the image. |
| Name | String | Friendly name (identifier) of the image. |
| Description | String | Description of the image. |

TABLE XVII (Images Methods)

| Method | Description |
| --- | --- |
| Add | Adds the image specified by the SourcePath to the repository of Image Server, reads the system properties of the image being added, and creates the related ImageVariables object with the properties as name-value pair. Includes a Name input parameter that is the friendly name that identifies the image being added to the image repository, a SourcePath input parameter that is the path of the source that is to be copied to the image repository, and a Description input parameter that is the description of the image to be added to the image repository. |
| Retrieve | Retrieves the image specified from the image repository and places the retrieved image on the destination specified by the DestinationPath parameter. Includes a DestinationPath input parameter that is the path where the image is to be copied to. |
| Rename | Renames the image name to the name specified. Includes an ImageName input parameter that provides the new name for the image. |

Example Implementation of Object Model

This section describes an example implementation of an object model that can be used with the automated deployment service and task sequences described herein. The object model described in this section makes reference to data centers, although the object model is also applicable to other network environments. It is to be appreciated that the example object model described in this section is only an example of objects that can be used with the automated deployment service and task sequences described herein, and that various modifications can be made to the example description in this section.

1 Error Checking

In general, methods do not return a value. The caller can determine whether a method (or other WMI operation) failed using a language-specific method.

In VBScript and Visual Basic, this is done by checking the value of the Err object. In Jscript (version 5.0 and higher) it is done by wrapping the call in a try...catch clause then looking at the exception object.

An example of checking for an error in VBS and displaying both the error number and message is given below:

```
If Err Then
    If Err.Description <> "" Then
        WScript.Echo "Error: " & Err.Description & " (" & hex(Err.Number) & ")"
    Else
        Set objWbemErr = CreateObject("WbemScripting.SWbemErrorObject")
        WScript.Echo "Error: " & objWbemErr.Description & " (" &
                    hex(objWbemErr.StatusCode) & ")"
    End If
End If
```

In general, any WMI operation (such as getting an instance of an object, or executing a method) can return one of three types of errors:

- Native COM errors
- Native WMI errors
- ADS-specific errors

Native COM and native WMI errors are returned as an error number and error description in the native language error object. In VBS, this is Err. The error number is returned in Err.Number and the description in Err.Description.

MDM-specific errors are returned by setting the Err.Number field to a non-zero value (the values that this can be set to are described below), and Err.Description to an empty string. If the results of a WMI operation are a non-zero Err.Number and an empty Err.Description, the error is an MDM-specific error. The caller can instantiate the WMI object WbemScripting.SWbemLastError to get the error description (in the Description property of this object).

1.1 NATIVE COM AND NATIVE WMI ERRORS

Native WMI error codes are defined in the WMI SDK. The errors that can be returned for each WMI operation are listed in the SDK.

Native COM errors that can be returned by MDM WMI operations are:

- E_FAIL
- E_UNEXPECTED
- E_NOINTERFACE

- E_INVALIDARG

- E_OUTOFMEMORY

All indicate internal problems processing the operation.

1.2 ADS-SPECIFIC ERRORS

The ADS-specific errors that can be returned by each WMI operation are listed in the WMI Object reference section of this example object model for each class and method.

The Error Status Code column above gives the value of the Err.Number property is set to after the WMI operation returns. The value of the WbemScripting.SWbemLastError StatusCode field will be set to the last four digits of the same value. For example, say a WMI operation caused a SAC_E_DatabaseOpenError to occur, then the following code:

```
If Err Then
    WScript.Echo "Err.Number=" hex(Err.Number)
    If Err.Description <> "" Then
        Set objWbemErr = CreateObject("WbemScripting.SWbemErrorObject")
        WScript.Echo "SWbemLastError.StatusCode=" & hex(objWbemErr.StatusCode)
    End If
End If
```

Would output

```
Err.Number=80040801
SWbemLastError.StatusCode=801
```

1.2.1 ADS-Specific Error Reference

The table below lists all the ADS-specific errors that can be returned by WMI operations. The description field contains the text that can be stored in the WMI LastError object's Description property after the error has occurred.

| Error Status Code | Error Symbolic Name | Description |
| --- | --- | --- |
| 80040801 | MDM_E_DatabaseOpenError | Failed to open database. |
| 80040802 | MDM_E_DatabaseSessionOpenError | Failed to create database session. |
| 80040803 | MDM_E_SqlQueryError | Failed to execute a SQL query. |
| 80040804 | MDM_E_SqlCommandError | Failed to execute a SQL command. |
| 80040805 | MDM_E_StringEmpty | One or more string arguments are empty. |
| 80040806 | MDM_E_StringTooLong | One or more string arguments are too long. |
| 80040807 | MDM_E_InvalidType | The Delivery or TargetType parameter of the job is not valid, or this type of job cannot be started. |
| 80040808 | MDM_E_InvalidCommand | Invalid command (syntax or namespace), or delivery type is invalid. |
| 80040809 | MDM_E_InvalidTypeForBinary | The specified delivery type does not support binary |

| | | files. |
|---|---|---|
| 8004080A | MDM_E_JobTemplateNotExists | The job template does not exist. |
| 8004080B | MDM_E_JobTemplateAlreadyExists | The job template already exists. |
| 8004080C | MDM_E_SetAlreadyInSet | The set is already a member of the set. |
| 8004080D | MDM_E_SetNotInSet | The set is not a member of the set. |
| 8004080E | MDM_E_SetDeadCircle | The set cannot be added because it creates a circular reference. |
| 8004080F | MDM_E_DeviceAlreadyInSet | The device is already a member of the specified set. |
| 80040810 | MDM_E_DeviceNotInSet | The device is not a member of the specified set. |
| 80040811 | MDM_E_CannotRemoveControlledDevice | The device is controlled and cannot be removed. |
| 80040813 | MDM_E_DeviceNotControlled | The device is not currently controlled. |
| 80040817 | MDM_E_JobNotFound | The job does not exist. |
| 80040818 | MDM_E_JobAlreadyStopped | The job is already stopped. |
| 80040819 | MDM_E_FileNotExists | The file could not be found. |
| 8004081A | MDM_E_FileOpenError | The file could not be opened. |
| 8004081B | MDM_E_FileReadError | Cannot read file. |
| 8004081C | MDM_E_TimerError | The ADS Controller service encountered an error with the system timer. Either free resources or reboot. |
| 8004081E | MDM_E_CreateBmcpMessageError | The BMCP message could not be created. |
| 8004081F | MDM_E_BadXmlMessage | The ADS Controller received an invalid message from the device. |
| 80040820 | MDM_E_BadBmcpMessage | The ADS Controller received an invalid BMCP message from the device. |
| 80040822 | MDM_E_SaagentResponseVersionError | The device could not perform the operation because of a protocol version mismatch. |
| 80040823 | MDM_E_AgentUnavailable | The device could not perform the operation because the resource was unavailable on the device. |
| 80040824 | MDM_E_BmonitorResponseFail | The device or service could not perform the requested operation. |
| 80040825 | MDM_E_LoadCertificateError | The ADS Controller could not load the ADS root and controller certificate from the certificate store. |
| 80040830 | MDM_E_DeviceCountOverLimit | The newly discovered device can't be added to the database, because the database already contains the maximum number of devices. |
| 80040831 | MDM_E_JobUnableToStart | The job cannot be started. |
| 80040832 | MDM_E_ParentJobNotExists | The parent job ID does not exist. |
| 80040834 | MDM_E_IsNotRootJob | You need to specify the root job ID to perform the operation. |
| 80040835 | MDM_E_JobNotExist | The job ID does not exist. |
| 80040836 | MDM_E_SprocError | Failed to create the job because of an error with a stored procedure. |
| 80040838 | MDM_E_MessageCountOverLimit | There are too many incoming messages to begin a new job. Please wait until one or more jobs have completed and try again. |
| 80040839 | MDM_E_VariableNotExists | The variable could not be found. Use $$ to escape the $ character where a variable is not intended. |
| 8004083A | MDM_E_VariableAlreadyExists | This variable already exists. |
| 8004083B | MDM_E_DeviceNotExists | The device does not exist. |
| 8004083C | MDM_E_DeviceAlreadyExists | The device already exists. |
| 8004083D | MDM_E_SetNotExists | The set does not exist. |
| 8004083E | MDM_E_SetAlreadyExists | The set already exists. |
| 8004083F | MDM_E_JobNotExists | The job does not exist. |
| 80040840 | MDM_E_ServiceNotExists | The service does not exist. |

| | | |
|---|---|---|
| 80040841 | MDM_E_ServiceAlreadyExists | The service already exists. |
| 80040842 | MDM_E_DeviceHWAddrAlreadyExists | The device hardware address already exists. |
| 80040843 | MDM_E_DeviceHWAddrNotExists | The device hardware address does not exist. |
| 80040847 | MDM_E_TaskSequenceRunning | The job cannot be started because a task sequence is already running. |
| 80040849 | MDM_E_ImageNotExists | The image does not exist. |
| 80040850 | MDM_E_SequenceXmlLoadFailed | Failed to load the task sequence XML document. |
| 80040851 | MDM_E_SequenceXsltLoadFailed | Failed to load the task sequence style sheet (XSLT) document. |
| 80040852 | MDM_E_SchemaValidationFailed | The task sequence document could not be validated with the schema. |
| 80040853 | MDM_E_PxeJobNotExists | No PXE action has been specified for this device. The ADS controller is unable to respond to the PXE boot request. |
| 80040855 | MDM_E_StopJobWarning | The ADS controller could not stop the job on the device, but changed the job state to "stopped by user" in database. |
| 80040856 | MDM_E_ImageAlreadyExists | The image already exists. |
| 80040857 | MDM_E_SystemVarNotCreatable | Cannot create or delete system variables. |
| 80040858 | MDM_E_ImgServerShareNotExists | The image server share name does not exist. |
| 80040859 | MDM_E_SetEmpty | The set contains no member devices. |
| 80040860 | MDM_E_SystemVarNotUpdatable | Cannot edit a read-only system variable. |
| 80040861 | MDM_E_InputValidationFailed | Failed to validate the command syntax in the task sequence XML document. |
| 80040862 | MDM_E_InvalidParameter | The parameter is empty or uses invalid data. |
| 80040863 | MDM_E_ExcessiveParameter | The parameter size exceeds the maximum allowable size. |
| 80040865 | MDM_E_JobStoppedByUser | The job is stopped by user. |
| 80040866 | MDM_E_JobTimeout | The job timed out. |
| 80040867 | MDM_E_JobFailsByTargetReboot | The job failed to run because the device was rebooted. |
| 80040868 | MDM_E_InvalidServiceType | The service type is invalid. |
| 80040869 | MDM_E_JobRunningOnDevice | Cannot perform this operation while a job is running on this device. |
| 80040870 | MDM_E_VariableTooLong | The variable name is too long. |
| 80040871 | MDM_E_VariableValidationFailed | The variable name cannot be validated. |
| 80040872 | MDM_E_ControllerNotReady | The ADS controller is not ready to run the job. |
| 80040873 | MDM_E_FileXferStartFail | The file transfer failed to start. |
| 80040874 | MDM_E_XMLVersionIncorrect | The XML version is incorrect. |
| 80040875 | MDM_E_CryptVariableValue | Could not encrypt or decrypt the variable value. |
| 80040876 | MDM_E_CryptInit | Failed to initialize the encryption object. |
| 80040877 | MDM_E_InvalidString | One or more string value contains illegal or reserved characters. |
| 80040878 | MDM_E_StartDiscovery | Failed to start discovery. |
| 80040879 | MDM_E_TemplateNameEmpty | The name property of job template is empty. |
| 80040880 | MDM_E_JobLogNotExists | The job log does not exist. |
| 80040881 | MDM_E_NoExitStatus | No exit status is available. |
| 80040882 | MDM_E_InvalidOutputType | The output type is not valid. |
| 80040883 | MDM_E_CannotAddEncryptedImage | Cannot add an encrypted image. |
| 80040885 | MDM_E_NoBmcpConnection | Device or service connection does not exist. |
| 80040886 | MDM_E_NotPreOSMode | The operation cannot be completed. The device is not in the Deployment Agent mode. |
| 80040887 | MDM_E_FileXferUsage | A description of the syntax of the bmfilexfer.exe command that is used to copy a file from the Controller to a controlled device. |

| | | |
|---|---|---|
| 80040888 | MDM_E_SaagentUnavailable | The ADS Administration Agent service was unavailable. |
| 80040889 | MDM_E_PxesvcUnavailable | The ADS PXE Network Boot service is unavailable. |
| 80040890 | MDM_E_ImgsvcUnavailable | The ADS Image Distribution service was unavailable. |
| 80040891 | MDM_E_CannotRemoveDeviceServiceOn | Cannot remove a device that is associated with an ADS service. You must first remove the ADS service from the device. |
| 80040892 | MDM_E_XML_TransformationFailed | XML Transformation failed. |
| 80040893 | MDM_E_NoCertInstalled | Failed to connect to the remote computer because of certificate issues. Also check the date on the target computer. |
| 80040894 | MDM_E_InvalidTimeout | The job timeout value is out of range. Please specify a timeout value from 0 - 0x7FFFFFFF. |
| 80040895 | MDM_E_InvalidHWAddrType | Hardware address type is invalid. |
| 80040896 | MDM_E_ThreadpoolInit | Failed to initialize the thread pool. |
| 80040897 | MDM_E_UndefinedVariable | ADS Controller did not recognize the variable. |
| 80040898 | MDM_E_DefJobMustBeginWithPXE | Default job template must always begin with a PXE task. |
| 80040899 | MDM_E_RequiresWin32Agent | This task uses the Win32 Agent. |
| 8004089A | MDM_E_SDInitializationFailed | Failed to initialize the default Security Descriptors. |
| 8004089B | MDM_E_TargetNotExists | The target does not exist. |
| 8004089C | MDM_E_DBSchemaVersionMismatch | ADS Controller service does not support the installed database schema. |
| 8004089D | MDM_E_JobTemplateFileIsNotSecure | The ADS controller is unable to create or modify the job template because the job template references a file that can be edited by users who are not members of the administrators group. Modify the file access permission so that users that are not members of the administrators group have only Read or Read & Execute permissions. In addition, the file's owner must be a member of the administrators group on the controller. |
| 8004089E | MDM_E_ImgOperationFailed | Unable to complete the operation. Try running the tool from the controller or using an image path local to the controller. |
| 8004089F | MDM_E_NoAdsInstalled | No connection could be made because the ADS agent is not available on the target machine. |
| 800408A0 | MDM_E_ServiceNameCollision | Cannot add the device because this device name conflicts with an existing running ADS service. |
| 80040609 | MDM_E_AGENT_STARTJOB_BADEXE | The requested program is not a valid Win32 Application. |

2 Identifier Definitions

2.1 SETS

Each set is uniquely identified by its name. It is stored in Sets.Name property. It can be up to 255 Unicode characters. All characters are valid, but non-printable characters are not recommended. Names are case-insensitive, but case is preserved. It should be unique across all set names.

2.2 DEVICES

Devices are identified by a combination of properties:

- The device name, which is the FQDN of the OS currently running on the target server. For a device booted with PXE, the device name is blank. For a device booting into the deployment agent, the hostname is different from the hostname on the target OS.

- Zero or more MAC addresses. MAC addresses are guaranteed to be globally unique.

- The IP address of the administration interface.

2.2.1 Device Names

The above properties are used in combination to uniquely identify the device. Additionally, the device name (its FQDN) is used to communicate with the agent running on the device. Note that this means that the controller cannot communicate directly with device records created from a PXE boot request (since the device name will be blank). This is fine, since there is no agent on the device at this point.. It is stored in Devices.Name property. It can be up to 253 Unicode characters. All characters, but non-printable characters are not recommended. Names are case-insensitive, but case is preserved. It should be unique across all device names.

Note: device name and set name should have the same number of characters because they are stored in a single field in the Jobs object.

Each device may have a device name associated with it. The name may be blank if it is not known, or a proper fully-qualified domain name (FQDN). In some situations (such as an OS configured without a domain), the FQDN may be a simple hostname. If the stored value is a FQDN, the administrator should ensure that both of the criteria below are true:

- The FQDN is unique across all devices stored on the controller

- The FQDN can be resolved to an IP address that the controller can route to on the device. Typically this is done by using dynamic DNS (DDNS) so that the FQDN and IP of the device is automatically registered on a DNS server, but the administrator could manually manage a DNS server or even the hosts file on the controller.

If the FQDN is not unique, there will be problems identifying device records by name on the controller (although most command line tools will allow for identification using GUID or MAC if necessary, but the Web UI typically uses the name).

2.2.2 Device GUID

Each device may have an SMBIOS GUID associated with it. The GUID may be blank if it is not known, or zero, or a proper GUID. Even if a proper GUID is stored it is not guaranteed to be unique across all devices stored on the controller.

This is stored as a 16 character string, representing the value as a hex number.

2.2.3 D vic MAC Address

Each device may have zero or more MAC addresses associated with it. Each MAC address consists of twelve hexadecimal digits. No separators are stored with the MAC address. Each MAC address is unique across all other MAC addresses stored on the controller.

One of the MAC addresses is the address of the administrative NIC.

2.2.4 Description

The descriptions associated with a device can be up to 255 Unicode characters. Any Unicode characters are valid, but non-printable characters are not recommended.

2.3 DEVICE VARIABLES

Device variables allow arbitrary data to be stored and associated with a particular device.

2.3.1 Namespace

Every device variable is stored in a namespace, which provides a logical grouping of variables. The namespace is up to 50 Unicode characters. All characters are valid, but non-printable characters are not recommended. Names are case-insensitive, but case is preserved. The namespace "system" is reserved for later use by the system. Any other namespace may be used.

2.3.2 Name

The device variable name uniquely identifies a state variable within a given namespace for a particular device. It can be up to 50 Unicode characters. All characters are valid, but non-printable characters are not recommended. Names are case-insensitive, but case is preserved. The name should be unique for a particular device.

2.3.3 Value

The device state variable value can be up to 255 Unicode characters. All characters are valid, but non-printable characters are not recommended. Values are case-sensitive, and case is preserved.

2.4 JOB TEMPLATES

2.4.1 Name

Each job template is uniquely identified by its name. It is stored in the JobTemplates.Name property. It can be up to 50 Unicode characters. All characters are valid, but non-printable characters are not recommended. Names are case-insensitive, but case is preserved.

2.4.2 Description

The descriptions associated with a job template can be up to 255 Unicode characters. Any Unicode characters are valid, but non-printable characters are not recommended.

2.5 JOB IDS

The job id is used to uniquely identify jobs in progress or jobs completed.. It is stored in the Job.ID propertie. It is an integer greater than zero. It is always allocated by the system.

2.6 IMAGES

2.6.1 Image Name

Every image is uniquely identified by a name. This is stored in the Images.Name property. It can be up to 50 Unicode characters. All characters are valid, but non-printable characters are not recommended. Names are case-insensitive, but case is preserved.

2.6.2 Image Description

The descriptions associated with a device can be up to 255 Unicode characters. Any Unicode characters are valid, but non-printable characters are not recommended.

2.6.3 Image Variables

Every image may be associated with none or more image variables, stored in the ImageVariables table. The definitions for Namespace, Name and Value are the same as for Device Variables (see section 2.3).

3 Object Model Overview

The object model consists of five main areas:

- Devices
- Sets
- Job Templates (jobs definitions that are available to run)
- Jobs (jobs currently running and jobs completed)
- Images

3.1 DEVICES

Device objects represent physical devices within the data center. In this version, only computer systems can be represented as devices on the controller. Alternate versions may support other types of devices such as routers, as well as the physical or logical arrangement of the devices.

Devices are the individual servers (called 'target servers') in the data center that may be managed by the controller. In addition, ADS infrastructure servers (such as servers running the image store service and network boot service) are represented as devices.

Devices are identified by their name, administration IP and MAC address or administrative IP address. The controller uses the AdminIPAddr property to communicate with the device.

Device information is stored in several objects. The WMI Devices class and database Devices table stores the basic information, including the name and administrative IP address. The Asset Tag, GUID and MAC addresses are stored in DeviceHWAddrs class and table, which are linked to the Devices object. In the future other hardware information (such as disk drive signatures) may be stored in instances of this object. Additional IP information may be stored in the DevicesHWIPAddrs class and table.

Infrastructure servers are represented as Devices objects which are linked to Servers objects representing their function. A single device may have multiple infrastructure roles, so a single Devices object may be associated with multiple Servers objects.

The controller should support up to 10,000 devices.

Each device record can also be associated with any number of "state variables". Certain state variables are managed by the controller itself; apart from these reserved variables, the user may create, modify or delete any additional state variables as required.

3.1.1 WMI Classes

- Devices
- DeviceHWAddrs

In WMI, Devices objects are keyed by their unique name.

3.1.2 Database Tables

- Devices
- DeviceHWAddrs

In the database, devices are keyed by an automatically assigned unique integer identifier.

3.2 SETS

A set represents a collection of devices. Each set has a unique name, and may contain none, one or more devices or other sets. A given device may be in multiple sets. Sets are represented on the controller only; the devices have no knowledge of what sets they are in, and are not informed when they are added or removed from sets.

Sets are implemented in the object Sets.

A set can contain no members, or any number of devices or other sets.

Sets should support up to 10,000 computers in the data center. In the most segmented arrangement, each computer might be used by a different customer, so up to 10,000 sets will be required for this arrangement. Since multiple arrangements may be used at the same time, the total number of sets supported should exceed this number. However other sets are unlikely to regard every computer as being in a unique group (since it would be redundant with the per-customer arrangement just described). So a reasonable limit for the total number of sets is 20,000.

Each group can contain any number of computers, from none to the total number of members in the data center (that is, a maximum of 10,000 computers). However it is not necessary to support having this number of members in every group when the maximum number of sets is in use.

Each target server can be in zero or more sets.

There may be some sets that are created and managed by the system. Examples are a set of all devices, or a set of just newly discovery (added) devices.

3.2.1 WMI Classes

- Sets

3.2.2 Database Tables

- Sets
- SetDevice
- SetChildSet

The SetDevice and SetChildSet tables represent device and set members of a set, respectively.

3.3 JOB TEMPLATES

Job templates are job definitions available to be run. A job template may be a 'simple' job (such as a script or program to run), or a list of simple jobs (called a 'task sequence'). Every template has a unique name used to identify it.

Job templates are stored in the JobTemplates object.. The properties of a job template can be edited by the user.

Each job template is identified by a name, which can be up to 255 Unicode characters. Any valid Unicode characters (including spaces and punctuation) may be used in the name. Additionally, each template can have a description of up to 255 Unicode characters.

The description may contain a link to further information.

The job is defined with a job type, which is either "task sequence" or one of the available operation types, and a command and (if applicable) parameters. If the type is "task sequence" then the command is the path to the task sequence definition file, and the parameters is a path to the parameter value definition file. If the type is an operation type, the contents of command and parameter values depends on the operation type.

The controller should support up to 1,000 job templates.

3.3.1 WMI Class s

- JobTemplates

3.3.2 Databas Tables

- JobTemplates

3.4 JOBS

Jobs are representations of jobs in progress or jobs that have already completed. The Jobs object stores the basic information, such as the description, job type, target, command and parameters. Each job is linked to one or more instances of the Jobs object.

The Jobs instances that correspond to the status of a job on an individual device do not store the actual output of the job. That is stored in one or more instances of the JobLogs object. Each instance of JobLogs stores part of the output of the job. The full output can be reconstructed by using the sequence property of this object to put the partial outputs into order. JobLogs store two types of output: the standard error output and the standard output. The JobLogs instances are created as the output from the job comes into the controller. It is possible for there to be no JobLogs associated with a given (child) Jobs record because either the job did not start on the device (in which case the Jobs record contains an error indication), or no output or exit status has yet been received from the device.

Jobs in progress and jobs that have completed are stored as a hierarchy of Jobs objects within the object model.

Jobs can be started in one of three ways:

- Invoking an operation using an "Execute" method on either an individual device object or a set

- Starting an existing Job Template (which causes either an operation or a task sequence to be invoked) [this might be supported only be the initiating process reading the job template attributes and then invoking an Execute method]

- Invoking a task sequence on a device or a set of devices

When a job is started, a "parent" Jobs object is created.

3.4.1 WMI Classes

- Jobs
- JobLogs

3.4.2 Database Tables

- Jobs
- JobInvocations
- JobLogs

The JobInvocations table abstracts some of the information that would otherwise be stored in the Jobs table, to reduce the amount of repeated redundant information.

3.5 IMAGES

An image represents a captured volume that is available to be deployed. It might be an OS volume captured after sysprep which can be deployed to multiple servers, an OS volume captured without sysprep which can be deployed to a single server, or a data volume.

Each image is represented by an Images object on the controller. This contains a reference to the image file itself, which is stored on the image server. Images are only ever accessed through the WMI layer – the user does not have direct access to the images store on the image server. Images can be added, accessed and removed through the WMI layer.

Each image is identified by a name. Each image is also identified by a unique GUID, which is part of the image format used. The controller uses the GUID to identify the correct image file on the image server. GUIDs are not exposed to the user via the object model.

The system can store and manage up to 100 images.

Each image can be associated with image variables, which are a set of name-value pairs. The system creates a number of pre-defined variables based on the image contents. The user can add additional variables.

Each image can be associated with up to 1,000 variables.

3.5.1 WMI Classes

- Images
- ImageProperties

3.5.2 Database Tables

- Images
- ImageProperties

3.6 ADS SERVICES

Configuration information for each ADS service (Contoller, NBS and Image Distribution Service) can be stored on the controller in 'service variables'. Each service variable is associated with a particular service on a particular device.

Each serviceis identified by the name of the device on which it runs and the service type.

The system can store and manage up to 5 services.

Each service can be associated with service variabls, which are a set of name-value pairs. The system creates a number of pre-defined variables based on the type of service. The user can add modify the values of certain variables, but cannot create or delete variables.

Each service can be associated with up to 50 variables.

3.6.1 WMI Classes

- Services
- ServiceVariables

3.6.2 Database Tables

- Services
- ServiceVariables

3.7 SCRIPT EXAMPLES

3.7.1 Example 1

List all devices that the controller knows about, stating for each one whether it is controlled or not:

```
Dim Service
Dim DeviceEnum
Dim Device

Set Service = GetObject("WinMgmts:root\microsoftADS")

' Get all devices
Set DeviceEnum = Service.ExecQuery("Select * from Devices where ADSService = 0")

' Iterate through the record set and output the result
For Each Device In DeviceEnum
    Dim str
    If Device.Control = 1 Then
        str = " is controlled" & vbCrLf
    Else
        str = " is not controlled" & vbCrLf
    End
    WScript.Echo "Name: " & Devices.Name & str
Next
```

This displays output like this:

```
server1 is controlled
server2 is controlled
webserv3 is not controlled
```

The WMI query on line 8 can be updated to perform more powerful selections. For example, to get just the devices that are controlled:

```
Set DeviceEnum = Service.ExecQuery("Select * from Devices where ADSService = 0 and Control = 1)
```

3.7.2 Example 2

Take control of a named device:

```
Dim Service
Dim DeviceInstance
Set Service = GetObject("WinMgmts:root\microsoftADS")

'Get an instance of the "webserv1" specific device object
Set DeviceInstance = Service.Get( Devices.Name="webserv1" )

'Start managing this device
DeviceInstance.Manage(TRUE)
```

3.7.3 Example 3

Run a job, wait for it to complete, and display the results. This makes use of the following command script:

```
WScript.Echo "Hello World"
```

Here is the control script which runs the above command script on a set of devices:

```
Dim Service
Dim SetInstance
Dim JobID
Set Service = GetObject("WinMgmts:root\microsoftADS")

' Get an instance of this specific Sets object
Set SetInstance = Service.Get(Sets.Name="SetOfWebServers")

'Execute the Job on the set
JobID = SetInstance.Execute("Hello World", "c:\HelloWorld.vbs", , "HelloWorld")

' Wait for it to complete (should really check it is complete)
WScript.Sleep(5000)

Dim LogInstances
Dim LogInstance

' Retrieve a record set of logs
Set LogInstances = Service.ExecQuery( "Select * from Jobs where ParentJobID = " & JobID )

'Iterate through the record set and output the result
For Each LogInstance In LogInstances
    WScript.Echo "Device: " LogInstances.DeviceName & " " & _
                 LogInstance.GetOutput(3)
Next
```

This displays output like:

```
Device server1 Hello World!
Device server2 Hello World!
```

4 General Rules

4.1 CORRESPONDENCE BETWEEN DATABASE AND WMI

The data accessed through the object model is stored in a local or remote database. In most cases, classes available in WMI are stored as tables in the database, and properties in WMI are stored as fields in a table. The following table shows the terminology used for the WMI layer and the corresponding terminology for the database:

| WMI terminology | Database implementation |
|---|---|
| WMI class name | Database table name |
| WMI property | Table field |
| WMI method | Either implemented with the WMI method, or in a DLL that is called from the WMI provider |
| WMI association | Database foreign key |
| WMI instance | Table record |
| WMI spawn instance (creating a new instance) | None |
| WMI put instance (updating a new or existing instance) | Writing table record |

However there are cases where a WMI property is not stored in the database, and where database tables are not directly exposed through WMI. Where relevant, these differences are noted as implementation notes in this example object model.

4.2 DATABASE

In general, interactions with the controller should be made through the WMI layer. This includes tools and scripts provided with the controller. The user may directly access the database to perform the following operations:

- Moving from MSDE to SQL, or between SQL instances (local or remote)

- Backing-up and restoring database contents

- Using SQL client tools to optimize or customize database parameters

The database should be SQL 2000 compatible.

4.2.1 Database Location and Instance Name

The database may be located on the same system as the controller service, or it might be remote. The database location and instance name is specified in the registry.

4.3 WMI

WMI provides the programmatic interface to the controller. It is a layer on top of the database. In general, most requests to WMI will cause an operation to be performed on the database. For example, if an instance is requested, the property values for that instance will be obtained from the database. At a later point, if the instance is updated within WMI, the updated property values are written back to the database.

4.3.1 Namespace

The namespace for the WMI provider is root\MicrosoftADS.

4.3.2 Instance Creati n

WMI objects are created using the SpawnInstance method (IWbemClassObject::SpawnInstance from COM, or SWbmeObject.SpawnInstance from script).

Instances may be created for all classes apart from the singleton Controller class.

SpawnInstance may return any of the WMI error codes as defined in the WMI SDK.

After being created, parameter values are typically added. These are then verified when the instance is updated.

4.3.3 Updating Instance

An instance is updated using the PutInstance method (Put_ from script). This typically occurs in two situatios

- First, after creating a new instance of a class (using SpawnInstance/SpawnInstance_), to actually create it in the repository

- Second, after getting an existing instance and updating one or more property values.

In either case, the values of the parameters are validated. Typically, the validation occurs when the object's record is attempted to be written to the database. The rules for validating values are given for each of the properties in each object definition, in section 5. This section also described which properties are required to be present in the instance.

If the PutInstance/Put_ method fails because a property has an invalid value (or is blank or NULL when that is not allowed), then the method should return one of the WMI error codes described in the WMI SDK. In most cases, the appropriate error code will be WBEM_E_INVALID_PARAMETER (WbemErrInvalidParameter from script), or if a property was NULL that cannot be NULL, WBEM_E_ILLEGAL_NULL (WbemErrIllegalNull).

4.3.4 Methods

All methods described in this example object model are synchronous from the WMI perspective (although they may be asynchronous in their implementation in the controller).

Some methods are implemented entirely in the WMI provider. Other methods are implemented by the WMI provider calling a DLL that then operates on the database.

4.3.5 Errors

Any WMI method (including standard methods such as PutInstance) that fails should ensure that a SWbemLastError object is available for scripts to determine the details of the failure.

5 Object Definitions

This section contains definitions for each of the objects in the model. Each object may contain properties and methods, and have associations with other objects.

In this version, all objects, properties, methods and associations are exposed through WMI. Additional "association" classes are used to implement associations – these are documented is section 6.

Each object definition starts with a summary, then a definition in this format:

| Class name | Object name: this is the class name in WMI class name and (generally) table name in the database. |
|---|---|
| Derived from | WMI class name that this class is derived from (this is not used by the database) |
| Description | Description text of this class, as stored in WMI (this is not used by the database) |

The conditions under which the class can be created and deleted are described next. Then information about the other classes to which this class is associated.

Then each property of the class is listed, in this format:

| Property name | Name of the property in both WMI and the database |
|---|---|
| Description | Description text of the property, as stored in WMI (this is not used by the database) |
| Type | CIM type of the property (the database uses an equivalent type) |
| Access | Whether the property can be read, written to or both |
| Key | Whether this property is a key value. Multiple properties can be a key. |
| Values | Description of value of the property, such as maximum length of a string property or meaning of the numbers of an integer property. |

Finally, each method is described:

| Description | Description of the method, as stored in WMI (this is not used by the database) | |
|---|---|---|
| Arguments: | | |
| Argument name | Direction of the argument (in or out), and CIM type | Description text of the argument, as stored in WMI (this is not used by the database) |
| Return value | CIM type | Meaning of the return value |

All descriptions are stored in WMI within the US English locale, ready for localization.

5.1 DEVICES

Devices are members of sets; sets are groups of devices. Devices represent physical computer systems which in this case are server appliances. With multiple device management the intention is to do management on many machines simultaneously. Nevertheless, with the device object you can also execute commands.

| Class name | Devices |
|---|---|
| Derived from | CIM_UnitaryComputerSystem |
| Description | "The Devices class represents the devices that are either automatically discovered or manually added." |

5.1.1 Schema Summary

Devices are implemented in the Devices database table.

Each record of the Devices table represents a single device, and is exposed as the WMI Devices class.

5.1.1.1 Devices

The properties of the database Devices table are:

| Property | Format | Notes |
|---|---|---|
| ID | Integer | Unique identified for this device<br>Not exposed in WMI. |
| Name | String, max 255 characters | Fully-qualified name of the target device, or the IP address of the administrative interface.<br>Cannot be NULL, but may be a blank string.<br>Exposed as Devices.Name |
| Control | Integer | Whether this device is controlled by this controller. If set to TRUE, the controller will respond to PXE requests from this device and can run jobs on this device.<br>True = device is controlled by this controller<br>Fale = device is not controlled by this controller<br>Exposed as Devices.Control |
| State | Integer | State of the connection to the target device.<br>0 = Disconnected (or device is not running agent software)<br>1 = Connected to pre-OS (Win32 agent may additionally be present)<br>2 = Connected to full OS (Win32 agent present)<br>Exposed as Devices.State |
| AdminIPAddr | String, max 50 characters | IP address of administrative interface (as supplied by discovery). Used for communication with the device. Stored as an integer, but exposed to the user as a dotted-quad formatted string.<br>Exposed as Devices.AdminIP |
| CurrentJobID | Big Integer | Job ID of the currently running PXE job. Not used for single jobs (so more than one single job can be running concurrently).<br>Exposed as Devices.CurrentJobID |
| JobTemplate | String, max 50 characters | Job to run when a PXE request comes in from this device, if no PXE job is running.<br>Exposed as Devices.JobTemplate |
| LastDiscoveryTime | Datetime | Time last discovery packet was received from the device<br>Exposed as Devices.LastDiscoveryTime |
| ADSService | Integer | Whether this device hosts an ADS service.<br>0 = No<br>1 = Hosts the controller service<br>2 = Hosts the PXE Service<br>4 = Hosts the Image Service<br>If multiple services are hosted on the same |

| | | device, this value is set to the sum of the numbers above. |
|---|---|---|
| Description | String, max 255 characters | A description for the device. Exposed as Devices.Description |

Primary key is ID.

Additional hardware information is stored in the DeviceHWAddrs table and per-device variables in the DeviceVariables table.

5.1.2 Creation

Instances of the Devices set can be created in one of two ways:

- At request of the user or other process

- Automatically by the controller based on the reception of an autodiscovery packet from an agent

5.1.2.1 Manual Creation

An instance of the Devices class may be created manually by the user or other process. The new instance should have at least a value for the Name property, and this value should not already exist as the Name of another instance of the Devices class on the system. Unless AdminIPAddr is also given, the value of the Name property should be an IP address or a name that can be resolved on the controller to the IP address of the administrative interface on the device itself. Typically this resolution will occur using a DNS server.

The new instance can be associated with one or more MAC addresses. This is indicated by associating the new instance of the Devices class with instances of DeviceHWAddrs of type MAC.

The new instance can be associated with one administration MAC addresses. This is indicated by associating the new instance of the Devices class with instances of DeviceHWAddrs of type AdminMAC.

The new instance can be associated with a SMBIOS GUID. This is indicated by associating the new instance of the Devices class with instances of DeviceHWAddrs of type SMBIOSGUID.

The new instance can be associated with n asset tag number. This is indicated by associating the new instance of the Devices class with instances of DeviceHWAddrs of type SMBIOSAssetTag.

The AdminMAC or SMBIOSGUID is used to match this record with a PXE boot request.

The admin MAC, GUID and Asset Tag are collected from the device when connection is established to the device, and stored on the controller if not already present. If they are present, they are updated if different.

For all manually created Devices instances, the LastDiscoveryTime will be NULL. If at some later point an auto-discovery packet is received that matches this Devices instance, this field will be updated with the time that the packet was received.

The values of Control and JobTemplate, if not explicitly set, will false and empty, respectively.

The following errors can be set after doing a Put or Put_ method on a new instance of the Sets object (in addition to the errors defined for the Put and Put_ methods in the WMI SDK):

| Error Status Code | Error Symbolic Name | Description |
|---|---|---|

5.1.2.2 Autodiscovery

See Autodiscovery functional spec. This might create or update an existing record.

5.1.3 Accessing

The following errors can be set after doing an access of an instance of this class (in addition to the errors defined for the Get method in the WMI SDK):

| Error Status Code | Error Symbolic Name | Description |
|---|---|---|

5.1.4 Updating

The following errors can be set after doing a Put or Put_ method on an existing instance of this object (in addition to the errors defined for the Put and Put_ methods in the WMI SDK):

| Error Status Code | Error Symbolic Name | Description |
|---|---|---|

5.1.5 Deleting

Instances of the Devices class may be deleted by the user or other process. Instances may be deleted by the system if the Controller.RefreshDeviceList() method is called.

When an instance of Devices is deleted, any instances of DeviceHWAddrs that refer to the same device as also deleted.

The following errors can be set after doing a Delete or Delete_ method on an existing instance of the Sets object (in addition to the errors defined for the Delete and Delete_ methods in the WMI SDK):

| Error Status Code | Error Symbolic Name | Description |
|---|---|---|

5.1.6 Associations

Instances of Devices can have associations to the following classes:

- To instances of Sets

An instance of Devices has an association to each instance of Sets of which it is a member. Each instance of Devices many be associated with zero, one or more instances of Sets.

- To instances of Jobs

An instance of Device has an association to instances of Jobs that represents the parent job of each job run on this device.

- To instances of DeviceHWAddrs

An instance of Device has an association to an instance of DeviceHWAddrs for each hardware address on the device that the controller knows about. In this current version, the only hardware addresses stored on the controller are MAC addresses of the administrative NIC card, the SMBIOS Asset Tag and the SMBIOS GUID.

- To instances of DeviceVariables

An instance of Device has an association to an instance of DeviceVariables for each device variable.

- To instances of JobTemplates

An instance of Device has an association to each instance of JobTemplates which is defined to run on this device.

- To instances of Services

An instance of Device has an association to each instance of Services that represents an ADS service on that device.

5.1.7 Properties

5.1.7.1 Name

This is inherited from the parent class.

| Property name | Name |
|---|---|
| Description | <inherited> |
| Type | String |
| Access | Read |
| Key | Yes |
| Values | 253 Unicode characters |

The value of this property can be changed using the Rename method.

The name is used to communicate with the target device if the AdminIPAddr property is NULL or empty. It may be a name resolved using DNS or an IP address.

5.1.7.2 State

| Property name | State |
|---|---|
| Description | "Status flag to indicate whether the controlled device is alive." |
| Type | Integer |

|  | 0 = "Disconnected"<br>1 = "Connected to pre-OS"<br>2 = "Connected to full OS" |
|---|---|
| Access | Read |
| Key | No |
| Values | |

If the device is uncontrolled, this property is always 0 (disconnected).

Otherwise, this property is set to true whilst the permanent connection is established to the device.

5.1.7.3  Control

| Property name | Control |
|---|---|
| Description | "Status flag to indicate whether the device is being controlled." |
| Type | Boolean |
| Access | Read |
| Key | No |
| Values | True if device is controlled from this controller; false if not |

The value of this property is set by starting or ending control of the device, using the Manage method.

When set to True, this controller will respond to and run jobs on this device. Specifically, it will respond to PXE requests (if configured to do so) and establish a permanent connection to the device in order to run jobs on it.

When set to False, this controller will not respond to PXE requests from this device and will not establish a connection to it (so jobs cannot be run on it).

5.1.7.4  AdminIPAddr

| Property name | AdminIPAddr |
|---|---|
| Description | "The AdminIPAddr property represents the IP address to use to communicate with this device." |
| Type | String |
| Access | Read |
| Key | No |
| Values | |

If non-NULL and not empty, this is the IP address used to communicate with the target device. If this is NULL or an empty string, then the Name property is used to communicate with the device.

It is set to the source IP address of the auto-discovery packet. It can also be set manually, for situations where auto-discovery packets do not reach the controller.

5.1.7.5  LastDiscoveryTime

| Property name | LastDiscoveryTime |
|---|---|
| Description | "Time when this controller device last received auto-discovery information from the controlled device. The value is NULL if the controlled device has never been auto- |

|  | discovered." |
|---|---|
| Type | Datetime or NULL |
| Access | Read |
| Key | No |
| Values | |

Every time that an auto-discovery packet is received that matches this Devices instance, that date is updated to the current date. This can be used to identify manually entered records that have never been seen on the network.

5.1.7.6 JobTemplate

| Property name | JobTemplate |
|---|---|
| Description | "The JobTemplate property represents the default job template that will be run if the device does pxe-boot and it is not currently running task sequence and Control is set to true." |
| Type | String |
| Access | Read |
| Key | No |
| Values | |

This specifies the job template to be run when a device PXE boots, if both of the following are true:

- There is no currently running task sequence for this device which is at a step waiting for the device to PXE boot

- The Control field is set to True.

If both these are true, and this property is not NULL or empty, then the job template with the same name is started for this device. If this property is set to NULL or is empty, then the default job template is run (if set). See the Controller.JobTemplate property for how the default job template is specified.

5.1.7.7 ADSService

| Property name | ADSService |
|---|---|
| Description | "" |
| Type | Integer |
| Access | Read |
| Key | No |
| Values | 0 = "None"<br>1 = "Controller Service"<br>2 = "PXE Service"<br>4 = "Image Service"<br>May be a combination of the above. |

This property is used to determine if this device is hosting an ADS service.

5.1.7.8 Description

| Property name | Description |
|---|---|
| Description | "Description of device" |
| Type | String or NULL |
| Access | Read, Write |

| Key | No |
|---|---|
| Values | 255 Unicode characters |

5.1.7.9 Unused Properties

These properties are inherited from the parent classes but are currently unused:

- Caption
- CreationClassName
- InitialLoadInfo
- InstallDate
- LastLoadInfo
- NameFormat
- PowerManagementSupported
- PowerManagementCapabilities
- PowerState
- PrimaryOwnerContact
- PrimaryOwnerName
- ResetCapability
- Roles
- Status
- Time

5.1.8 Methods

5.1.8.1 RecoverManagedDevice

> Does Devices.RecoverManagedDevice need to be exposed to user? Probably for cases where auto-disc packets don't get routed from device to controller. - PAUL

| Description | "The RecoverManagedDevice method returns devices to normal state. This method can be invoked to bring back to the normal operating state if the controlled device does not respond to requests from the controller device.." |
|---|---|
| Arguments: | |
| Return Value: | Void |

This method can be called if the user believes that the configuration on a device is corrupted. The controller sends out the following information to the device:

- A request for the device information.
- A control request to manage this device
- The current heartbeat configuration information (the heartbeat interval)
- The current alert status for this device (enabled or not enabled)

This call returns after all of these have been processed. This could take some time.

The following errors can be set after calling this method (in addition to the errors defined for the ExecMethod and ExecMethod_ methods in the WMI SDK):

| Error Status Code | Error Symbolic Name | Description |
|---|---|---|

Plus any of the error values listed for the Devices.Manage and Devices.EnableAlerts method.

5.1.8.2 Manage

| Description | "The Manage method places devices into either a controlled or an uncontrolled state." | |
|---|---|---|
| Arguments: | | |
| ControlFlag | [in] 32 bit integer | The ControlFlag input parameter is the value that specifies how to manage the device." |
| Return value: | Void | |

This changes the state of control for a device, and returns when that is complete.

The value of ControlFlag specifies the operation to perform against the device:

| Value of ControlFlag | Meaning | Description |
|---|---|---|
| 0 | "Release control" | The device becomes uncontrolled. The controller's root certificate is left on the device, so the device can only be controlled by another controller with the same root certificate. |
| 1 | "Take control" | The device becomes controlled from this controller. |

The following errors can be set after calling this method (in addition to the errors defined for the ExecMethod and ExecMethod_ methods in the WMI SDK):

| Error Status Code | Error Symbolic Name | Description |
|---|---|---|

5.1.8.3 SetAdminIPAddr

| Description | "The SetAdminIPAddr method sets the administration IP address for the device." | |
|---|---|---|
| Arguments: | | |
| IPAddr | [in] string | "Administration IP address for the device." |
| Return value: | Void | |

This changes AdminIPAddr property.

5.1.8.4 SetJobTemplate

| Description | "The SetJobTemplate method sets the default job template for the device." | |
|---|---|---|
| Arguments: | | |
| JobTemplate | [in] string | "JobTemplate is the template to be executed." |
| Return value: | Void | |

Update the JobTemplate property.

5.1.8.5 Execute

| Description: | "The Execute method executes a command on devices, and then returns the job identifier relating to the parent job." | |
|---|---|---|
| Arguments: | | |
| Command | [in] String | "Command input parameter is the path of the command to be executed." |
| Parameters | [in] String | "Parameters input parameter is the parameters to be passed to the executing command." |
| Description | [in] String | "Description input parameter is the description for the executing command which is to be logged in the Jobs object" |
| Delivery | [in] 32 bit integer | The Delivery input parameter specifies the mode of delivering the command to the target device."<br>0 = "None"<br>1 = "BMCP" |
| Timeout | [in] 32 bit integer | "The Timeout input parameter specifies the period of time in seconds that the controller will allow for this command to complete. If NULL or 0, there is no timeout." |
| JobWillReboot | [in] Boolean | "The JobWillReboot input parameter specifies whether the job to be executed will reboot or not. It is an optional parameter and the default value is False." |
| Return value: | 64 bit integer | JobID of the new job, or 0 if an error occurred |

See the description of Sets.Execute (section 5.4.8.6) for details of the operation of this method and the meaning and interpretation of the arguments.

The following errors can be set after calling this method (in addition to the errors defined for the ExecMethod and ExecMethod_ methods in the WMI SDK):

| Error Status Code | Error Symbolic Name | Description |
|---|---|---|
| | | |

5.1.8.6 Unused Methods

These methods are inherited from the parent classes but are currently unused:

- SetPowerState

5.2 DEVICEVARIABLES

Each Device can have zero or more device variables. These are stored in the DeviceVariables table:

| Class name | DeviceVariables |
|---|---|
| Derived from | CIM_LogicalElement |
| Description | "The DeviceVariables class represents the collections of Name-Value pair pertaining to |

| | any device. The Name-Value pair for every device has different Namespace scope." |

5.2.1 Schema Summary

Implemented as the DeviceVariables database table, and exposed as the DeviceVariables WMI class.

5.2.1.1 DeviceVariables Table

| Property | Format | Notes |
|---|---|---|
| DeviceID | Integer | Not exposed directly in WMI. WMI exposes the corresponding device name. |
| NameSpace | String, max 50 characters | Cannot be NULL<br>Exposed as DeviceVariables.NameSpace |
| Attribute | Integer | Cannot be NULL<br>Exposed as DeviceVariables.Attribute |
| VariableName | String, max 50 characters | Cannot be NULL<br>Exposed as DeviceVariables.Name |
| VariableValue | String, max 255 characters | Cannot be NULL<br>Exposed as DeviceVariables.Value |

Primary key is DeviceID, NameSpace and VariableName.

DeviceID is a foreign key to Devices.ID.

5.2.2 Creation

Instances of DeviceVariables can be created manually.

The following errors can be set after doing a Put or Put_ method on a new instance of the Sets object (in addition to the errors defined for the Put and Put_ methods in the WMI SDK):

| Error Status Code | Error Symbolic Name | Description |
|---|---|---|

5.2.3 Accessing

The following errors can be set after doing an access of an instance of this class (in addition to the errors defined for the Get method in the WMI SDK):

| Error Status Code | Error Symbolic Name | Description |
|---|---|---|

5.2.4 Updates

The following errors can be set after doing a Put or Put_ method on an existing instance of the Sets object (in addition to the errors defined for the Put and Put_ methods in the WMI SDK):

| Error Status Code | Error Symbolic Name | Description |
|---|---|---|

5.2.5 D l ti n

Instances of DeviceVariables can be deleted. Instances are also deleted automatically when the corresponding Devices instance is deleted.

The following errors can be set after doing a Delete or Delete_ method on an existing instance of the Sets object (in addition to the errors defined for the Delete and Delete_ methods in the WMI SDK):

| Error Status Code | Error Symbolic Name | Description |
|---|---|---|
| | | |

5.2.6 Associations

- To single instance of Devices

An instance of DeviceVariables is associated to the instance of Devices to which the variable applies.

5.2.7 Properties

5.2.7.1 DeviceName

| Property name | DeviceName |
|---|---|
| Description | "The DeviceName property is the unique identifier." |
| Type | String |
| Access | Read |
| Key | Yes |
| Values | 255 Unicode characters |

5.2.7.2 Namespace

| Property name | NameSpace |
|---|---|
| Description | "The Namespace property is the scope identifier for the device variable." |
| Type | String |
| Access | Read, write |
| Key | Yes |
| Values | 50 Unicode characters |

5.2.7.3 Attribute

| Property name | Attribute |
|---|---|
| Description | "The attribute property specifies whether the instance can be updated." |
| Type | Integer |
| Access | Read |
| Key | No |
| Values | 1 = "Read"<br>2 = "Write"<br>3 = "Read/Write" |

5.2.7.4 Name

| Property name | Name |
|---|---|

| | |
|---|---|
| Description | "The Name property is the unique identifier for the device variable. |
| Type | String |
| Access | Read, write |
| Key | Yes |
| Values | 50 Unicode characters |

5.2.7.5 Value

| | |
|---|---|
| Property name | Value |
| Description | "Value of the device variable." |
| Type | String |
| Access | Read, write |
| Key | Yes |
| Values | 255 Unicode characters |

5.2.8 Methods

5.3 DEVICEHWADDRS

The device hardware address uniquely identifies a piece of hardware such as a NIC.

| | |
|---|---|
| Class name | DeviceHWAddrs |
| Derived from | CIM_LogicalElement |
| Description | "The DeviceHWAddrs class represents the device parts and their hardware addresses." |

In this version, the only types of hardware address that are used internally are "MAC" and "SMBIOSGUID". This is used to store the MAC addresses and GUID (respectively) of devices.

5.3.1 Schema Summary

5.3.1.1 DeviceHWAddrs Table

| Property | Format | Notes |
|---|---|---|
| HWAddr | String, max 50 characters | The value of the hardware identifier. Meaning depends on the value of the "Type" field. Cannot be NULL.<br>Exposed as DeviceHWAddrs.HWAddr |
| DeviceID | Integer | ID of the device to which this hardware address applied. Foreign key to Devices.ID. Cannot be NULL.<br>Not exposed in WMI directly, but instead exposed as a name in DeviceHWAddrs.DeviceName |
| Type | Integer | The type of the hardware address. The system uses only type values of<br>1="MAC"<br>3="AdminMAC"<br>3="SMBIOSGUID"<br>4="SMBIOSAssetTag"<br>The user may store additional types here, using the WMI layer. However additional types are not obtained automatically from the system and are not displayed by the system. Cannot be NULL |

|  |  | Exposed as DeviceHWAddrs.Type |
|--|--|--|
|  |  |  |

Primary key is HWAddr.

5.3.2 Creation

Instances of DeviceHWAddrs can be created automatically or manually.

Automatic creation occurs based on received auto-discovery packets. If the packet contains a hardware address (containing a type and address), then a new instance of DeviceHWAddrs is created for the hardware address (which may also involve creating an instance of HWAddrTypes).

The following errors can be set after doing a Put or Put_ method on a new instance of the Sets object (in addition to the errors defined for the Put and Put_ methods in the WMI SDK):

| Error Status Code | Error Symbolic Name | Description |
|--|--|--|

5.3.3 Accessing

The following errors can be set after doing an access of an instance of this class (in addition to the errors defined for the Get method in the WMI SDK):

| Error Status Code | Error Symbolic Name | Description |
|--|--|--|

5.3.4 Updates

The following errors can be set after doing a Put or Put_ method on an existing instance of the Sets object (in addition to the errors defined for the Put and Put_ methods in the WMI SDK):

| Error Status Code | Error Symbolic Name | Description |
|--|--|--|

5.3.5 Deletion

Instances of DeviceHWAddrs can be deleted. . Instances are also deleted automatically when the corresponding Devices instance is deleted.

The following errors can be set after doing a Delete or Delete_ method on an existing instance of the Sets object (in addition to the errors defined for the Delete and Delete_ methods in the WMI SDK):

| Error Status Code | Error Symbolic Name | Description |
|--|--|--|

5.3.6 Associations

- To single instance of Devices

An instance of DeviceHWAddrs is associated to the instance of Devices which contains has the hardware address.

5.3.7 Properti s

5.3.7.1 HWAddr

| Property name | HWAddr |
|---|---|
| Description | "The HWAddr property is the unique identifier for the device parts." |
| Type | String |
| Access | Read |
| Key | Yes |
| Values | 50 Unicode characters |

5.3.7.2 DeviceName

| Property name | DeviceName |
|---|---|
| Description | "DeviceName property is the name of the device that holds the device part." |
| Type | String |
| Access | Read |
| Key | No |
| Values | A device name. This is the name of the instance of Devices corresponding to this hardware address. |

Foreign key to Devices: device within which hardware is present.

5.3.7.3 Type

| Property name | Type |
|---|---|
| Description | "Type property is the type of hardware address." |
| Type | Integer |
| Access | Read |
| Key | No |
| Values | 1 = "MAC"<br>2 = "AdminMAC"<br>3 = "SMBIOSGUID"<br>4 = "SMBIOSAssetTag" |

5.3.7.4 Unused Properties

These properties are inherited from the parent classes but are currently unused:

- Caption
- InstallDate
- Name
- Status

5.3.8 M thods

There are no methods for this object.

5.4 SETS

Sets are the building blocks of multiple device management. Sets are objects which group devices. There is a one-to-many relationship between a Sets object and Devices and Sets objects. Commands can be executed on each member of a Sets object by means of the Execute method, and task sequences can be invoked with the ExecuteSequence method.

| Class name | Sets |
|---|---|
| Derived from | CIM_LogicalElement |
| Description | "The Sets class represents a collection of devices. Sets group devices for administrative purposes, and run jobs on multiple devices simultaneously. Each set should have a unique name. Sets can contain devices and other sets." |

5.4.1 Schema Summary

Sets are implemented in three database tables: Sets, SetDevice and SetChildSet.

Each record of Sets represents a single set, and is exposed as the Sets WMI class.

Each record of SetDevice represents a device member of a set, and is exposed as the SetToDevice association class.

Each record of SetChildSet represents a set member of a set, and is exposed as the SetToSet association class.

5.4.1.1 Sets Table

The properties of the database Sets table are:

| Database Property | Format | Notes |
|---|---|---|
| ID | Integer | Not exposed through WMI |
| Name | String, max 255 characters | Exposed as Sets.Name |
| Description | String, max 255 characters | Exposed as Sets.Description |

Primary key is ID.

5.4.1.2 SetDevice Table

The properties of the database SetDevice table are:

| Database Property | Format | Notes |
|---|---|---|
| SetID | Integer | Cannot be NULL |
| DeviceID | Integer | Cannot be NULL |

Primary key is SetID and DeviceID.

SetID is a foreign key to Sets.ID. DeviceID is a foreign key to Devices.ID.

5.4.1.3 SetChildSet Table

The properties of the database SetChildSet table are:

| Database Property | Format | Notes |
|---|---|---|
| SetID | Integer | Cannot be NULL |
| ChildSetID | Integer | Cannot be NULL |

Primary key is SetID and ChildSetID.

SetID and ChildSetID are foreign keys to Sets.ID.

5.4.2 Creation

Instances of the Sets class are created by the user (or other process). Instances are never created automatically by the object model. The only property required for a new instance of the Sets class is Name. The value of Name should be unique amongst all the instances of Sets on the controller. A set is always created empty (that is, it has no member Devices or Sets objects).

The following errors can be set after doing a Put or Put_ method on a new instance of the Sets object (in addition to the errors defined for the Put and Put_ methods in the WMI SDK):

| Error Status Code | Error Symbolic Name | Description |
|---|---|---|

5.4.3 Accessing

The following errors can be set after doing an access of an instance of this class (in addition to the errors defined for the Get method in the WMI SDK):

| Error Status Code | Error Symbolic Name | Description |
|---|---|---|

5.4.4 Updating

The following errors can be set after doing a Put or Put_ method on an existing instance of this object (in addition to the errors defined for the Put and Put_ methods in the WMI SDK):

| Error Status Code | Error Symbolic Name | Description |
|---|---|---|

5.4.5 Deletion

Instances of the Sets class can be deleted by the user (or other process). Instances are never deleted automatically by the object model. When an instance is deleted, no changes are made to other instances (including those instances which refer to the class being deleted).

The following errors can be set after doing a Delete or Delete_ method on an existing instance of the Sets object (in addition to the errors defined for the Delete and Delete_ methods in the WMI SDK):

| Error Status Code | Error Symbolic Name | Description |
|---|---|---|
|  |  |  |

5.4.6 Associations

Instances of Sets can have associations to the following classes:

- To instances of Devices

An instance of Sets has an association to each instance of Devices which is a member of the set. Each instance of Sets many be associated with zero, one or more instances of Devices.

- To instances of Sets

An instance of Sets has an association to each instance of Sets which is a member of the set. Each instance of Sets many be associated with zero, one or more instances of Sets. An instance of Sets may not be associated with itself. When a set is added to a set, the system will check for circular dependencies (e.g. SetA is a member of SetB and SetB is a member of SetA) to a depth of five sets.

- To instances of JobTemplates

An instance of Set has an association to each instance of JobTemplates which is defined to run on this set.

5.4.7 Properties

5.4.7.1 Name

| Property name | Name |
|---|---|
| Description | "Name of the set" |
| Type | String |
| Access | Read |
| Key | Yes |
| Values | 255 Unicode characters, excluding the newline or carriage return characters |

The value of this property can be changed using the Rename method. The value should be unique amongst all the Sets instances on the system.

5.4.7.2 Description

| Property name | Description |
|---|---|
| Description | "Description of the set" |
| Type | String or NULL |
| Access | Read, Write |
| Key | No |
| Values | 255 Unicode characters |

This is a free-text description of the set. It may be NULL or empty. It can be updated.

5.4.7.3 Unused Properties

These properties are inherited from the parent classes but are currently unused:

- Caption
- InstallDate
- Status

5.4.8 Methods

5.4.8.1 AddDevice

Used to add controlled or uncontrolled device to a set.

| Description | "The AddDevice method adds a device as a member of the set." | |
|---|---|---|
| Arguments: | | |
| Device | [in] Devices | "The Device input parameter is the path reference to the device to add as a member of the set." |
| Return value | Void | |

The following errors can be set after calling this method (in addition to the errors defined for the ExecMethod and ExecMethod_ methods in the WMI SDK):

| Error Status Code | Error Symbolic Name | Description |
|---|---|---|

5.4.8.2 RemoveDevice

| Description | "The RemoveDevice method removes a device from the set." | |
|---|---|---|
| Arguments: | | |
| Device | [in] Devices | "The Device input parameter is the path reference to the device to remove from the set." |
| Return value: | Void | |

The following errors can be set after calling this method (in addition to the errors defined for the ExecMethod and ExecMethod_ methods in the WMI SDK):

| Error Status Code | Error Symbolic Name | Description |
|---|---|---|

5.4.8.3 AddSet

| Description | "The AddSet method adds a set as a member of the set." | |
|---|---|---|
| Arguments: | | |
| Set | [in] Sets | "The Set input parameter is the path reference to the set to add as a member of the set." |
| Return value | Void | |

The following errors can be set after calling this method (in addition to the errors defined for the ExecMethod and ExecMethod_ methods in the WMI SDK):

| Error Status Code | Error Symbolic Name | Description |
|---|---|---|

5.4.8.4 RemoveSet

| Description | "The RemoveSet method removes a set from the set." | |
|---|---|---|
| Arguments: | | |
| Set | [in] Sets | "The Set input parameter is the path reference to the set to remove from the set." |
| Return value: | Void | |

This removes a set that is an immediate member of the parent set.

The following errors can be set after calling this method (in addition to the errors defined for the ExecMethod and ExecMethod_ methods in the WMI SDK):

| Error Status Code | Error Symbolic Name | Description |
|---|---|---|

5.4.8.5 Rename

| Description: | "The Rename method renames the set name to the name specified." | |
|---|---|---|
| Arguments: | | |
| SetName | [in] string | "The SetName input parameter is the new name for the set.". |
| Return value: | Void | |

The following errors can be set after calling this method (in addition to the errors defined for the ExecMethod and ExecMethod_ methods in the WMI SDK):

| Error Status Code | Error Symbolic Name | Description |
|---|---|---|

5.4.8.6 Execute

| Description: | "The Execute method runs a job on the devices in the set. If the job started successfully, the method returns the job identifier of the parent job. | |
|---|---|---|
| Arguments: | | |
| Command | [in] string | "The Command input parameter is the path of the command to be run. The values that may be given depend on the value of the CommandType parameter." |
| Parameters | [in] string | "The Parameters input parameter specifies the arguments given when the job is started. This parameter is used depending on the value of the CommandType parameter." |
| Description | [in] string | "Description input parameter is the description for the executing command which is to be logged in the JobInvocations object." |
| Delivery | [in] 32 bit integer | "The Delivery input parameter specifies the mode of delivering the command to the target set.". <br> 0 = "None" <br> 1 = "BMCP" |
| Timeout | [in] 32 bit integer | "The Timeout input parameter specifies the timeout value in seconds for this job. It is an optional parameter." |
| JobWillReboot | [in] Boolean | "The JobWillReboot input parameter specifies whether the job to be executed will reboot or not. It is an optional parameter and the default value is False." |
| Return value: | 64 bit integer | The JobID of the newly created Jobs instance, or 0 if the job was not started. |

This causes a job to be run against the members of the set on which it is run. If the job is successfully created, it causes a Jobs instances to be created for the job. The value of the JobID property of the new Jobs instance is returned as the return value of this method. Note that job execution is asynchronous, so success of this method does not mean that the job itself will be successful on the agents.

The maximum supported length of the Command argument is 1024 characters (limited for test purposes). This is written to the Command property of the new JobInvocations instances.

The maximum supported length of the Parameters argument is 4096 characters (limited for test purposes). This is written to the Parameters property of the new Jobs instances.

The maximum length of the Description argument is 255 Unicode characters. This is stored in the Description property of the new Jobs instance.

It is not an error for the set to be empty. In this case, a Jobs instance is created as normal, along with the parent Jobs instance. However there are no child Jobs instances. Users of the object model should be prepared for this situation.

The following errors can be set after calling this method (in addition to the errors defined for the ExecMethod and ExecMethod_ methods in the WMI SDK):

| Error Status Code | Error Symbolic Name | Description |
|---|---|---|
| | | |

5.4.8.7 ListMemberDevices

| Description: | "The ListMemberDevices method retrieves the unique list of descendent member devices. Since a set can contain nesting of sets, this method will walk through the child member sets and retrieves their member devices and enumerates the unique list of devices." | |
|---|---|---|
| Arguments: | | |
| DeviceMembers | [out] Devices[] | "The DeviceMembers output parameter is the array of the Devices class instances that are members of the descendent set members." |
| Return value: | void | |

5.5 JOBTEMPLATES

These are templates and not associated with a particular run.

| Class name | JobTemplates |
|---|---|
| Derived from | CIM_LogicalElement |
| Description | "The JobTemplates class represents a job template that is available to be run." |

5.5.1 Schema Summary

Job templates represent jobs that can be run. It is stored in the JobTemplates table.

5.5.1.1 JobTemplate Table

| Property | Format | Notes |
|---|---|---|
| Name | String, max 50 characters | Cannot be NULL |
| TargetType | Integer | 0 = Undefined<br>1 = Sets |

|  |  | 2 = Devices<br>3 = Controller |
|---|---|---|
| TargetName | String, max 255 characters |  |
| JobWillReboot | Integer (bitfield) | 0 = command does not reboot before it exits<br>1 = command will do a reboot before it exits (Note: this is mapped to selected values of Jobs.Type). |
| TimeOut | Integer |  |
| Delivery | Integer |  |
| CommandType | Integer |  |
| Command | ntext |  |
| Parameters | ntext | Any text of format $name{.name}* is replaced with a corresponding variable. |
| Description | String, max 255 characters |  |

Primary key is Name.

5.5.2 Creation

Instances of JobTemplates can be created by the user (or other process).

The following errors can be set after doing a Put or Put_ method on a new instance of the Sets object (in addition to the errors defined for the Put and Put_ methods in the WMI SDK):

| Error Status Code | Error Symbolic Name | Description |
|---|---|---|

5.5.3 Accessing

The following errors can be set after doing an access of an instance of this class (in addition to the errors defined for the Get method in the WMI SDK):

| Error Status Code | Error Symbolic Name | Description |
|---|---|---|

5.5.4 Updating

The following errors can be set after doing a Put or Put_ method on an existing instance of this object (in addition to the errors defined for the Put and Put_ methods in the WMI SDK):

| Error Status Code | Error Symbolic Name | Description |
|---|---|---|

5.5.5 Deletion

The following errors can be set after doing a Delete or Delete_ method on an existing instance of the JobTemplates object (in addition to the errors defined for the Delete and Delete_ methods in the WMI SDK):

| Error Status Code | Error Symbolic Name | Description |
|---|---|---|

5.5.6 Associations

- To an instance of Devices

An instance of JobTemplate has an association to the device on which is to defined to be run, if any.

- To an instance of Sets

An instance of JobTemplate has an association to the set on which is to defined to be run, if any.

5.5.7 Properties

5.5.7.1 Name

| Property name | Name |
|---|---|
| Description | "The Name property is the identifier for the JobTemplates object." |
| Type | String |
| Access | Read |
| Key | Yes |
| Values | 50 Unicode characters |

This stores the name of the job as passed as the JobInvocationName argument to Devices.Execute or Sets.Execute.

5.5.7.2 TargetName

| Property name | TargetName |
|---|---|
| Description | "Name of the target, such as sets or devices, on which the job is to be invoked." |
| Type | String |
| Access | Read, Write |
| Key | No |
| Values | 255 Unicode characters |

Target name the job was run on: Devices or Sets.

5.5.7.3 TargetType

| Property name | TargetType |
|---|---|
| Description | "Type of the target, such as sets or devices." |
| Type | 32 bit integer |
| Access | Read, Write |
| Key | No |
| Values | 0 = "Undefined"'<br>1 = "Devices"<br>2 = "Sets"<br>3 = "Controller" |

5.5.7.4 JobWillReboot

| Property name | JobWillReboot |
|---|---|

| | |
|---|---|
| Description | "The JobWillReboot property specifies whether the job will reboot or not." |
| Type | Boolean |
| Access | Read, Write |
| Key | No |
| Values | 0 = "None"<br>1 = "BMCP" |

5.5.7.5 Delivery

| | |
|---|---|
| Property name | Delivery |
| Description | "The Delivery property specifies the mode in which the command is delivered to the target devices." |
| Type | 32 bit integer |
| Access | Read, Write |
| Key | No |
| Values | 0 = "None"<br>1 = "BMCP" |

5.5.7.6 Timeout

| | |
|---|---|
| Property name | Timeout |
| Description | "The Timeout property specifies the timeout value in seconds for the job. |
| Type | 32 bit integer |
| Access | Read, Write |
| Key | No |
| Values | |

5.5.7.7 Command

| | |
|---|---|
| Property name | Command |
| Description | "The job command that is to be executed on the target object." |
| Type | String |
| Access | Read, Write |
| Key | No |
| Values | 1024 Unicode characters |

The command that is invoked on the target.

The maximum supported length of the parameters is 1024 (limited for test purposes).

5.5.7.8 Parameters

| | |
|---|---|
| Property name | Parameters |
| Description | "Parameters passed to the job command that is to be executed." |
| Type | String |
| Access | Read, Write |
| Key | No |
| Values | 4096 Unicode characters |

The parameters to the command that is invoked.

The maximum supported length of the parameters is 4096 (limited for test purposes).

5.5.7.9 Description

| Property name | Description |
|---|---|
| Description | "Description of the job that was invoked." |
| Type | String |
| Access | Read, Write |
| Key | No |
| Values | 255 Unicode characters |

5.5.7.10 Unused Properties

These properties are inherited from the parent classes but are currently unused:

- Caption
- ElapsedTime
- InstallDate
- Notify
- Owner
- Priority
- StartTime
- Status
- TimeSubmitted
- UntilTime

5.5.8 Methods

5.5.8.1 Execute

| Description: | "The Execute method runs a job using either template values or the optional in parameters if supplied. If the job started successfully, the method returns the job identifier of the job.\n" | |
|---|---|---|
| Arguments: | | |
| TargetType | [in] String | "The TargetName input parameter is the name of the target on which the command is to be run." |
| TargetName | [in] Integer | "The TargetType input parameter is the type of the target on which the command is to be run." <br> For values, see TargetType property. |
| Command | [in] String | "Command input parameter is the path of the command to be executed." |
| Parameters | [in] String | "Parameters input parameter is the parameters to be passed to the executing command." |
| Description | [in] String | "Description input parameter is the description for the executing command which is to be logged in the Jobs object" |
| Delivery | [in] 32 bit integer | The Delivery input parameter specifies the mode of delivering the command to the target device." <br> 0 = "None" |

|  |  | 1 = "BMCP" |
| --- | --- | --- |
| Timeout | [in] 32 bit integer | "The Timeout input parameter specifies the timeout value in seconds for this job. It is an optional parameter." |
| JobWillReboot | [in] Boolean | "The JobWillReboot input parameter specifies whether the job to be executed will reboot or not. It is an optional parameter and the default value is False." |
| Return value: | 64 bit integer | JobID of the new job, or 0 if an error occurred |

See the description of Sets.Execute (section 5.4.8.6) for details of the operation of this method and the meaning and interpretation of the arguments.

The following errors can be set after calling this method (in addition to the errors defined for the ExecMethod and ExecMethod_ methods in the WMI SDK):

| Error Status Code | Error Symbolic Name | Description |
| --- | --- | --- |
|  |  |  |

5.6 JOBINVOCATIONS

JobInvocations will not be exposed at the WMI layer. Instead, its properties are merged with the Jobs objects. See the Jobs section, below, for details of the database JobInvocations table.

5.7 JOBS

The Jobs object captures the topology of a Job invocation. The Task Sequences spec defines the hierarchies of Jobs objects that are possible.

| Class name | Jobs |
| --- | --- |
| Derived from | CIM_LogicalElement |
| Description | "The Jobs class displays the results of an executed job. An instance of this class is created for each job that is run and for each device on which a job is run.." |

5.7.1 Schema Summary

Implemented as two tables: JobInvocations and Jobs. Exposed as the single WMI class Jobs.

5.7.1.1 JobInvocations Table

| Property | Format | Notes |
| --- | --- | --- |
| ID | Integer | Cannot be NULL |
| Delivery | Integer | Cannot be NULL |
| CommandType | Integer |  |
| Command | ntext | Cannot be NULL |
| Parameters | ntext |  |
| Description | String, max 255 characters |  |

Details of any particular operation in progress or completed, or a roll-up of individual jobs into a parent job, are stored in the Jobs table.

5.7.1.1.1 Jobs Table

| Property | Format | Notes |
| --- | --- | --- |
| JobID | Big integer | Cannot be NULL |
| ParentJobID | Integer | Cannot be NULL<br>If 0, this is a root root job. Otherwise it is a child job. |
| JobInvocationID | Integer | Cannot be NULL |
| Type | integer | Cannot be NULL<br>Bit map:<br>Bit 1: 0 = leaf node (no children); 1 = non-leaf node<br>Bit 2: 0 = parallel execute children; 1 = serial execute children<br>Bit 3: 0 = command does not do a reboot; 1 = command does a reboot so no completion status should be expected |
| State | Integer | Cannot be NULL<br>1 = Created<br>2 = Ready to Run<br>3 = Running<br>4 = Completed-Success<br>5 = Completed-Error<br>6 = Canceled<br>7 = Stopped<br>8 = Unable to start<br>9 = Failed<br>10 = Timed Out |
| ExitCode | Integer | Cannot be NULL<br>Only has meaning if State is Completed-Success |
| StartTime | Datetime | Cannot be NULL |
| EndTime | Datetime | Cannot be NULL |
| TimeOut | Integer | Cannot be NULL. Timeout in seconds. |
| TargetType | Integer | Cannot be NULL |
| TargetName | Integer | Cannot be NULL<br>The set ID or device ID of the target of this job<br>Exposed as the corresponding device or set name (if any) in Jobs.TargetName |
| Username | String, max 255 characters | Username that ran the job, in the format domain\username. |

JobID is the primary key. ParentJobID is a foreign key to Jobs.JobID.

5.7.2 Creation

Always auto-created by the system, when a job is started (for example, by the methods Sets.Execute or Devices.Execute).

5.7.3 Accessing

The following errors can be set after doing an access of an instance of this class (in addition to the errors defined for the Get method in the WMI SDK):

| Error Status | Error Symbolic Name | Description |
| --- | --- | --- |

| Code | | |
|---|---|---|

5.7.4 Updating

Instances of Jobs cannot be updated.

5.7.5 Deletion

If an instance of Jobs that represents a root job is deleted, the following are also deleted:

- The child instances of Jobs associated with the Jobs instance
- The JobLogs instances associated with each of the child Jobs instances This deletes the record of the job invocation, the status of the job on each device, and the results of the jobs on each device.

This is implemented in the database.

Jobs currently in progress can be deleted. If this occurs, any further output from the job received on the controller will not be stored, and no error will be reported.

Only the root jobs can be deleted.

The following errors can be set after doing a Delete or Delete_ method on an existing instance of the Sets object (in addition to the errors defined for the Delete and Delete_ methods in the WMI SDK):

| Error Status Code | Error Symbolic Name | Description |
|---|---|---|

5.7.6 Associations

- To instances of JobLogs

An instance of Jobs is associated to instances of JobLogs that contain the output from running this job on a particular device. This association only exists if the instance of Jobs represents a single device, rather than a parent instance.

- To instances of Jobs

An instance of Jobs is associated to instances of Jobs representing the child processes of the parent Jobs instance. In the current version, only one level of parent-child relationship is supported, where the parent represents a job being run on multiple devices and the children represent the results from individual devices.

5.7.7 Properties

5.7.7.1 JobID

| Property name | JobID |
|---|---|
| Description | "The JobID property is the unique identifier for the job that has been executed. If the same job executes again, it yields a different identifier." |
| Type | 64 bit integer |

| Access | Read |
|---|---|
| Key | Yes |
| Values | Job unique identifier |

5.7.7.2 ParentJobID

| Property name | ParentJobID |
|---|---|
| Description | "The ParentJobID property is the identifier for the job which originates the job on the targets. For the root job, the identifier will be 0 and for other jobs, the identifier uses the identifier of the root job." |
| Type | 64 bit integer |
| Access | Read |
| Key | No |
| Values | Parent job unique identifier |

5.7.7.3 Type

| Property name | Type |
|---|---|
| Description | "The Type property identifies the type of the job that has been executed." |
| Type | 32 bit integer |
| Access | Read |
| Key | No |
| Values | 255 Unicode characters |

5.7.7.4 TargetName

| Property name | TargetName |
|---|---|
| Description | "Name of the target such as sets or devices, on which the job is to be invoked." |
| Type | String |
| Access | Read |
| Key | No |
| Values | 255 Unicode characters |

Target name the job was run on: Devices or Sets. If the device or set on which this job was run has been deleted, this property will instead contain the internal identifier number of the set or device. There is no way to resolve that number back to the name of the deleted set or device.

If the device or set record is deleted, this property will contain an internal identifier number instead of the set or device.name.

5.7.7.5 TargetType

| Property name | TargetType |
|---|---|
| Description | "Type of the target such as sets or devices." |
| Type | String |
| Access | Read |
| Key | No |
| Values | 255 Unicode characters<br><br>0 = "Undefined"<br>1 = "Devices"<br>2 = "Sets"<br>3 = "Controller" |

5.7.7.6 Delivery

| Property name | Delivery |
|---|---|
| Description | "The Delivery property specifies the mode in which the command is delivered to the target devices." |
| Type | String |
| Access | Read |
| Key | No |
| Values | 255 Unicode characters<br>0 = "None"<br>1 = "BMCP" |

Target name the job was run on: Devices or Sets.

5.7.7.7 Command

| Property name | Command |
|---|---|
| Description | "The job command that is to be executed on the target object." |
| Type | String |
| Access | Read, Write |
| Key | No |
| Values | 1024 Unicode characters |

The command that is invoked on the target.

The maximum supported length of the parameters is 1024 (limited for test purposes).

5.7.7.8 Parameters

| Property name | Parameters |
|---|---|
| Description | "Parameters passed to the job command that is to be executed." |
| Type | String |
| Access | Read, Write |
| Key | No |
| Values | 4096 Unicode characters |

The parameters to the command that is invoked.

The maximum supported length of the parameters is 4096 (limited for test purposes).

5.7.7.9 Description

| Property name | Description |
|---|---|
| Description | "Description of the job that was invoked." |
| Type | String |
| Access | Read, Write |
| Key | No |
| Values | 255 Unicode characters |

5.7.7.10 ExitCode

| Property name | ExitCode |
|---|---|
| Description | "" |

| Type | Integer |
|---|---|
| Access | Read |
| Key | No |
| Values | The exit code returned from the job. This only has meaning if State is set to "Job completed with success". |

5.7.7.11 StartTime

| Property name | StartTime |
|---|---|
| Description | "Time stamp when task was started." |
| Type | Datetime |
| Access | Read |
| Key | No |
| Values | The time the job was started |

5.7.7.12 EndTime

| Property name | EndTime |
|---|---|
| Description | "Time at which this task was completed." |
| Type | Datetime |
| Access | Read |
| Key | No |
| Values | The time the job was completed |

5.7.7.13 State

| Property name | State |
|---|---|
| Description | "Indicates the status of the task." |
| Type | 32 bit integer |
| Access | Read |
| Key | No |
| Values | 1 = "Job created"<br>2 = "Ready to be run"<br>3 = "Job running"<br>4 = "Job completed with success"<br>5 = "Job completed with failure"<br>6 = "Job failed"<br>7 = "Job cancelled by user"<br>8 = "Job stopped by user"<br>9 = "Unable to start"<br>10 = "Job timedout" |

This should be JobStatus, but that is declared in a parent class with a conflicting type.

5.7.7.14 Timeout

| Property name | Timeout |
|---|---|
| Description | "Indicates the timeout value for the job." |
| Type | 32 bit integer |
| Access | Read |
| Key | No |
| Values |  |

5.7.7.15 Owner

| Property name | Owner |
|---|---|
| Description | "Specifies the user that started the job." |
| Type | String |
| Access | Read |
| Key | No |
| Values | Account name of the user that invoked this job, in format domain\user |

> Job.Owner: This should be Username, but that property is declared in a parent class with a conflicting type.

5.7.7.16 Unused Properties

These properties are inherited from the parent classes but are currently unused:

- Caption
- InstallData
- Name
- Status

5.7.8 Methods

5.7.8.1 Stop

| Description: | "The Stop method stops a job that is in progress." |
|---|---|
| Arguments: | None |
| Return value: | Void |

This stops a job executing on a device.

If it is executed on an instance that represents a parent job, all the child chills that are still running are stopped.

A job that was stopped by the user will have a Status property value of 'Stopped'.

The following errors can be set after calling this method (in addition to the errors defined for the ExecMethod and ExecMethod_ methods in the WMI SDK):

| Error Status Code | Error Symbolic Name | Description |
|---|---|---|
| | | |

5.7.8.2 GetOutput

| Description: | "GetOutput method retrieves the output from the job log and yields the collective result." | |
|---|---|---|
| Arguments: | | |
| OutputType | [in] 32 bit integer | "Type of the output to be retrieved from the JobLogs." 1 = "Get standard output" |

|  |  | 2 = "Get standard error"<br>3 = "Get all output (in sequence order)" |
|---|---|---|
| Start | [in] 32 bit integer | Offset of the first character to return. If 0 or NULL, starts with the first character in the output. If larger than the number of characters in the output, returns an empty string. |
| Length | [in] 32 bit integer | Maximum number of characters to return. If 0 or NULL, return all characters in output (starting from Start, if given). |
| Output | [out] String | "The output retrieved from the job logs." |
| Return value: | Void |  |

The values for OutputType are:

- 1 = Get standard output

- 2 = Get standard error

- 3 = Get all output (in sequence order)

If the value given is not one of these, return with error code 0x80040C19.

This method is only valid for child Job instances. If this method is called on a parent Jobs instance, it returns the error code 0x80040C1A.

Start and Length are used to get a subset of the output. These are only value for where OutputType is 1, 2 and 3. The GetOutputSize method can be used to get the total size of the selected output stream. This allows the caller to return large output sets in useable chunks.

The following errors can be set after calling this method (in addition to the errors defined for the ExecMethod and ExecMethod_ methods in the WMI SDK):

| Error Status Code | Error Symbolic Name | Description |
|---|---|---|
|  |  |  |

5.7.8.3 GetOutputSize

| Description: |  |  |
|---|---|---|
| Arguments: |  |  |
| OutputType | [in] 32 bit integer | "Type of the output to be retrieved from the JobLogs."<br>1 = "Get standard output"<br>2 = "Get standard error"<br>3 = "Get all output (in sequence order)" |
| Output | [out] 32 bit integer | Total number of Unicode characters in the output of type specified by the OutputType parameter |
| Return value: | Void |  |

Returns the number of Unicode characters in the output of the given type.

The following errors can be set after calling this method (in addition to the errors defined for the ExecMethod and ExecMethod_ methods in the WMI SDK):

| Error Status Code | Error Symbolic Name | Description |
|---|---|---|
|  |  |  |

5.7.8.4 StartSequence

| Description: | "The StartSequence method starts the sequence at the step with the given Job ID. This is only valid on a jobs object that represents a sequence that failed executing on a single target or is yet to be run." | |
|---|---|---|
| Arguments: | | |
| StepJobID | [in] 64 bit integer | "StepJobID represents the job node from which the sequence is to be executed. In this version, this parameter accepts only 0." |
| Return value: | Void | |

This re-starts a sequence at the step with the given Job ID. This is only valid on a Jobs object that represents a sequence on a single target.

In this version, the only value of StepJobID that is supported is 0.

Later versions will support restarting the sequence at arbitrary steps, by giving the JobID of the step to restart with as StepJobID.

The following errors can be set after calling this method (in addition to the errors defined for the ExecMethod and ExecMethod_ methods in the WMI SDK):

| Error Status Code | Error Symbolic Name | Description |
|---|---|---|
| | | |

5.7.8.5 ClearJobHistory

| Description: | "The ClearJobHistory method deletes a jobs that is started before StartedBefore and started after StartedAfter timestamp and returns the number of jobs deleted. If any one of the input parameter is omitted, the job history is cleared based on the input parameter." | |
|---|---|---|
| Arguments: | | |
| StartedAfter | [in] datetime | "Time after which the job started" |
| StartedBefore | [in] datetime | "Time before which the job started" |
| Return value: | Integer | Returns number of root jobs deleted. |

This is a status (class) method.

> Jobs.ClearJobHistory(): define behavior if one or both of the arguments are missing or NULL

5.7.8.6 ArchiveJob

| Description: | "The ArchiveJob method archives a jobs as XML data stream. This method works only on the root job instances. It retrieves the root job and its child jobs and their data is transformed into XML data stream as output." | |
|---|---|---|
| Arguments: | | |
| Return value: | String | |

5.7.8.7 ValidateSequence

| Description: | "The ValidateSequence method validates the input sequence xml file with the optional xslt file against the sequence xml schema. This helper method will be useful in checking the input xml before executing sequence." | |
|---|---|---|
| Arguments: | | |
| SequencePath, | [in] string | "The SequencePath input parameter is the path of the task sequence to be run." |
| StylesheetPath | [in] string | "The StylesheetPath input parameter specifies the path of the style sheet that transforms the multiple sequence modules into single sequence. It is optional parameter. If XSLT technique is opted for reusing the existing sequence modules, this parameter specifies the XSLT file path." |
| Description | [out] string | "The Reason ouput parameter specifies the error description if the sequence validation fails." |
| Return value: | Boolean | |

5.8 JOBLOGS

JobLogs capture the output of the execution of a script or executable. The job log is associated with a Jobs object. There can be N JobLogs for any Jobs.

| Class name | JobLogs |
|---|---|
| Derived from | CIM_LogicalElement |
| Description | "The JobLogs class represents the output log for the jobs that have already been executed." |

5.8.1 Schema Summary

Details of output are stored in the JobLogs table.

5.8.1.1 JobLogs Table

| Property | Format | Notes |
|---|---|---|
| JobID | Integer | Cannot be NULL |
| Sequence | Integer | Cannot be NULL |
| LogTime | Datetime | Cannot be NULL |
| OutputType | Integer | Cannot be NULL |
| OutputData | ntext | Cannot be NULL |

JobID and Sequence are the primary key. JobID is a foreign key to Jobs.JobID. InvocationID is a foreign key to JobInvocations.ID.

5.8.2 Creation

Always auto-created by the system, when a job is started (for example, by the methods Sets.Execute or Devices.Execute).

5.8.3 Accessing

The following errors can be set after doing an access of an instance of this class (in addition to the errors defined for the Get method in the WMI SDK):

| Error Status Code | Error Symbolic Name | Description |
|---|---|---|
| | | |

5.8.4 Updating

Instances of the JobLogs class cannot be updated.

5.8.5 Deletion

Instances of JobLogs can not be deleted in WMI. They may be deleted in the database.

5.8.6 Associations

- To a single instance of Jobs

An instance of JobLogs is associated with an instance of Jobs giving the device and job which generated this output.

5.8.7 Properties

5.8.7.1 JobID

| Property name | JobID |
|---|---|
| Description | "The JobID property is the unique identifier for the job that has been executed." |
| Type | 64 bit integer |
| Access | Read |
| Key | Yes |
| Values | Jobs unique identifier |

5.8.7.2 Sequence

| Property name | Sequence |
|---|---|
| Description | "Sequence of the output from the job that was executed on the device under consideration." |
| Type | 32 bit integer |
| Access | Read |
| Key | Yes |
| Values | Record sequence for a jobs output |

Starts at 1 going up. Same sequence number used for stdout and stderr.

5.8.7.3 LogTime

| Property name | LogTime |
|---|---|
| Description | "Time at which the controller device received output." |
| Type | Datetime |
| Access | Read |
| Key | No |
| Values | |

5.8.7.4 OutputType

| Property name | OutputType |
|---|---|
| Description | "The OutputType property specifies the type of output in this instance of JobLogs. It is one of 1 meaning StdOut, or 2 meaning StdErr." |
| Type | 32 bit integer |
| Access | Read |
| Key | No |
| Values | 1 = "StdOut"<br>2 = "StdErr" |

5.8.7.5 OutputData

| Property name | OutputData |
|---|---|
| Description | "Output from the job on the device. The sequence property can be used to recreate the output from this job on this device in correct order." |
| Type | String |
| Access | Read |
| Key | No |
| Values | |

5.8.7.6 Unused Properties

These properties are inherited from the parent classes but are currently unused:

- Caption
- Description
- InstallDate
- Name
- Status

5.8.8 Methods

There are no methods for this object.

5.9 SERVICES

| Class name | Serveices |
|---|---|
| Derived from | CIM_LogicalElement |
| Description | "The Services class represents the collection of devices that are configured as various servers. |

5.9.1 Schema Summary

The Servers table contains the configuration of the controller.

5.9.1.1 Services Table

| Property | Format | Notes |
|---|---|---|
| Type | Integer | Cannot be NULL<br>Exposed as Services.Type |
| DeviceID | Integer | Cannot be NULL<br>Not exposed directly to user. Corresponding device name is exposed as Services.DeviceName. |
| Description | String, max 255 characters | Exposed as Services.Name |

Primary key is Type andDeviceName.

WMI layer exposes the configuration information in separate properties.

5.9.2 Creation

5.9.3 Accessing

The following errors can be set after doing an access of an instance of this class (in addition to the errors defined for the Get method in the WMI SDK):

| Error Status Code | Error Symbolic Name | Description |
|---|---|---|
| | | |

5.9.4 Updating

5.9.5 Deletion

5.9.6 Associations

- To an instance of Devices

An instance of Servers has an association to the instance of Devices that represents the device on which this service is running.

5.9.7 Properties

5.9.7.1 Type

| Property name | Type |
|---|---|
| Description | "The Type property is the unique identifier for the type of the server." |
| Type | Integer |
| Access | Read |
| Key | No |
| Values | 1 = "Controller Service"<br>2 = "PXE Service" (i.e. NBS) |

| | 4 = "Image Service" (i.e. IDS) |

5.9.7.2 DeviceName

| Property name | DeviceName |
|---|---|
| Description | "The Name property is the unique identifier for the server." |
| Type | String |
| Access | Read |
| Key | No |
| Values | |

5.9.7.3 Description

| Property name | Description |
|---|---|
| Description | "Description of the server." |
| Type | String |
| Access | Read |
| Key | No |
| Values | |

5.9.8 Methods

5.9.8.1 RecoverServer

Should not be needed.

5.10 SERVICEVARIABLES

Each Service can have zero or more service variables. These are stored in the ServiceVariables table:

| Class name | ServiceVariables |
|---|---|
| Derived from | CIM_LogicalElement |
| Description | "The DeviceVariables class represents the collections of Name-Value pair pertaining to any device. The Name-Value pair for every device has different Namespace scope." |

5.10.1 Schema Summary

Implemented as the ServiceVariables database table, and exposed as the ServiceVariables WMI class.

5.10.1.1 ServiceVariables Table

| Property | Format | Notes |
|---|---|---|
| DeviceID | Integer | Not exposed directly in WMI. WMI exposes the corresponding device name. |
| Type | Integer | Cannot be NULL<br>Exposed as DeviceVariables.Type |
| NameSpace | String, max 50 characters | Cannot be NULL<br>Exposed as |

|  |  | DeviceVariables.NameSpace |
|---|---|---|
| Attribute | Integer | Cannot be NULL<br>Exposed as DeviceVariables.Attribute |
| VariableName | String, max 50 characters | Cannot be NULL<br>Exposed as DeviceVariables.Name |
| VariableValue | String, max 255 characters | Cannot be NULL<br>Exposed as DeviceVariables.Value |

Primary key is DeviceID, Type, NameSpace and VariableName.

DeviceID is a foreign key to Devices.ID.

5.10.2 Creation

Instances of DeviceVariables cannot be created manually.

5.10.3 Accessing

The following errors can be set after doing an access of an instance of this class (in addition to the errors defined for the Get method in the WMI SDK):

| Error Status Code | Error Symbolic Name | Description |
|---|---|---|

5.10.4 Updates

The following errors can be set after doing a Put or Put_ method on an existing instance of the Sets object (in addition to the errors defined for the Put and Put_ methods in the WMI SDK):

| Error Status Code | Error Symbolic Name | Description |
|---|---|---|

5.10.5 Deletion

Instances of ServiceVariables cannot be deleted.

5.10.6 Associations

- To single instance of Services

An instance of ServicesVariables is associated to the instance of Servuces to which the variable applies.

5.10.7 Properties

5.10.7.1 DeviceName

| Property name | DeviceName |
|---|---|
| Description | "The DeviceName property is the unique identifier." |
| Type | String |
| Access | Read |

| Key | Yes |
|---|---|
| Values | 255 Unicode characters |

5.10.7.2 Type

| Property name | NameSpace |
|---|---|
| Description | |
| Type | Integer |
| Access | Read |
| Key | Yes |
| Values | See Services.Type |

5.10.7.3 Namespace

| Property name | NameSpace |
|---|---|
| Description | "The Namespace property is the scope identifier for the device variable." |
| Type | String |
| Access | Read, write |
| Key | Yes |
| Values | 50 Unicode characters |

5.10.7.4 Attribute

| Property name | Attribute |
|---|---|
| Description | "The attribute property specifies whether the instance can be updated." |
| Type | Integer |
| Access | Read |
| Key | No |
| Values | 1 = "Read"<br>2 = "Write"<br>3 = "Read/Write" |

5.10.7.5 Name

| Property name | Name |
|---|---|
| Description | "The Name property is the unique identifier for the device variable. |
| Type | String |
| Access | Read, write |
| Key | Yes |
| Values | 50 Unicode characters |

5.10.7.6 Value

| Property name | Value |
|---|---|
| Description | "Value of the device variable." |
| Type | String |
| Access | Read, write |
| Key | Yes |
| Values | 255 Unicode characters |

5.10.8 M thods

None.

5.11 IMAGES

| Class name | Images |
|---|---|
| Derived from | CIM_LogicalElement |
| Description | "The Images class represents the collection of images." |

5.11.1 Schema Summary

5.11.1.1 Images Table

Each image is represented by an entry in the Images table:

| Property | Format | Notes |
|---|---|---|
| GUID | String, max 50 characters | Cannot be NULL |
| Name | String, max 50 characters | Cannot be NULL |
| Description | String, max 50 characters | |

GUID is the primary key.

5.11.2 Creation

5.11.3 Accessing

The following errors can be set after doing an access of an instance of this class (in addition to the errors defined for the Get method in the WMI SDK):

| Error Status Code | Error Symbolic Name | Description |
|---|---|---|
| | | |

5.11.4 Updating

5.11.5 Deletion

5.11.6 Associations

- To instances of ImageVariables

An instance of Images has an association to an instance of ImageVariables for each image variable.

5.11.7 Properties

5.11.7.1 Name

| Property name | Name |
|---|---|
| Description | "The Name property is the unique identifier for the image." |
| Type | String |
| Access | Read |
| Key | Yes |
| Values | |

5.11.7.2 Description

| Property name | Description |
|---|---|
| Description | "Description of the image." |
| Type | String |
| Access | Read |
| Key | No |
| Values | |

5.11.8 Methods

5.11.8.1 Add

| Description | "The Add method adds the image specified by the SourcePath to the repository of Image Server and it reads the system properties of the image being added and creates the related ImageVariables object with the properties as name-value pair under System namespace." | |
|---|---|---|
| Arguments: | | |
| Name | [in] string | "The Name property is the friendly name that uniquely identifies the image being added to the image repository." |
| SourcePath | [in] string | "The SourcePath is the path of the source that is to be copied to the image repository." |
| Description | [in] string | "Description of the image to be added to the image repository." |
| Return value: | Void | |

The following errors can be set after calling this method (in addition to the errors defined for the ExecMethod and ExecMethod_ methods in the WMI SDK):

| Error Status Code | Error Symbolic Name | Description |
|---|---|---|

5.11.8.2 Retreive

| Description | "The Retrieve method retrieves the image specified the name from the image repository and places on the destination specified by the DestinationPath parameter." | |
|---|---|---|
| Arguments: | | |
| DestinationPath | [in] string | "The DestinationPath is the path where the image is to be copied from the image repository." |
| Return value: | Void | |

The following errors can be set after calling this method (in addition to the errors defined for the ExecMethod and ExecMethod_ methods in the WMI SDK):

| Error Status Code | Error Symbolic Name | Description |
|---|---|---|

5.11.8.3 Rename

| Description | "The Rename method renames the image name to the name specified." | |
|---|---|---|
| Arguments: | | |
| ImageName | [in] string | "The ImageName parameter provides the name for the image" |
| Return value: | Void | |

The following errors can be set after calling this method (in addition to the errors defined for the ExecMethod and ExecMethod_ methods in the WMI SDK):

| Error Status Code | Error Symbolic Name | Description |
|---|---|---|
| | | |

5.12 IMAGEVARIABLES

| Class name | ImageVariables |
|---|---|
| Derived from | CIM_LogicalElement |
| Description | "The ImageVariables class represents the collection of image properties." |

5.12.1 Schema Summary

5.12.1.1 ImageVariables Table

Image properties are associated with each image and stored in the ImageVariables table:

| Property | Format | Notes |
|---|---|---|
| ImageGUID | String, max 50 characters | Cannot be NULL |
| NameSpace | String, max 50 characters | Cannot be NULL |
| Attribute | Integer | Cannot be NULL |
| PropertyName | String, max 50 characters | Cannot be NULL |
| PropertyValue | String, max 255 characters | Cannot be NULL |

ImageGUID, NameSpace and PropertyName are the primary key.

ImageGUID is a foreign key to Images.ImageGUID.

5.12.2 Creation

5.12.3 Accessing

The following errors can be set after doing an access of an instance of this class (in addition to the errors defined for the Get method in the WMI SDK):

| Error Status Code | Error Symbolic Name | Description |
|---|---|---|
| | | |

5.12.4 Updating

5.12.5 Deletion

5.12.6 Associations

- To single instance of Images

An instance of ImageVariables is associated to the instance of Images to which the variable applies.

5.12.7 Properties

5.12.7.1 ImageName

| Property name | ImageName |
|---|---|
| Description | "The ImageName property is the unique identifier for the image." |
| Type | String |
| Access | Read |
| Key | Yes |
| Values | |

5.12.7.2 Namespace

| Property name | Namespace |
|---|---|
| Description | "The Namespace property is the unique identifier for the image." |
| Type | String |
| Access | Read |
| Key | Yes |
| Values | |

5.12.7.3 Attribute

| Property name | Attribute |
|---|---|
| Description | "The attribute property specifies whether the instance can be updated." |
| Type | Integer |
| Access | Read |
| Key | No |
| Values | 1 = "Read"<br>2 = "Write"<br>3 = "Read/Write" |

5.12.7.4 Name

| Property name | Name |
|---|---|
| Description | The Name property is the unique identifier for the image property." |
| Type | String |
| Access | Read |
| Key | No |
| Values | |

5.12.7.5 Value

| Property name | Value |
|---|---|
| Description | "The Value property is the image property value." |
| Type | String |
| Access | Read, write |
| Key | No |
| Values | |

5.12.8 Methods

None.

6 Association Class Definitions

In the database, instances of objects (that is, table rows) are linked by connecting a field in one table to another table. In WMI, special classes called association classes are used to link instances of objects. This section defines the association classes used to link the WMI classes that implement the object model. This classes (and their instances) do not exist in the database. The WMI layer creates instances of these classes dynamically as needed.

Association classes are derived from either CIM_Component or CIM_Dependency.

CIM_Component contains the properties GroupComponent and PartComponent to specify the parent instance and child instance respectively.

CIM_Dependency contains the properties Antecedent and Dependent to specify the dependency relationship.

In the sections below, the parent class is listed, then the values of the properties (either GroupComponent and PartComponent, or Antecedent and Dependent) are described. No class add additional properties or override the descriptions or other attributes.

6.1 DEVICETODEVICEHWADDR

| Class name | DeviceToDeviceHWAddr |
|---|---|
| Derived from | CIM_Component |
| Description | <inherited> |

GroupComponent is a reference to an instance of Devices, PartComponent is a reference to an instance of DeviceHWAddrs.

6.2 DEVICETOJOB

| Class name | DeviceToJob |
|---|---|
| Derived from | CIM_Dependency |
| Description | <inherited> |

Antecedent is a reference to an instance of Devices, Dependent is a reference to an instance of Jobs.

6.3 SETTOJOB

| Class name | SetToJob |
|---|---|
| Derived from | CIM_Dependency |
| Description | <inherited> |

Antecedent is a reference to an instance of Sets, Dependent is a reference to an instance of Jobs.

6.4 JOBTOJOB

| Class name | JobToJob |
|---|---|
| Derived from | CIM_Component |

| Description | <inherited> |

GroupComponent is a reference to an instance of Jobs (representing the parent), PartComponent is a reference to an instance of Jobs (for the children).

6.5 JOBINVOCATIONTOJOB

| Class name | JobInvocationToJob |
|---|---|
| Derived from | CIM_Dependency |
| Description | <inherited> |

Antecedent is a reference to an instance of JobInvocations, Dependent is a reference to an instance of Jobs.

6.6 JOBTOJOBLOG

| Class name | JobToJobLog |
|---|---|
| Derived from | CIM_Dependency |
| Description | <inherited> |

Antecedent is a reference to an instance of Jobs, Dependent is a reference to an instance of JobLogs.

6.7 SETTODEVICE

| Class name | SetToDevice |
|---|---|
| Derived from | CIM_Component |
| Description | <inherited> |

GroupComponent is a reference to an instance of Sets, PartComponent is a reference to an instance of Devices.

6.8 SETTOSET

| Class name | SetToSet |
|---|---|
| Derived from | CIM_Component |
| Description | <inherited> |

GroupComponent is a reference to an instance of Sets, PartComponent is a reference to an instance of Sets.

6.9 DEVICETODEVICEVARIABLE

| Class name | DeviceToDeviceVariable |
|---|---|
| Derived from | CIM_Dependency |
| Description | <inherited> |

Antecedent is a reference to an instance of Devices, Dependent is a reference to an instance of DeviceVariables.

6.10 DEVICETOSERVER

| Class name | DeviceToServer |
|---|---|
| Derived from | CIM_Component |
| Description | <inherited> |

GroupComponent is a reference to an instance of Devices, PartComponent is a reference to an instance of Servers.

6.11 DEVICETOJOBTEMPLATE

| Class name | DeviceToJobTemplate |
|---|---|
| Derived from | CIM_Dependency |
| Description | <inherited> |

Antecedent is a reference to an instance of Devices, Dependent is a reference to an instance of JobTemplates.

6.12 SETTOJOBTEMPLATE

| Class name | SetToJobTemplate |
|---|---|
| Derived from | CIM_Dependency |
| Description | <inherited> |

Antecedent is a reference to an instance of Sets, Dependent is a reference to an instance of JobTemplates.

6.13 IMAGETOIMAGEVARIABLE

| Class name | ImageToImageVariable |
|---|---|
| Derived from | CIM_Dependency |
| Description | <inherited> |

Antecedent is a reference to an instance of Images, Dependent is a reference to an instance of ImageVariables.

General Computing Device Example

Figure 11:
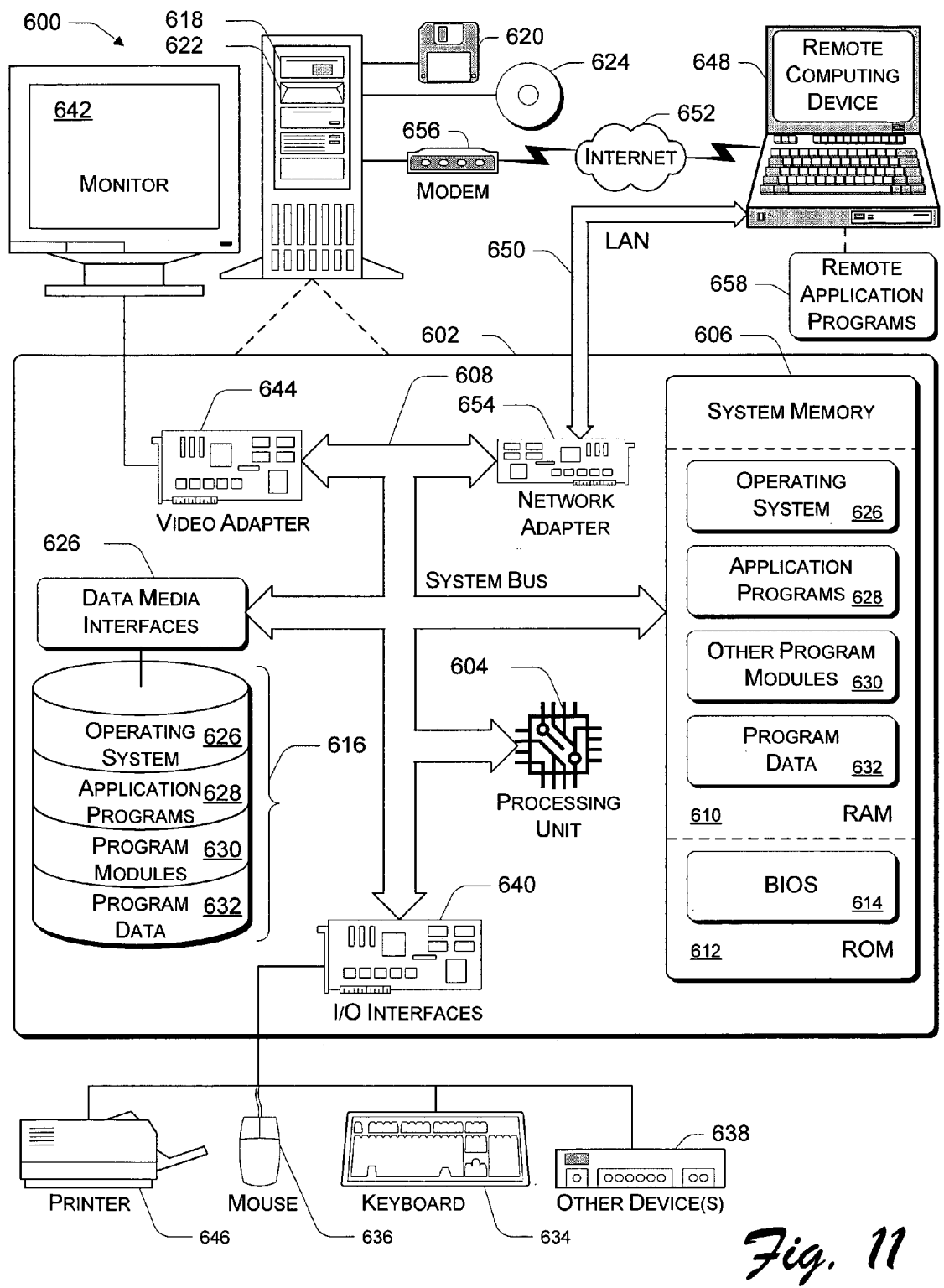
FIG. 11 illustrates a general computer environment, which can be used to implement the techniques described herein.

FIG. 11 illustrates a general computer environment 600, which can be used to implement the techniques described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. Computer 602 can be, for example, a computing device 102 or implement automated deployment services 104 of FIG. 1, or implement automated deployment services 120 of FIG. 2, or implement automated deployment services 200 of FIG. 4. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 11 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An apparatus having a processor configured to manage installation of operating systems on a plurality of computing devices, the installation being performed across the plurality of computing devices both concurrently and asynchronously, the installation comprising:

transferring multiple portions of data to each of the plurality of computing devices, wherein some of the multiple portions are transferred to the plurality of computing devices concurrently and other of the multiple portions are transferred to the plurality of computing devices asynchronously, wherein the portions that are transferred to the plurality of computing devices asynchronously include one or more programs to be executed on the plurality of computing devices to configure the plurality of computing devices, and wherein the portions that are transferred to the plurality of computing devices concurrently are larger than the portions transferred to the plurality of computing devices asynchronously.

2. An apparatus as recited in claim 1, wherein the portions that are transferred to the plurality of computing devices concurrently comprise an image of the operating system being deployed, and wherein the image of the operating system is transferred to the plurality of computing devices after the one or more programs are executed on the plurality of computing devices.

3. An apparatus as recited in claim 1, wherein installation of the operating systems is performed in multiple steps, and wherein the apparatus is configured to perform a first set of the multiple steps asynchronously across the plurality of computing devices, and, after a particular one of the multiple steps is completed, to perform one or more of the remaining steps of the multiple steps concurrently across the plurality of computing devices.

4. An apparatus as recited in claim 3, wherein the one or more remaining steps includes a step of downloading an operating system image to the plurality of computing devices.

5. An apparatus as recited in claim 1, wherein the apparatus further comprises:

a controller to maintain a record of the plurality of computing devices being managed by the apparatus;

a network boot service to control how the plurality of computing devices are to boot; and an image distribution service to store one or more operating system images that can be installed as the operating system for one or more of the plurality of computing devices.

6. An apparatus as recited in claim 1, wherein the apparatus further comprises a network boot service to:

receive, from one of the plurality of computing devices, information describing hardware installed on the computing device; and use the received information to generate a deployment agent to be downloaded to the computing device and used to install the operating system on the computing device.

7. An apparatus as recited in claim 1, wherein the installation comprises maintaining a record of what operations are performed when installing the operating systems on the plurality of computing devices.

8. An apparatus as recited in claim 1, wherein the one or more programs are executed on the plurality of computing devices to set one or more BIOS parameters on the plurality of computing devices.

9. An apparatus as recited in claim 1, wherein the one or more programs are executed on the plurality of computing devices to set one or more RAID parameters on the plurality of computing devices.

10. A method of deploying an operating system on a plurality of computing devices, the method comprising:

performing a first portion of an installation process on each of the plurality of computing devices asynchronously across the plurality of computing devices, wherein performing the first portion comprises downloading one or more programs to each of the plurality of computing devices to be executed on the plurality of computing devices to configure the plurality of computing devices; and performing a second portion of the installation process on each of the plurality of computing devices concurrently, wherein the portion that is transferred to the plurality of computing devices concurrently is larger than the portion transferred to the plurality of computing devices asynchronously.

11. A method as recited in claim 10, wherein performing the second portion comprises downloading an operating system image to the plurality of computing devices.

12. A method as recited in claim 10, wherein performing the first portion further comprises:
  downloading a deployment agent loader to obtain, from each of the plurality of computing devices, information describing hardware installed on each of the plurality of computing devices; and
  downloading, to each of the plurality of computing devices, a deployment agent, wherein the deployment agent downloaded to a particular computing device is generated based on the received information regarding the particular computing device.

13. A method as recited in claim 10, further comprising adding an indication of the installation process performed on each of the plurality of computing devices to a log.

14. One or more computer storage media having stored thereon a plurality of instructions that, when executed by one or more processors, causes the one or more processors to:
  receive, from each of a plurality of computing devices, an indication that the computing device is to have an operating system installed on the computing device;
  for each of the plurality of computing devices, identify, in response to receiving the indication, a set of steps to be taken in order to install an operating system on the computing device; and
  control installation of the operating systems on the plurality of computing devices asynchronously and in parallel, wherein the installation comprises transferring multiple portions of data to each of the plurality of computing devices, wherein some of the multiple portions are transferred to the plurality of computing devices in parallel and other of the multiple portions are transferred to the plurality of computing devices asynchronously, wherein the portions that are transferred to the plurality of computing devices asynchronously include one or more programs to be executed on the plurality of computing devices to configure the plurality of computing devices, and wherein the portions that are transferred to the plurality of computing devices in parallel are larger than the portions transferred to the plurality of computing devices asynchronously.

15. One or more computer readable media as recited in claim 14, wherein the indication that the computing device is to have an operating system installed is an indication that the computing device has been powered-on.

16. One or more computer readable media as recited in claim 14, wherein one or more of the plurality of computing devices currently has no operating system installed.

17. One or more computer readable media as recited in claim 14, wherein one or more of the plurality of computing devices currently has an operating system installed.

18. One or more computer readable media as recited in claim 14, wherein the portions that are transferred to the plurality of computing devices in parallel comprise an image of the operating system being deployed.

19. One or more computer readable media as recited in claim 14, wherein the instructions cause the one or more processors to perform multiple steps of the set of steps asynchronously across the plurality of computing devices, and, after a particular one of the set of steps is completed, to perform one or more of the remaining steps of the set of steps in parallel across the plurality of computing devices.

20. One or more computer readable media as recited in claim 19, wherein the one or more remaining steps includes a step of downloading an operating system image to the plurality of computing devices.

21. One or more computer readable media as recited in claim 14, wherein the plurality of instructions further cause the one or more processors to:
  receive, from one of the plurality of computing devices, information describing hardware installed on the computing device; and
  use the received information to generate a deployment agent to be downloaded to the computing device and used to install the operating system on the computing device.

22. One or more computer readable media as recited in claim 14, wherein the set of steps includes steps of:
  downloading a deployment agent loader to one of the plurality of computing devices;
  receiving, from the deployment agent loader, information describing hardware installed on the one computing device;
  dynamically generating a deployment agent for the one computing device based at least in part on the hardware installed on the one computing device; and
  downloading the dynamically generated deployment agent to the one computing device.

23. One or more computer readable media as recited in claim 22, wherein the set of steps further includes:
  downloading, in response to a request received from the deployment agent on the one computing device, an image of an operating system to the one computing device.

24. One or more computer readable media as recited in claim 14, wherein the plurality of instructions further cause the one or more processors to log, for each of the plurality of computing devices, the set of steps taken in order to install the operating system on the computing device.

25. A method comprising:
  identifying, for each of a plurality of devices, a process to be followed to install an operating system on the device; and
  controlling, in parallel and asynchronously, installation of the operating systems on the plurality of devices, wherein the installation comprises transferring multiple portions of data to each of the plurality of devices, and wherein some of the multiple portions are transferred to the plurality of devices in parallel and other of the multiple portions are transferred to the plurality of devices asynchronously, wherein the portions that are transferred to the plurality of computing devices asynchronously include one or more programs to be executed on the plurality of computing devices to configure the plurality of computing devices, and wherein the portions that are transferred to the plurality of devices in parallel are larger than the portions transferred to the plurality of devices asynchronously.

26. A method as recited in claim 25, wherein the same operating system is to be installed on each of the plurality of devices.

27. A method as recited in claim 25, wherein a different operating system is to be installed on at least a subset of the plurality of devices.

28. A method as recited in claim 25, wherein one or more of the plurality of devices currently has no operating system installed.

29. A method as recited in claim 25, wherein one or more of the plurality of devices currently has an operating system installed.

30. A method as recited in claim 25, wherein the portions that are transferred to the plurality of devices in parallel comprise an image of the operating system being deployed.

31. A method as recited in claim 25, wherein the installation comprises performing a set of steps, and performing multiple steps of the set of steps asynchronously across the plurality of devices, and, after a particular one of the set of steps is completed, performing one or more of the remaining steps of the set of steps in parallel across the plurality of devices.

32. A method as recited in claim 31, wherein the one or more remaining steps includes a step of downloading an operating system image to the plurality of devices.

33. A system having a processor for deploying an operating system on a plurality of computing devices, the system comprising:

means for performing a first portion of an installation process on each of the plurality of computing devices asynchronously across the plurality of computing devices, wherein the means for performing the first portion comprises means for downloading one or more programs to each of the plurality of computing devices to be executed on the plurality of computing devices to configure the plurality of computing devices; and means for performing a second portion of the installation process on each of the plurality of computing devices concurrently, wherein the portion that is transferred to the plurality of computing devices concurrently is larger than the portion transferred to the plurality of computing devices asynchronously.

34. A system as recited in claim 33, wherein the means for performing the second portion comprises means for downloading an operating system image to the plurality of computing devices.

* * * * *